United States Patent
Morfey et al.

(10) Patent No.: US 9,652,241 B2
(45) Date of Patent: May 16, 2017

(54) DATA PROCESSING APPARATUS WITH INSTRUCTION ENCODINGS TO ENABLE NEAR AND FAR MEMORY ACCESS MODES

(75) Inventors: Alistair G. Morfey, Cambridge (GB); Karl Leighton Swepson, Cambridge (GB); Neil Edward Johnson, Cambridge (GB)

(73) Assignee: Cambridge Consultants Ltd., Cambridge (GB)

( * ) Notice: Subject to any disclaimer, the term of this patent is extended or adjusted under 35 U.S.C. 154(b) by 1127 days.

(21) Appl. No.: 12/594,715

(22) PCT Filed: Apr. 10, 2007

(86) PCT No.: PCT/GB2007/001323
§ 371 (c)(1),
(2), (4) Date: Jun. 28, 2010

(87) PCT Pub. No.: WO2008/122746
PCT Pub. Date: Oct. 16, 2008

(65) Prior Publication Data
US 2010/0293342 A1    Nov. 18, 2010

(51) Int. Cl.
*G06F 9/318*    (2006.01)
*G06F 12/02*    (2006.01)
(Continued)

(52) U.S. Cl.
CPC ............ *G06F 9/342* (2013.01); *G06F 9/3013* (2013.01); *G06F 9/30032* (2013.01);
(Continued)

(58) Field of Classification Search
CPC .. G06F 12/0615; G06F 12/0623; G06F 9/342; G06F 9/321; G06F 9/324;
(Continued)

(56) References Cited

U.S. PATENT DOCUMENTS 4,297,743 A    10/1981    Appell
4,703,481 A    10/1987    Fremont
(Continued)

FOREIGN PATENT DOCUMENTS

EP    0762272 A2    3/1997
GB    1267582    3/1972
(Continued)

OTHER PUBLICATIONS

"u.S. Appl. No. 13/003,432, Final Office Action mailed Dec. 18, 2013", 22 pgs.
(Continued)

*Primary Examiner* — Daniel Pan
(74) *Attorney, Agent, or Firm* — Schwegman Lundberg & Woessner, P.A.

(57) ABSTRACT

Apparatus comprises a processor configured for operation under a sequence of instructions from an instruction set, wherein said processor comprises: means for conditionally inhibiting at least one type of trap, interrupt or exception (TIE) event, wherein, when operating under a sequence of instructions, said inhibition means is inaccessible by said instructions to inhibit the or each type of TIE event, without interrupting said sequence. A data processing apparatus includes a processor adapted to operate under control of program code comprising instructions selected from an instruction set, the apparatus comprising: a predefined memory space providing a predefined addressable memory for storing program code and data, a larger memory space providing a larger addressable memory, means for accessing program code and data within the predefined memory space, and means for controlling the access means so as to enable the access means to access program code located within the larger memory space.

28 Claims, 12 Drawing Sheets

(51) Int. Cl.

| | | |
|---|---|---|
| *G06F 9/34* | (2006.01) | |
| *G06F 9/30* | (2006.01) | |
| *G06F 9/32* | (2006.01) | |
| *G06F 9/355* | (2006.01) | |
| *G06F 9/38* | (2006.01) | |
| *G06F 12/06* | (2006.01) | |

(52) U.S. Cl.
CPC ...... *G06F 9/30043* (2013.01); *G06F 9/30094* (2013.01); *G06F 9/30112* (2013.01); *G06F 9/30145* (2013.01); *G06F 9/30167* (2013.01); *G06F 9/30181* (2013.01); *G06F 9/30189* (2013.01); *G06F 9/321* (2013.01); *G06F 9/324* (2013.01); *G06F 9/327* (2013.01); *G06F 9/3557* (2013.01); *G06F 9/3802* (2013.01); *G06F 9/3861* (2013.01); *G06F 12/0615* (2013.01); *G06F 12/0623* (2013.01)

(58) Field of Classification Search
CPC ...... G06F 9/327; G06F 9/3557; G06F 9/3802; G06F 9/3861; G06F 9/30032; G06F 9/30043; G06F 9/30094; G06F 9/30112; G06F 9/3013; G06F 9/30145; G06F 9/30167; G06F 9/30181; G06F 9/30189
USPC .......... 711/2, 170–173; 712/41–43, 203, 229
See application file for complete search history.

(56) References Cited

U.S. PATENT DOCUMENTS

| | | | |
|---|---|---|---|
| 4,866,599 A | 9/1989 | Morganti | |
| 5,557,766 A | 9/1996 | Takiguchi | |
| 5,666,510 A * | 9/1997 | Mitsuishi et al. | 711/220 |
| 5,778,220 A | 7/1998 | Abramson et al. | |
| 6,029,222 A | 2/2000 | Kamiya | |
| 6,088,783 A | 7/2000 | Morton | |
| 6,564,283 B1 * | 5/2003 | Ahn | 711/2 |
| 6,598,151 B1 | 7/2003 | Laurenti | |
| 6,651,160 B1 * | 11/2003 | Hays | 712/210 |
| 6,654,871 B1 | 11/2003 | Aidan | |
| 6,742,113 B1 | 5/2004 | Yamada | |
| 6,807,622 B1 * | 10/2004 | McGrath | 712/210 |
| 6,904,517 B2 | 6/2005 | Nevill et al. | |
| 7,130,951 B1 | 10/2006 | Christie et al. | |
| 2003/0221091 A1 | 11/2003 | Henry et al. | |
| 2005/0102458 A1 | 5/2005 | Ober et al. | |
| 2005/0172109 A1 | 8/2005 | Catherwood | |
| 2007/0006200 A1 | 1/2007 | Renno et al. | |
| 2007/0266374 A1 | 11/2007 | Grisenthwaite | |
| 2012/0036341 A1 | 2/2012 | Morfey et al. | |

FOREIGN PATENT DOCUMENTS

| | | |
|---|---|---|
| JP | 59-60645 A | 4/1984 |
| JP | 2000250762 A | 9/2000 |
| WO | WO-02097612 A | 12/2002 |
| WO | WO-2007/147443 A1 | 12/2007 |
| WO | WO-2008122746 A1 | 10/2008 |

OTHER PUBLICATIONS

"U.S. Appl. No. 13/003,432, Non Final Office Action mailed Apr. 25, 2013", 23 pgs.
"U.S. Appl. No. 13/003,432, Response filed Oct. 28, 2013 to Non Final Office Action mailed Apr. 26, 2013", 19 pgs.
"International Application No. PCT/GB2009/001309, International Search Report and Written Opinino issued Nov. 27, 2009", (Nov. 27, 2009), 16 pgs.
"International Application No. PCT/GB2009/001309, International Search Report mailed Nov. 27, 2009", (Nov. 27, 2009), 4 pgs.
"International Application No. PCT/GB2009/001309, Written Opinion of the International Search Authority mailed Nov. 27, 2009", (Nov. 27, 2009), 9 pgs.
"United Kingdom Application Serial No. GB0812662.5, British Search Report issued Mar. 20, 2009", (Mar. 20, 2009), 4 pgs.
"U.S. Appl. No. 13/003,432, Response filed Jan. 8, 2016 to Final Office Action mailed Jul. 8, 2015", 23 pgs.
"U.S. Appl. No. 13/003,432, Non Final Office Action mailed Jun. 23, 2016", 17 pgs.
"Chapter 3—Basic Execution Environment", *Intel Architecture Software Developer's Manual*, vol. 1, [online]. Retrieved from the internet: <URL: http://dowload.intel.com/design/PentiumII/manuals/243192.htm, (1999), pp. 3.1-3.16.
"Chapter 5—Data Types and Addressing Modes", *Intel Architecture Software Developer's Manual*, vol. 1, [online]. Retrieved from the Internet: <URL: http://download.intel.com/design/PentiumII/manuals/243192.htm>, (1999), pp. 5-1-5.12.
"Great Britian Application Serial No. GB0706918.0, Search Report dated Jul. 27, 2008", 1 pg.
"Great Britian Application Serial No. GB0706918.0, Search Report dated Jul. 18, 2007", 2 pgs.
"International Application Serial No. PCT/GB2007/001323, International Search Report mailed Jan. 24, 2008", 5 pgs.
McLellan, E., "The Alpha AXP Architecture and 21064 Processor", *IEEE Micro*, vol. 13, No. 3, (1993), 36-47.
U.S. Appl. No. 13/003,432, Non Final Office Action mailed Nov. 13, 2014, 41 pgs.
U.S. Appl. No. 13/003,432, Response filed May 13, 2015 to Non Final Office Action mailed Nov. 13, 2014, 24 pgs.
"OS Organization", [Online]. Retrieved from the Internet: <http://www.inf.unideb.hu/~fazekasg/oktatas/G_Nutt/C3.pdf>, (Nov. 20, 20014), 1-17.
Clements, Alan, "Principles of Computer Hardware", Oxford University Press Fourth edition, (Jan. 18, 2006), 547-568.
"U.S. Appl. No. 13/003,432, Response filed Jun. 18, 2014 to Final Office Action mailed Dec. 18, 2013", 19 pgs.
"U.S. Appl. No. 13/003,432, Final Office Action mailed Jul, 8, 2015", 38 pgs.
"U.S. Appl. No. 13/003,432, Preliminary Amendment filed Jan. 10, 2011", 16 pgs.
"U.S. Appl. No. 13/003,432, Supplemental Preliminary Amendment filed Sep. 1, 2011", 9 pgs.
"ARM Developer Suite Developer Guide", ARM Limited, version 1.2, [retrieved from the internet on Jun. 26, 2015], retrieved from URL <http://infocenter.arm.com/help/topic/com.arm.doc.dui0056d/DUI0056.pdf>, (Nov. 2001), 226 pages.
"PL310 Cache Controller", ARM Limited, version r0p0, [retrieved from the internet on Jun. 29, 2015], retrieved from URL <http://infocenter.arm.com/help/topic/com.arm.doc.ddi0246a/DDI0246AJ2ccjDI310_r0p0_trm.pdf>, (Nov. 2007), 148 pages.

* cited by examiner

XAP5 - Programmers Model

| | Operational or Current Registers | Shadow Registers : User, Privileged (Supervisor, Interrupt, Exception) | Assembler Syntax |
|---|---|---|---|

Normal Registers — 15 ... 0

| | | | |
|---|---|---|---|
| Return Value, Function Argument 0 | R0 | | %r0 |
| Function Argument 1 | R1 | | %r1 |
| Function Argument 2 | R2 | | %r2 |
| Function Argument 3 | R3 | | %r3 |
| | R4 | | %r4 |
| | R5 | | %r5 |
| | R6 | | %r6 |
| | R7 | | %r7 |

Address Registers — 23 ... 1 0

| | | | |
|---|---|---|---|
| Program Counter | PC \| F | | %pc |
| Stack Pointer | SP (current) \| 0 | = 2 Shadow Registers (U, P) | %sp, %sp_u, %sp_p |

Special Registers — 15 ... 0

| | | | |
|---|---|---|---|
| Flags | FLAGS | | %flags |
| Information (read-only) | INFO | | %info |
| Breakpoint Enable | BRKE | | %brke |

Breakpoint Registers — 23 ... 0

| | | | |
|---|---|---|---|
| Breakpoint 0 | BRK0 | | %brk0 |
| Breakpoint 1 | BRK1 | | %brk1 |
| Breakpoint 2 | BRK2 | | %brk2 |
| Breakpoint 3 | BRK3 | | %brk3 |

Register Encodings

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| FLAGS | P3 | P2 | P1 | P0 | S3 | S2 | S1 | S0 | I | | M1 | M0 | V | C | N | Z |
| INFO | | | | | | | | | | | | | | | NE | NL |
| BRKE | | E3 | R3 | W3 | E2 | R2 | W2 | E1 | R1 | W1 | | E0 | R0 | W0 | | |

Fig. 8

DATA PROCESSING APPARATUS WITH INSTRUCTION ENCODINGS TO ENABLE NEAR AND FAR MEMORY ACCESS MODES

PRIORITY CLAIM TO RELATED APPLICATIONS

This application is a national stage application under 35 U.S.C. §371 of PCT/GB2007/001323, filed Apr. 10, 2007, and published as WO 2008/122746 A1 on Oct. 16, 2008, which application and publication are incorporated herein by reference and made a part hereof in their entirety, and the benefit of priority is claimed thereto.

The present invention relates to a data processing apparatus. This invention also relates to a semiconductor device and to a processor for use in embedded systems.

Near Mode Processor

According to one aspect of the invention, there is provided a data processing apparatus including a processor adapted to operate under control of program code comprising instructions selected from an instruction set, the apparatus comprising a predefined memory space providing a predefined addressable memory or predefined addressable space, preferably a plurality of predefined addressable memories or spaces, for storing program code and data (or just data), and preferably further providing a plurality of Input/Output (I/O) registers, a larger memory space providing a larger addressable memory, preferably a plurality of larger addressable memories, means (in the form of a processor and associated circuitry) for accessing program code and data within the predefined memory space, and means (in the form of a processor and associated circuitry) for controlling the access means so as to enable the access means to access program code located within the larger memory space.

In this way the processor can employ a simple architecture with a smaller data space and yet still access a larger code space, which accommodates larger applications.

Preferably, the predefined memory space is a sub-portion of the larger memory space.

Preferably, the sub-portion of the memory space is defined from the first addressable memory location of the larger memory space.

Preferably, the predefined memory space and the larger memory space are accessible via a contiguous set of memory addresses.

Preferably, the processor comprises a Von Neumann architecture. More preferably, the processor comprises a load-store architecture. Yet more preferably, the processor is a RISC (reduced instruction set) processor.

A Von Neumann architecture is one in which the code and data reside in the same memory address space, as opposed to a Harvard architecture where they reside in separate memory address spaces.

Thus, in one example, a 16-bit Von Neumann processor is provided that can efficiently access greater than 64 kB of program memory, but in which the size of the data memory is limited to 64 kB, since 64 kB is normally sufficient for data memory. This creates a smaller system (especially preferably using a smaller number of bytes of Random-Access Memory (RAM)) than an equivalent 32-bit system which would normally be used when more than 64 kB of memory is required.

Preferably, the processor has an n-bit data width and an address width which is greater than n-bits in width.

Preferably, the processor is an n-bit processor having an n-bit architecture and wherein the addressing means comprises at least one address register having an address width which is greater than n-bits, and, preferably, if there are greater than one address register, all address registers have the same width. An address register is preferably a programmer visible register dedicated to holding addresses (as opposed to data, status, or configuration) with the exception that it may contain processor configuration bits in register bits made redundant by instruction or data object alignment rules.

Preferably, the apparatus further comprises a greater than n-bit program counter register.

Preferably, the apparatus further comprises a greater than n-bit memory stack, and/or a greater than n-bit stack pointer or pointer register.

Preferably, the processor includes a number of n-bit general purpose registers.

Preferably, the processor includes an n-bit data bus.

Preferably, the program code is optimised to execute on an n-bit processor.

Preferably, data pointers are stored within n-bit registers or, preferably, each data pointer may be stored within a single n-bit register.

Preferably, the access means is adapted to use the contents of a single n-bit register as a base address of width n-bits that is used with a plurality of addressing modes to form a data address.

Preferably, function pointers are stored within a memory space occupying greater than n-bits or, preferably, each function pointer may be stored within a memory space and when so stored occupies greater than n-bits.

Preferably, function pointers are stored within n-bit register pairs, or, preferably, each function pointer may be stored within an n-bit register pair.

Preferably, the processor is an 8-bit (n=8), 16-bit (n=16) or 32-bit (n=32) processor, and more preferably a 16-bit processor.

Preferably, the address registers are 16-bits, 24-bits, 32-bits or 64-bits wide, and more preferably 24-bits wide.

Preferably, the processor includes instructions for performing arithmetic and logical data operations on n-bit data with each operand to the operation stored in a single n-bit register.

Preferably, the processor includes instructions for performing arithmetic and logical data operations on 8-bit or 1-bit wide data with each operand to the operation stored in a single n-bit register.

Preferably, the processor includes instructions for performing arithmetic and logical data operations on (2n)-bit wide data with each operand to the operation stored in a pair of n-bit registers.

Preferably, the processor includes instructions for loading n-bit data from the predefined memory space into a single n-bit register, and/or for storing n-bit data from a single n-bit register to the predefined memory space.

Preferably, the processor includes instructions for loading 8-bit data from the predefined memory space into a single n-bit register, and/or for storing 8-bit data from a single n-bit register to the predefined memory space.

Preferably, the processor includes instructions for loading (2n)-bit data from the predefined memory space into a pair of n-bit registers, and/or for storing (2n)-bit data from a pair of n-bit registers to the predefined memory space.

General purpose registers are preferably programmer visible registers that can hold data or address values upon which Arithmetic Logic Unit (ALU) and logical operations can be performed, and that can be loaded from memory and stored to memory.

An n-bit processor is preferably one with n-bit general purpose registers, n-bit wide data bus, and an ALU that supports a preponderance of n-bit operations and optionally supports some ALU operations on data wider or narrower than n-bits.

As used herein, the terms "memory", "store" and "register" may be used interchangeably, unless the context otherwise demands.

Far Mode Processor

Preferably, the control means is adapted to enable the access means to access data located within the larger memory space.

Preferably, the control means comprises means for increasing the data address width, more preferably to be greater than n-bits.

Preferably, the access means is adapted to read from and/or write data to or from memory, preferably to the larger memory space.

Preferably, the processor is an n-bit processor, and the access means is adapted to read from and/or write data (wherein said data preferably represents an address) to or from an n-bit register pair, or preferably the access means is adapted to use the contents of an n-bit register pair as a base address of width greater than n-bits that is used with a plurality of addressing modes to form a data address.

Preferably, the processor is an n-bit processor, and data pointers are stored within a memory space occupying greater than n-bits.

Preferably each data pointer may be stored within a memory space and when so stored occupies greater than n-bits.

Preferably, data pointers are stored within n-bit register pairs.

Preferably each data pointer may be stored within an n-bit register pair.

Preferably, the processor includes instructions for loading n-bit data from the larger memory space into a single n-bit register, and/or for storing n-bit data from a single n-bit register to the larger memory space.

Preferably, the processor includes instructions for loading 8-bit data from the larger memory space into a single n-bit register, and/or for storing 8-bit data from a single n-bit register to the larger memory space.

Preferably, the processor includes instructions for loading (2n)-bit data from the larger memory space into a pair of n-bit registers, and/or for storing (2n)-bit data from a pair of n-bit registers to the larger memory space.

Switching Between Near and Far Mode

Preferably, the apparatus further comprises means (in the form of circuitry) for switching the processor from a first operating configuration (a near mode) in which the controlling means is adapted to enable the access means to access data located within the predefined memory space to a second operating configuration (a far mode) in which the controlling means is adapted to enable the access means to access data located within the larger memory space.

Choosing Near and Far Data Accesses

Preferably, the instruction set comprises at least one instruction adapted to access data located within the predefined memory space and a corresponding instruction adapted to access data located within the larger memory space.

Preferably, the instruction and the corresponding instruction comprise load and/or store instructions.

Preferably, the instruction is adapted to be passed n-bit operands. More preferably, the corresponding instruction is adapted to be passed 2n-bit operands.

Preferably, the instruction is adapted to address a single memory register. More preferably, the corresponding instruction is adapted to address a pair of registers.

More preferably the register is n-bits wide.

Preferably, the processor includes both instructions for performing data load and store operations using a single n-bit register as the base address for accessing the predefined memory space ("near access"), and instructions for performing data load and store operations using a pair of n-bit registers as the base address for accessing the larger memory space ("far access"), such that preferably assembler programmers or sophisticated compilers might mix near accesses and far accesses in the same program or system.

Preferably, a compiler, assembler, linker toolchain for the processor will be provided with a configuration option allowing the programmer to specify that programs or specific program modules should be compiled using only near accesses or only far accesses.

Optimising Use of Short Instruction Encodings with a Near and a Far Mode/Short Instruction Encodings Preferably, the processor is an n-bit processor and the short instruction encodings are n-bits in length.

Preferably, the processor is an n-bit processor and the long instruction encodings are 2n-bits in length.

Preferably, the instruction set comprises a mixture of both short and long instruction encodings.

Preferably, both short and long encodings are provided for the majority of the instructions.

Preferably, the processor is an n-bit processor and the short instruction encodings are n-bits or 16-bits in length.

Preferably, the processor is an n-bit processor and the long instruction encodings are 2n-bits or 32-bits in length.

Preferably, the processor is adapted to execute short instruction encodings when operating in either of the operating configurations.

Preferably, the apparatus further comprises means (in the form of circuitry) for switching the processor from a first operating configuration (a near mode) in which a subset of the short instruction encodings are used to encode memory access instructions that perform near accesses, to a second operating configuration (a far mode) in which the same or substantially same said subset of the short instruction encodings are used to encode memory access instructions that perform far accesses.

Preferably, regardless of the configuration of the processor in near mode or in far mode, memory access instructions that perform near access and memory access instructions that perform far accesses are always available via long instruction encodings.

Preferably, a long instruction encoding of an instruction provides for wider immediate data operands or immediate offset operands or other types of immediate operands within the instruction than corresponding operands in corresponding short instruction encoding.

Preferably, there are two types of load and store instructions according to the addressing mode used: one type (e.g. lds) uses two registers to form an address (indexed addressing), and the other type (e.g. ld.i) uses a single register and an offset (displacement addressing).

Preferably, there are two types of load and store instructions according to whether operating in near mode (e.g. ld.i) or far mode (e.g. ld.fi).

Preferably, there are four types of load instructions ld.i, ld.fi, lds and ld.fr.

Preferably these appear in three versions for accessing 8 and 16 and 32 bit data.

Preferably the 16-bit encodings of ld.i and ld.r map to instructions for performing memory access to the first 64 kB of memory using addresses held in a single register.

Preferably the 16-bit encodings of ld.fi and ld.fr map to instructions that allow memory access to the entire 24-bit address space using addresses held in register pairs.

Preferably there are corresponding store instructions st.i, st.fi, st.r and st.fr.

Preferably, near and far load instructions are always available, regardless of whether in near or far mode.

Preferably a compiler, assembler, linker toolchain for the processor is provided with a configuration option allowing the programmer to specify that programs or specific program modules should be compiled using the assumption that the processor is configured in near mode, or the assumption that the processor is configured in far mode, and use or not use the short instruction encodings for near accesses and far accesses appropriately for that processor configuration.

Preferably a compiler, assembler, linker toolchain for the processor is provided that chooses between a short encoding or a long encoding of the same instruction, when the processor configuration is such that it provides both encodings, by examining the width of the immediate operands and choosing the short instruction encoding if it can support the required width of the immediate operand, and only choosing the long instruction encoding if it can not.

Preferably a compiler, assembler, linker toolchain for the processor is provided with a configuration option allowing the programmer to specify that the final code image should include instructions or configuration information that configures the processor into Near mode or Far mode at or soon after the start of program execution following reset.

Preferably the programs or specific program modules can therefore be optimised, preferably by optimising the instruction set, preferably during compilation, for whether the processor is to operate in near or far mode.

Dynamic Switching Between Near and Far Modes

Preferably, the switching means is adapted to dynamically switch between the first and second operating configurations.

Preferably, the switching means is adapted to switch between the first and second operating configurations during the execution of program code on the processor.

Preferably, the switching means is adapted to switch between the first and second operating configurations in real-time. In another embodiment, the switching means is adapted to switch between the first and second operating configurations by software executing one of a subset of the instructions in the instruction set, said subset comprising instructions which cause a data bit to be written to a near-far mode configuration bit explicitly or as an implicit side effect.

Preferably, the switching means is adapted to switch between the first and second operating configurations by modifying the contents of the near-far mode configuration bit in response to reset, or during the event handler entry sequence in response to a trap, interrupt, or exception.

Use of Redundant Bit in Program Counter (PC) to Control Switching Between Near and Far Mode In an embodiment, the apparatus switches between the first and second configuration in dependence upon the state of a redundant bit provided within an address register.

Preferably, the near-far mode configuration bit is stored in a redundant bit provided within an address register.

Preferably, the setting of the bit switches the apparatus to the second configuration, and wherein the clearing of the bit switches the apparatus to the first configuration.

Preferably, the bit is cleared upon reset.

Preferably, the default operating configuration is the first configuration.

Preferably, the redundant bit is provided in the program counter register.

Preferably, the near-far mode configuration bit stored in a redundant bit in the program counter register is stored in memory, including on the stack, along with the other program counter register bits whenever the program counter is saved to allow a later return to the current execution point, in response to a subroutine call or event handler entry sequence.

Preferably, the near-far mode configuration bit stored in a redundant bit in the program counter register is loaded from memory, including from the stack, along with the other program counter register bits whenever the program counter is loaded from memory.

Preferably, the near-far mode configuration bit stored in a redundant bit in the program counter register is transferred to, or loaded from a general purpose register bit whenever the other program counter register bits are transferred to, or loaded from general purpose register bits.

Preferably, the access means is adapted to address program code using byte-aligned addressing, or using word-aligned addresses.

Preferably (indeed in any aspect), the apparatus further comprises means for accessing a stack memory structure, preferably a stack structure stored in memory, and the controlling means is adapted to enable the access means to access the stack within the predefined memory space when in the first operating configuration, or within the larger memory space when in the second operating configuration.

Function Pointers via Indirection Table

Preferably, the processor is an n-bit processor, and wherein the apparatus further comprises means for storing larger than n-bit function pointers within the predefined memory space.

Preferably, the function pointers are stored in a table of 2n-bit function pointers to stored functions.

Preferably, the access means is adapted to access the function pointers using an n-bit pointer.

This may improve efficiency since GNU C and C++ (GCC) compilers cannot easily handle data pointers of a different width to code pointers.

It should also be noted that in C programs data pointers are used extensively and function pointers are used rarely and that the range of operations on function pointers is severely limited by the C language specification. Thus, being able to store data pointers in 16-bits adds to the efficiency of the processor system for the following reasons: it reduces RAM use (e.g. when a data pointer is allocated on the stack as a local variable); it reduces memory bandwidth and power consumption when loading and storing pointer values to/from memory; and it reduces the number of registers (or register bits) required to store the pointer.

Preferably, the apparatus is suitable for use in an embedded system.

According to another aspect of the invention, there is provided a semiconductor device which comprises an apparatus as herein described.

Preferably, the semiconductor device is in the form of an ASIC (application specific integrated circuit).

Preferably, the apparatus is formed on the semiconductor device at the time of chip fabrication to form an ASIC (application specific integrated circuit), standard product chip, SOC (system on chip), etc.

Preferably, the semiconductor device is in the form of an FPGA (field programmable gate array).

According to another aspect of the invention, there is provided a semiconductor device as herein described which further comprises processors and/or circuitry defining a memory, a memory management unit, input/output ports and an interrupt controller.

According to a further aspect of the invention, there is provided an instruction set which comprises processor instructions adapted to be executable on an apparatus as herein described. Preferably, the instruction set comprises instructions adapted to operate when the apparatus is in a first operating configuration in which data may be accessed from within the predefined memory space, and instructions adapted to operate when the apparatus is in a second operating configuration in which data may be located within the larger memory space.

According to another aspect of the invention, there is provided a method of producing executable instructions from program code, the executable instructions being suitable for execution on an apparatus as herein described, the method comprising determining whether a particular segment of program code is to be executed on the apparatus in the first operating configuration or the second operating configuration, and optimising the production of the executable instructions in dependence on the operating configuration in which the instructions are to be executed.

Preferably, the instructions comprise both short and long instruction encodings and the optimisation step involves producing executable instructions based on short instruction encodings in preference over long instruction encodings.

TIE (Trap, Interrupt or Exception) Event Handling

As used herein, "traps" are preferably internal events triggered by an action inside the processor core. "Interrupts" are preferably special events triggered by an action outside the processor core, for example by a timer reaching its terminal count, or by a serial port receiving a character. "Exceptions" preferably occur when the processor detects programming errors. Traps and Exceptions are fixed properties of the processor.

Thus, according to another aspect of the invention there is provided apparatus comprising a processor configured for operation under a sequence of instructions from an instruction set, wherein said processor comprises: means for conditionally inhibiting at least one type of trap, interrupt or exception (TIE) event, wherein, when operating under a sequence of instructions, said inhibition means is inaccessible by said instructions to inhibit the or each type of TIE event, without interrupting said sequence.

Said processor is preferably adapted to configure said inhibition means to inhibit the or each type of TIE event during processor initialisation.

Preferably said processor is adapted to configure said inhibition means to allow the or each type of TIE event only after a (privileged) stack is initialised preferably by a write to a stack pointer for said stack. Said instruction set may comprise at least one instruction execution of which configures said inhibition means to allow the or each type of TIE event.

Said processor may be adapted to configure said inhibition means to inhibit the or each type of TIE event on a reset of said processor.

Preferably said processor is adapted to configure said inhibition means to inhibit the or each type of TIE event when a particular type of TIE event is initiated. Said initiated TIE event may be an interrupt type event and more specifically may be a non-maskable interrupt type event.

Said processor is preferably adapted to configure said inhibition means to allow the or each type of TIE event when the initiated TIE event has completed processing.

Preferably said instruction set comprises a return from TIE (rtie) instruction for execution during processing of the initiated TIE event to resume processing of said sequence of instructions when a TIE event has completed processing. Execution of said rtie instruction may configure said inhibition means for allowing the or each type of TIE event. Said instruction set may comprise a single rtie instruction for returning from all types of TIE event.

The inhibition means preferably comprises a portion of memory or a read-only register, the contents of which determines whether the or each type of TIE event should be inhibited or allowed. The memory portion or read-only register may comprise an enable field having a first condition in which the or each type of event is inhibited (disabled) and a second condition in which the or each type of event is allowed (enabled).

Said processor is preferably configured to set said enable field to said disabled condition on a reset of said processor, may be configured to set said enable field to said enable condition on initialisation of a (privileged) stack preferably by a write to a stack pointer for said stack and/or may be configured to set said enable field to said enable condition on execution of an instruction from said instruction set.

Preferably, the processor is configured to determine whether the processing of a TIE event may itself be interrupted by other events.

Preferably said memory portion or read-only register further comprises a lock field having a first condition in which the or each type of event is allowed (unlocked) and a further condition in which the or each type of event is inhibited (locked). Said processor is preferably configured to set said lock field to said unlocked condition on a reset of said processor, and/or may be configured to set said lock field to said unlocked condition on execution of an instruction from said instruction set which may be a return from TIE instruction (rtie). Said processor may be configured to set said lock field to said locked condition only when a TIE event is initiated, may be configured to set said lock field to said locked condition only when an interrupt event is initiated and/or may be configured to set said lock field to said locked condition only when a non-maskable interrupt event is initiated.

Said instructions from said instruction set are preferably incapable of writing to said portion of memory or read-only register to inhibit the or each type of TIE event, without interrupting said sequence of instructions. Said instruction set may include an instruction capable of writing to said portion of memory or read-only register to allow the or each type of TIE event.

Said inhibition means is preferably configured to conditionally allow or inhibit only a single type of TIE event.

Preferably the at least one type of TIE event conditionally inhibited is an interrupt type and more preferably a non-maskable interrupt (NMI) type.

Preferably the at least one type of TIE event is conditionally inhibited (or allowed) according to a priority, a lower priority type event preferably being inhibited if a higher priority type event is being processed. Exception type events may have a higher priority than a first type of interrupt event which may be a maskable type of interrupt event. Exception type events may have a lower priority than a second type of interrupt event which is preferably a non-maskable type of interrupt event. Non-maskable type interrupt events preferably have a higher priority than all other type TIE events.

An interrupt type event may be determined to be a non-maskable type if said interrupt event has an interrupt number from a first group and may be determined to be a maskable type if said interrupt event has an interrupt number from a second group.

If an event is inhibited it may be pooled to be processed later or it may be simply ignored. The or each said TIE event of a particular type may be inhibited (or allowed) according to a priority number, a lower priority event being inhibited if a higher priority event is being processed. Said priority number may be stored in a field of a register.

An attempt to invoke a further event whilst processing a non-maskable interrupt type event may cause a reset preferably a soft-reset. The further event may be caused by a software interrupt (swi) instruction or may be an exception type event.

Preferably the processor is provided with a single interrupt request (IRQ) for triggering (maskable and non-maskable) interrupt type events.

The processor may be configured to (self) reset on detection of a trap, interrupt or exception (TIE) event of a second type nested in an event of a first type.

Reset on Nesting

According to another aspect of the invention there is provided apparatus comprising a processor configured for operation under a sequence of instructions from an instruction set, wherein said processor is configured to (self) reset on detection of a trap, interrupt or exception (TIE) event of a second type nested in an event of a first type.

The first and second event types may be the same type. The second type may be an exception type of TIE event, may be an interrupt type of TIE event, or may be a trap type of TIE event. The trap type of TIE event may be an attempted execution of an interrupt instruction from said instruction set which may be a software interrupt instruction (swi).

The first event type may be an exception type of TIE event, may be an interrupt type of TIE event, may be a non-maskable interrupt type of TIE event, or may be a context push type event. The context push type event may comprise saving a processor state onto a stack in response to accepting a TIE event. The first type of event may be a context pop type event which may comprise reading a stack during a return from a TIE event (for example, during execution of an rtie instruction).

The TIE event of said first type may itself be nested within a further event.

Preferably said processor is configured to self-reset in response to a TIE event which would cause nesting of at least a predetermined depth. Said depth may comprise a third level of nesting. Preferably only events of at least one predetermined type are deemed to increase the nesting depth. Said predetermined type may be an exception type.

Said processor is preferably configured to determine said depth to be a first level of nesting if said TIE event is invoked when said processor is not in a mode corresponding to said TIE event. Said processor may be configured to determine said depth to be a second or subsequent level of nesting if said TIE event is invoked when said processor is in said corresponding mode. An indicator of the nesting level (or depth) of the current TIE event being handled may be stored in a register. Said indicator may be stored at a location in said register said location serving a different purpose in a different processor mode.

In response to a trap, interrupt, or exception event said processor is configured to enter a respective one of a supervisor, interrupt or exception mode.

Said self reset may be a soft reset. At least part of the status of the processor may be retained (preferably in at least one register) for access after said reset. An indicator of the cause of said reset may be stored (preferably in at least one bit of a register) to be accessable after said reset. A (status) indicator that the reset has occurred may be stored, (preferably in at least one bit of a register), to be accessable after said reset. Said (status) indicator may be stored in one of a general purpose or a special (for example, a status or info) register.

Preferably said reset causes said processor to output a hardware signal indicating said reset has occurred.

Said apparatus preferably comprises a further component, wherein said signal triggers a return (for example, a reset) of said component to a known state. Said signal may trigger a re-initialisation of a system the apparatus forms part of. Said signal may trigger a system the apparatus forms part of to reconfigure to use a different processor.

Preferably, the data processing apparatus is implemented in a single semiconductor device, integrated circuit or microchip (chip).

The term "semiconductor device" as used herein is preferably intended to connote an ASIC or FPGA implemented in silicon or germanium or gallium-arsenide or some other semiconductor material. The semiconductor device is also referred to as a chip.

The development of microprocessors has evolved in close relationship with the evolution of silicon microchip (chip) manufacturing technology and related packaging technology. The doubling of the number of transistors on a chip roughly every 18 to 24 months, (Moore's Law), and a lowering of cost-per-pin in chip packaging, has enabled the performance in microprocessors to increase through various generations from 4-bit and 8-bit microprocessors through to 16-bit, 32-bit, and 64-bit microprocessors. Each new generation has provided higher performance levels, through the use of wider on-chip and off-chip buses, wider registers and ALUs allowing instructions to directly and quickly process wider binary integers, and larger address spaces.

Different applications require different performance levels, for example 64-bit microprocessors are common in servers, and in some desktop applications. For embedded systems a range of microprocessors are employed, from 4-bits through to 64-bits depending on the application, with many embedded system designs using 16-bit or smaller microprocessors due to their lower die size and system cost.

Early 8-bit microprocessors generally performed 8-bit arithmetic on 8-bit registers, or 16-bit arithmetic on pairs of 8-bit registers. Registers dedicated to holding addresses, such as a stack pointer or program counter, were dedicated 16-bit registers that could drive the 16-bit address bus. The address space for programs and data was limited to a 16-bit byte addressable space, giving access to $2^{16}$ bytes, which is 64 kBytes. The internal and external data buses are 8-bits wide, and reading an object larger than 8-bits from memory required multiple 8-bit memory reads.

In 16-bit processors, data buses, registers, and ALUs (arithmetic logic units) are all 16-bits wide, while the address space remains at 16-bits, i.e. the range addressable by a 16-bit register. Having the address width the same width as the data width allows a single general-purpose register to hold an address or a data item, and allows address values to be saved to memory with a single memory access.

However, the 16-bit address space of 8-bit and 16-bit processors may be limiting, since they cannot address more than 64 kBytes of memory. One solution to this is to provide a banked memory, where several different memory chips are mapped so as to appear to be in the same range of addresses, and software enables the addressing of a particular memory block as required. Another solution is to implement a segmented memory scheme within the processor which maps the current 64 kByte "logical" address space onto a larger physical address space. However, these solutions create complexity for the programmer and for software compilers and linking tools, since they require the memory in a system with more than 64 kBytes of memory to be divided into a number of chunks that each fit into a 64 kByte block. The programmer than is required to control the switching between these different memory blocks. It may also be more complex for code in one chunk to access data or code in a different chunk. Additional logic gates are also often required in order to implement such processors. The performance of such chips may also be reduced, since additional logic is often required in the path between the program counter and the address pins of the memory chips.

A further method of gaining a large "flat" address space, which does not involve the possible complexities of segmented or banked memory schemes, is to move to a 32-bit processor which has 32-bit data paths, 32-bit registers, and a flat 32-bit address space that can access up to 4 GBytes. However, such processors are more costly due to the larger number of transistors in the microprocessor and may lead to an unnecessary increase in the RAM width and number of RAM bits.

It should be noted that the vast majority of code, even in embedded systems, is written in a high level language and compiled to machine code. C and C++ are the dominant languages used in embedded systems. Thus, architectural features that make a microprocessor an effective target machine for a C or C++ compiler may be beneficial.

For many embedded systems it is suitable to have an integer equal to 16-bits since ADCs (analogue to digital converters) normally sample at less than or equal to 16-bits. Thus, since most variables can be stored in 16-bits or less, a 16-bit processor architecture employing 16-bit integers is sufficient. For the small proportion of data items that need variables of greater than 16-bits the processor supports the use of register pairs to hold 32-bit values, and C programmers can specify the "long int" data type. If 32-bit variables are used by default (say in a 32-bit processor) the top 16-bits are often redundant (holding either zero or a sign extension of the low 16-bits). This leads to unnecessarily increased RAM use, 32-bit wide buses, 32-bit wide memory organisation, 32-bit wide registers, and a 32-bit wide ALU.

RISC processor architectures implement load-store architectures where instructions move data and/or instructions from the memory to registers in the CPU (central processing unit), or perform arithmetic or logical operations on data in CPU registers, but not both.

The Free Software Foundation has developed the robust and widely used GNU software development toolchain (including a compiler and a linker). The GNU C and C++ compiler "gcc" supports code generation for many computer architectures, and can be modified to support new architectures.

The term "byte" as used herein is 8-bits in length, and a "word" is 16-bits in length.

Certain C programming language terminology is also used herein, in particular, the following terms are used herein:
"int" or "integer"—the natural signed integer data type for the processor
"pointer"—a variable that holds the address of a data object or function
"data pointer"—a pointer to a data object
"function pointer"—a pointer to a function
"code pointer"—a pointer to a piece of code (generally synonymous with a function pointer, although usually used from the point of view of assembler level programming or the detailed instruction level view of the processors operation).

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

The following documents are hereby incorporated by reference: GB2294137, GB2294138, GB0509738.1, GB2427722, WO9609583 and WO2006/120470.

BRIEF DESCRIPTION OF DRAWINGS

The invention is now described, purely by way of example, with reference to the following drawings, in which:

FIG. 8 shows a programmer's model for the processor.

BRIEF OVERVIEW

Figure 1:
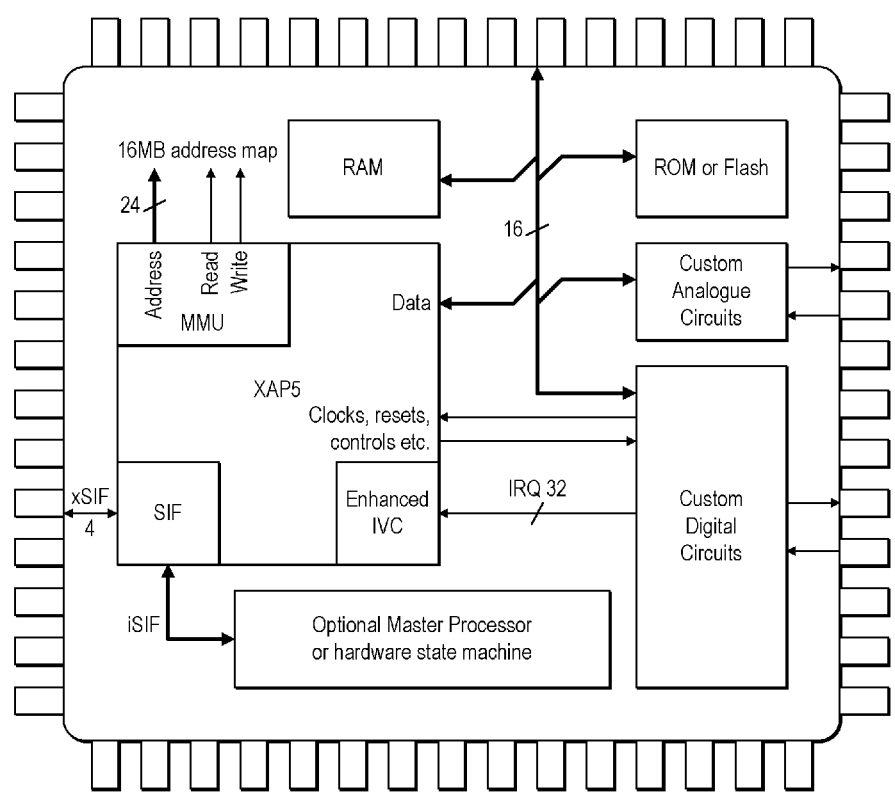
FIG. 1 shows a processor implemented within an ASIC (application specific integrated circuit) semiconductor device.

The processor is first briefly described in overview.
Introduction

The processor is a 16-bit processor which may be, for example, used as the processor core in a traditional chip e.g. ASIC (application specific integrated circuits) or FPGA (field programmable gate array) semiconductor devices. Typical applications include medical devices, automotive and industrial applications, and wireless applications. It is also suitable for high volume applications like Bluetooth, ZigBee, GPS, RFID and Near Field Communications.

The processor is a 16-bit RISC (reduced instruction set) processor with an advanced software toolchain (including a compiler and linker) that efficiently manages 16 MB of memory. In an example, it is implemented in a soft IP core in the Verilog RTL (register transfer level) language.

Although the processor is essentially a 16-bit processor, it is capable of managing a large 16 MB address space for programs, data and peripherals. Thus, it extends the intrinsic 64 kB addressing of a 16-bit processor from 64 kB to 16 MB. Hence, for many applications it can be implemented instead of larger (and more costly) 32-bit processors.

In an example, the processor is implemented using 18,000 gates. Thus, the processor combines relatively small size and low power with high performance. It can often replace a 32-bit core, thus saving power, silicon area, and memory. Significant additional savings result from using 16-bit wide local RAM in place of 32-bit wide local RAM.

One embodiment of the processor has a two-stage pipeline that maximises processing performance at low clock speed. This, combined with its high code density, enables programs to run directly from a Flash memory, hence reducing on-chip RAM.

The processor hardware includes a single-cycle 32-bit shifter, a multi-cycle multiplier (16×16) and a multi-cycle divider (32/16). Instruction fetch, decode and execution is pipelined with most instructions executed in a single cycle.
Performance As mentioned above, the processor is a 16-bit processor that delivers high performance for cost-efficient ASIC designs. A 16-bit data memory is provided, which is sufficient for most applications, and the provision of 16-bit variables can halve the number of bits of data RAM in an ASIC when compared to a 32-bit system. Using a 16-bit wide RAM saves power, silicon area and cost.

The processor features high-density program code with freely mixed 16- and 32-bit instructions that are read onto its 16-bit bus in one or two cycles. Most instructions in the dynamic execution stream are 16-bit. In an example, the processor clocks at 83 MHz on a 130 nm process when it gives 50 Dhrystone MIPS performance, i.e. a benchmark of 0.6 DMIPS/MHz. Or it can be clocked more slowly, at say, 16 MHz, when it could run programs direct from Flash memory and deliver approximately 10 MIPS performance.

The processor uses 24-bit addressing for program code, providing up to 16 MB of program memory. It runs in either "near mode", which is optimized for accessing data under 64 kB, or in "far mode", which is optimized for systems that perform many data accesses above 16 kB. Instructions that allow access to data anywhere in the full 16 MB are available in both modes. C source programs are the same for either mode and they are compiled and assembled according to the amount of data memory they need to allocate. Performance is enhanced in near mode, where most programs operate. However, in the event that far mode is required, the processor runs with only a small reduction in performance.

In an embodiment, programs are the same for either mode and they are assembled and linked according to the amount of data memory they have allocated.

The processor has hardware to support efficient use of the 16-bit instruction encodings is by mapping different instructions to some of the 16-bit encodings in near mode than in far modes, hence resulting in higher code density than if a single fixed set of instructions were assigned to the 16-bit encodings.

In another embodiment, the processor has hardware to support efficient use of the 16-bit instruction space in both near and far modes even when 32-bit data variables are used.

The processor has support for loading and storing 8-bit, 16-bit, and 32-bit data types. The load and store instructions for 32-bit data types write to, or read from register pairs. The load and store instructions for 8-bit and 16-bit data types write to, or read from single registers. It also has instructions devoted to handling single bit data efficiently.

In a first example, the processor is implemented in a two-stage pipelined version, and in a second example, the processor is implemented in three-stage pipelined version. Both examples have the same programming model and only differ in execution speed and the relative timings of some instructions. Using 0.13 µm silicon, the two-stage pipelined version can be synthesised in 18,000 gates, consuming under 0.1 mm$^2$ of silicon, when it will clock at around 70 MHz. Using the same process, the three-stage pipelined version will clock at up to 125 MHz, where it delivers a benchmark performance of 65-70 Dhrystone MIPS.

In one example, both processors are soft IP cores written in Verilog RTL that can be synthesised for ASICs or FPGAs.

The processors also incorporate a serial debug interface (SIF) that provides a non-invasive debug facility capable of fully controlling the processor core and acquiring data from any memory-mapped i/o device. The SIF also provides a system interface that can place the processor under control of another "master" processor, which is used if the processor is implemented within an IP core that is together with another processor within a System on Chip.

In one embodiment, the processor contains hardware support for efficient use of the 16-bit instruction space in both near and far modes, thus achieving high code density in both modes.

Memory is arranged with program execution—typically from ROM or Flash—starting at address 10000 Hex. Constants are stored below this so they can be reached with 16-bit near pointers. Most other data accesses are also achieved with near pointers.

In another embodiment, most other data and program accesses are also achieved with near pointers, including those that hardware automatically re-directs to memory above 64 kB.

Function pointers are most naturally 24-bit values and may be stored in register pairs. Alternatively indirect function pointers may be stored in a single 16-bit register, that points to a 24-bit pointer stored in low memory. Most branch instructions use a 24-bit argument. There may be a slight decrease in performance when 32-bit far pointers are used to access data above 64 kB. However, this is a more economical solution than moving to a 32-bit core.
Processor Architecture The processor comprises eight 16-bit general purpose registers. The processor further comprises certain dedicated 24-bit registers for holding addresses including the stack pointer and program counter. There are four 24-bit break point registers enabling complex debugging. The processor is provided with protected operating modes for robust software operation. There is a mode for running user code and three privileged modes for supervisor, interrupt (maskable and non-maskable) and exception processing code.

The processor includes 185 instructions, which comprise multi-cycle instructions to accelerate C function entry/exit, block copy instructions, block store instructions, and multiply and divide instructions, in addition to typical RISC load, store, ALU, branch, subroutine call, return, etc. A full listing of all the instructions provided in one example of the processor is shown in Appendix A.

The processor also includes an interrupt controller which provides a fast response to real-time events. Certain instructions, and the processor hardware, support nested interrupts, and the processor is adapted to enable registers to be pushed on and/or popped off on the stack during the servicing of interrupt routines. Furthermore, interrupt priorities are assigned by software which provides interrupt entry latency of between 9 and 15 clock cycles depending on the particular instruction currently being executed.

The processor further includes hardware for a single-cycle 32-bit shifter, a multi-cycle multiplier (16×16) and a multi-cycle divider (32/16). Instruction fetch, decode and execution is pipelined with most instructions executed in a single cycle.

The processor is available in both two- and three-stage pipelined versions that have the same programming model and only differ in execution speed and the relative timings of certain instructions.

ASIC System Design

In an example, as shown in FIG. 1, the processor is implemented in a soft IP core written in Verilog RTL intended for ASIC synthesis. Alternatively, the processor can also be synthesised for verification in FPGA. The processor core includes an interrupt vector controller, a serial debug interface (SIF) and a memory management unit (MMU) that is customised to interface with Flash, ROM or RAM memory or memory-mapped peripherals.

In battery operated systems the processor is synthesised for low gate count and slow clock frequency to minimise power consumption. A sleep instruction is also provided which enables the processor to be shut down until it sees a wake-up signal. The processor, including all its registers, the SIF and an MMU, occupies less than 0.09 mm$^2$ of 130 nm silicon, that is, around 18,000 gates. It typically consumes around 26 µW per MHz of dynamic power.

The SIF interface provides a non-invasive debug facility capable of fully controlling the processor core and acquiring data from inside the processor and any memory-mapped peripheral. The SIF uses a high-speed serial interface for external debug access. It also provides an internal system interface that can put the processor under the hardware control of a further (possible on-chip) "master" processor or state machine.

Programming

The processor is able to support complex software systems where high reliability and security are required. C programs may be ported to the processor, which is capable of providing position independent code that allows dynamic linking, byte addressing and unaligned data access to minimise code and data size in memory.

A cross-platform program development and debugging tool is provided for developing program code for the processor. The development tool provides an integrated development environment which enables debugging, and which provides an instruction set simulator, an assembler and linker, and a GCC C compiler for extended ANSI C provides a cross-platform for the processor in both near and far modes. Simulation can also be extended using Python™ scripting to model other parts of an ASIC. The processor also supports Real Time Operating System ports of CMX™ and Micrium™ uC/OS-II, and embedded Linux™.

Memory Model and Architecture

Figure 2:
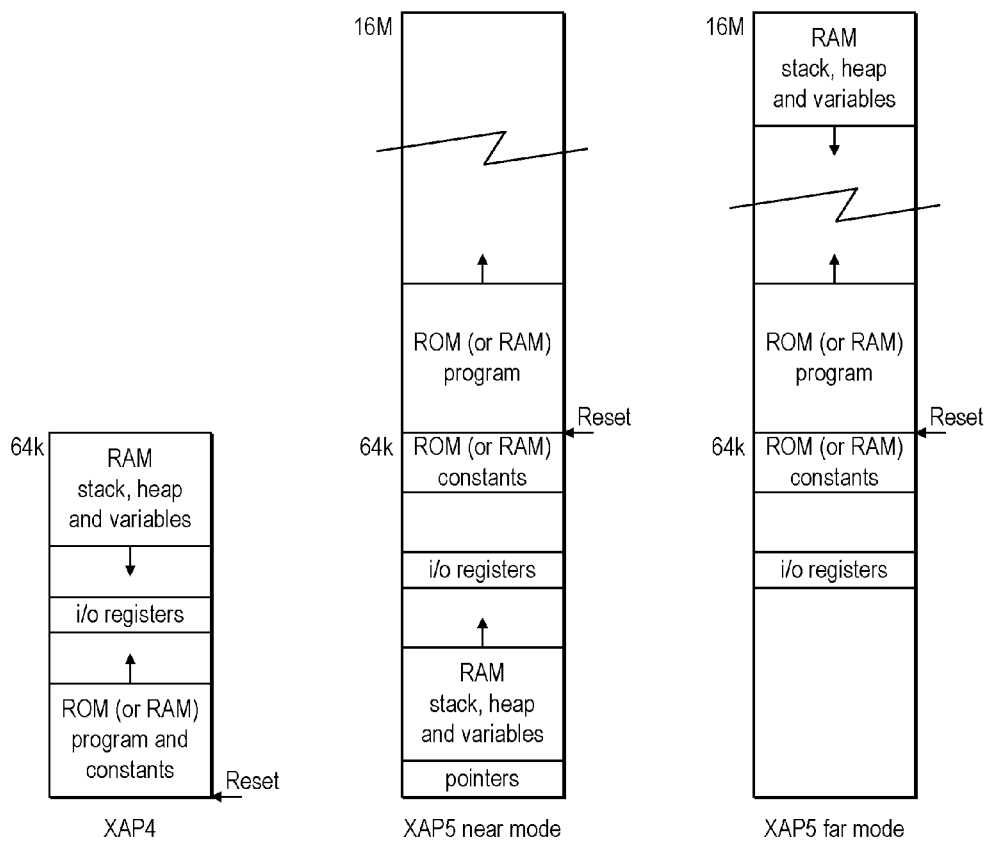
FIG. 2 shows a number of example memory models for the processor.
Figure 3:
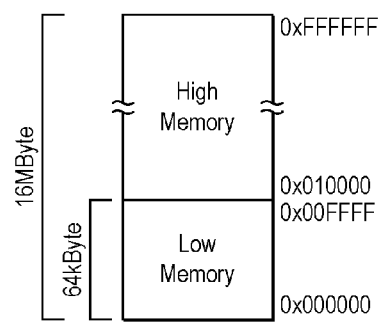
FIG. 3 illustrates the high and low memory spaces accessible by the processor.

Although the processor is essentially a 16-bit processor with a 16-bit architecture, it also includes a 24-bit program counter (PC) and a 24-bit stack pointer (SP), and is capable of addressing a 64 kB memory space as well as a 16 MB memory space. This is illustrated in FIGS. 2 and 3. FIG. 2 also shows a 16-bit processor (XAP4) with a conventional 64 kB memory space. In an example, the processor is a Von Neumann processor in which case the 64 kB memory space falls within the 16 MB memory space (as illustrated in FIGS. 2 and 3).

Thus, the processor is able to perform efficient "near accesses", to data below 64 kB (low memory), or to perform less efficient "far accesses", when data can lie above or below 64 kB, and can be located anywhere within the 16 MB address space (high memory). Near accesses are performed by load or store instructions that use a single general purpose register as a base address when forming the address for the memory access. Far accesses are performed by load or store instructions that use a pair of general purpose registers as a base address when forming the address for the memory access.

When one of the 24-bit registers associated with addresses is used as a base address, for example the stack pointer, far access style assembler mnemonics are used as it indicates to the programmer that the instruction can access the entire 16 MB memory space. Note that in systems with a memory map chosen to hold all data below 64 kB so that near mode accesses can be used for all data access, the stack pointer will be restricted to hold values below 64 kB by software convention, and the same instruction with far access style assembler mnemonics will be used as there is no benefit from implementing a second instruction that only uses the low 16-bits of the stack pointer register when forming addresses.

The use of the 16-bit instruction encodings is optimized by implementing a configuration bit to select between Near mode and Far mode to improve code density and execution time. Switching mode changes which instructions are mapped to the 16-bit encodings. In Near mode, load and store instructions for performing Near accesses are assigned 16-bit encodings. In Far mode load and store instructions for performing Far accesses are assigned 16-bit encodings. A few other instructions also have changed mappings or behaviour when the mode changes (e.g. bra.i, add.i, add.32.i). Note that only a subset of the 16-bit encodings change mapping or instruction behaviour; many that perform e.g. ALU operations have the same mapping and behaviour in both modes. Note also that regardless of the configuration of Near and Far mode, 32-bit forms of the Near access and Far access instructions are always available, so the processor is always capable of accessing both memory spaces. The 32-bit forms of the instructions will also often have wider bit fields for immediate operands, and so may be selected by the assembler when it detects that an immediate operand is too wide for the 16-bit instruction encoding even when the 16-bit instruction encoding is available.

Note that a simple compiler may not be able to make use of mixing Near accesses and Far accesses in the same function or module, while a more sophisticated compiler or assembler programmer could mix Near accesses and Far accesses.

The most common use of the processor is to organise the memory map for all data (constants, variable, I/O registers) to be located in low memory, for the program code to be located in high memory. This memory map allows Near accesses to be performed for all data, and it naturally follows that the processor will be configured in Near mode to optimize the code size and execution speed. It has become common practice to use terminology loosely and describe this as a "Near mode system", when in fact it is a combination of a memory map, a set of software conventions regarding register allocation and calling conventions, the provision of instructions to support Near accesses, and the use of Near mode to optimize the instruction encodings, and when in fact the processor can access data above 64 kB when in Near mode.

The next most common use of the processor is with all accesses performed as Far accesses, the processor configured in Far mode, and a memory map with data not restricted to be in low memory. This would be loosely called a "Far mode system" even though the processor is capable of performing Near accesses in Far mode.

Less common uses of the processor are where Near accesses and Far accesses are mixed in the same system, depending on the location of the data object being accessed. Such systems may be created by assembler programmers, or by compiling program functions or modules separately with different compiler directives, and may become common in the future if a compiler is developed that generates code with a mixture of Near and Far accesses in the same function or module.

In both Near and Far modes program code can be anywhere within the 16 MB memory space.

The processor GCC compiler is provided with a command line flag to specify whether code is to operate in Near or Far mode, and hence C programmers do not need to be concerned about the specific memory access instructions used by the processor or about changing instruction set encodings. Currently the compiler also assumes that if it is generating code in Near mode, the memory map will be one that locates all data below 64 kB.

The processor resets to 10000 Hex and executes program code from 64 kB upward.

In a "Near mode system" 16-bit data pointers that can be held in a single register ("Near pointers") are used for data in RAM, and program memory is arranged to store constants below 64 kB so that these constants may be reached with near pointers. This means that the compiler, linker, assembler toolchain must separate instructions and constants so that even when instructions are located above 64 kB, constants are always below 64 kB.

When generating code with Near accesses, the compiler takes special action on function pointers, using indirect 16-bit pointers that do not point directly to the function in program memory. Instead they point to a special pointers list in low memory, which in turn contains dual-word 32-bit pointers to the functions. This allows function pointers and data pointers to have the same width, even though code has a larger memory space than the data space accessible with Near access, which simplifies the compiler and improves code density and execution time by using fewer registers.

Using Far accesses both program code and data can exceed 64 kB and data and code pointers are generally 32-bits and instructions are provided to use 32-bit pointers stored in register pairs as the base address for load and store instructions. Performance using Far accesses will be reduced as compared to Near accesses since each data pointer is generally stored in two general purpose registers, compared to one for Near accesses, which increases stack operations to free and reload registers. However, this is still an adequate and more economic solution than moving to a 32-bit core for a commercially important range of embedded applications.

DETAILED DESCRIPTION

Introduction

The processor (referred to herein as XAP5, or the XAP5 processor) comprises 8 normal 16-bit registers (R0-R7). However, the address registers, that is, the Program Counter (PC), Stack Pointer (SP), and Breakpoint register are 24-bit.

The associated software toolkit is a generic Integrated Development Environment and runs on most computing platforms.

The processor instruction set and toolkit have been developed together. The instruction set has been optimised to give good code density, leading to low power consumption and low silicon cost. The compile chain is based on the GNU tools, GCC C compiler and the GNU Binutils assembler and linker.

The processor is aimed at CMOS processes from 700 to 65 nm. Clock speeds depend upon the specific hardware implementation and are a trade-off with power consumption. It is expected to run at clock speeds from 10 kHz to 100 MHz. The small hardware implementation contains about 18 k gates with a typical memory manager.

The processor is intended to be used with on-chip RAM (normally 16-bit synchronous) and with on or off-chip Flash (normally 16-bit asynchronous). The default XAP5 Memory Management Unit (MMU) supports 16-bit wide memories.

The processor has 16-bit and 32-bit instruction encodings. These can be freely mixed in any pattern. All instructions are 16-bit aligned. This means that all instructions start at an even address. 32-bit instructions do not have to be 32-bit aligned.

The processor supports 4 operating modes (User, Supervisor, Interrupt, Exception). User mode cannot execute all instructions, is restricted from accessing some registers, and subject to the specific MMU design chosen for a particular chip, and is restricted from accessing privileged memory areas. The Privileged modes (Supervisor, Interrupt, Exception) can execute all instructions, access all registers (although some bits may be read only), and access all memory, subject to the specific MMU design chosen for a particular chip.

The processor has a load-store architecture. It includes debug features as well as a serial interface (referred to herein as SIF). The SIF interface supports up to 8 on-chip processors (provided, for example, within a single semiconductor device, such as an ASIC) and potentially parity-checking.

The processor pushes the PC to the Stack when making a function call, and pops PC from the Stack when returning from a function call.

The processor pushes the (PC, R1, R0, Flags) registers (described in further detail below) to the stack when an event (Trap, Interrupt or Exception) occurs (causing the mode to change to Supervisor, Interrupt or Exception mode respectively), and executing an event handler. Returning from the event handler with the rtie instruction causes the (Flags, R0, R1, PC) registers to be popped from the Stack. Once in the Handler (Software Service Routine) the programmer may preserve any of R0-R7 by using the push or pop instructions (though the R0 and R1 registers have already been preserved).

There are four Breakpoint Registers which are accessible from the privileged modes, and three Special Registers Flags, BRKE, and INFO allow access to internal processor status and configuration bits.

The processor can be used with up to 16 MB of memory. This is accessed using byte addresses (i.e. via a 24-bit address bus) and assumes little endian byte ordering for all data objects or words longer than 8-bits. All data memory or data memory accesses may be unaligned (8, 16 and 32-bit data can have any byte address) except stack pushes and pops which are performed as word aligned word accesses. The memory space from 0 to 64 kB is referred to as Low Memory, and the memory space from 64 kB to 16 MB is referred to as High Memory.

The processor can store a 32-bit variable in a register pair (2 adjacent registers). The processor may also use 32-bit function pointers (used by branch instructions, such as bsr.* and bra.*). The processor has different load and store instructions for so called—"Near" pointers (16-bit Base Address) and for so-called "Far" pointers (32-bit Base Address). Near pointers are stored as 16-bits in a single register. Far pointers are stored as 32-bits in a register pair (though in one example, the maximum physical address supported by the processor is 24-bits). For convenience, such pointers are sometimes referred to as 32-bit pointers reflecting that 32-bits of register space or memory are allocated to store them, even though only 24-bit are used. Note that this means that with small additional cost and size, the machine could be extended to have a 32-bit address space for High memory instead of the current 24-bit address space. Data pointers can be 16-bit or 32-bit. Thus, and as will be described in further detail below, when compiling code for the processor the C compiler used is provided with 2 options:

32-bit function pointers, 16-bit ("Near") data-pointers (resulting in 16 MB of program code, and 64 kB of data)

32-bit function pointers, 32-bit ("Far") data-pointers (resulting in 16 MB program code, and 16 MB of data)

The processor is optimised for near data pointers, where compiled C programs can see up to 64 kB of data. Near pointers achieve higher code density and execution speed than Far pointers. This in turn reduces power consumption and memory size.

If 64 kB of data is not sufficient, it is possible to switch the processor to "Far" mode where the processor is optimized for use of or uses Far pointers. This enables compiled C programs to access up to 16 MB of data when using a simple compiler that cannot mix Near accesses and Far accesses in the same program. Such systems may be slower than the equivalent processor operating in Near Mode, and have lower code density than a processor using Near pointers due to use of more registers to store pointers, leading to more stack operations to save and restore registers.

Examples of semiconductor devices or systems (ASIC's or FPGA's) implemented using the processor (XAP5) systems have the following characteristics:

Up to 16 MB of code

Up to 64 kB of data comprising constants, variables, and I/O registers

Up to 64 kB per function

When the processor is implemented using near pointers it can access up to 64 kB of data split across constants, global variables, stack space and heap space and I/O registers. When the processor is implemented with Far pointers it can access up to 16 MB of data split across constants, global variables, stack space and heap space, and I/O registers.

Programs are compiled to be relocatable by using PC-relative addressing for code. Constants and global variables use absolute addressing or PC relative addressing. Programs can be loaded immediately next to each other in memory. Programs are stored in High memory. The processor resets the PC to 64 kB and starts executing code from there.

Hardware Aspects of the Processor

The Processor CPU (Central Processing Unit)

The CPU has a 16-bit internal architecture, with a unified linear 24-bit address space (16 MB).

The program code size, addressable by the processor, can be up to 16 MB. Instructions are stored on a 2-byte boundary. These can be positioned anywhere in memory. Separate programs can be loaded immediately next to each other.

The data size for constants, global variables, and stack space and heap space and I/O varies for different memory management unit and compile options:

When the processor is implemented with "Near" pointers, the data size up to 64 kB total.

When the processor is implemented with "Far" pointers, the data size up to 16 MB.

All function pointers and branch addresses are calculated as 24-bit, but stored in registers and memory as 32-bit.

All Near addresses and pointers are stored in registers as 16-bit byte addresses. All Near address comparisons are done on full 16-bit byte addresses.

All Far addresses and pointers are stored in registers as 32-bit byte addresses. All Far address comparisons are done on full 32-bit byte addresses.

The processor includes 4 banks of up to 8 registers.

Normal Registers—16-bit

Address Registers—24-bit

Special Registers—16-bit

Breakpoint Registers—24-bit

The only instructions that can update a special register are certain move instructions (movr2s, mov.1.i, mov.2.i, mov.4.i). These can only be used by the privileged modes. Similarly the movr2b instruction allows the privileged modes to update the breakpoint registers. Similarly the movr2a instruction allows the privileged modes to update the address registers. All other processing is performed on the Normal registers.

The stack is 16-bits wide and the stack is word aligned so that the stack pointer address is always a multiple of two. The stack pointer (SP) address changes by ±2, i.e. byte addressing is provided.

The processor can be used with any combination of 8 and 16-bit synchronous and asynchronous memories. A possible configuration is to have internal 16-bit synchronous memories (RAM and registers) and external 8 or 16-bit asynchronous memories (parallel Flash).

The processor operates at clock speeds of up to 100 MHz on 0.18 μm CMOS.

Processor System Implementation

In an example, the XAP5 processor is provided in the form of a "soft IP core" written using the Verilog™ Register Transfer Language (TRL). This can then be implemented as either a system-on-chip semiconductor device—via an ASIC implementation—or implemented using an FPGA.

When provided as part of semiconductor device the processor (core) is provided along with other circuitry and/or microchips to provide a semiconductor device system. In particular:

A Memory Management Unit (MMU) to interface with memory modules, for example, a flash memory module, RAM and ROM.

An Interrupt Vector Controller (IVC) to prioritise interrupt sources and provide interrupt priorities to the processor.

Further application-specific circuitry required for system control, including:
 clock and reset generation circuitry; and
 watchdog functions Further application-specific memory, peripheral devices and interrupt sources.

Figure 7:
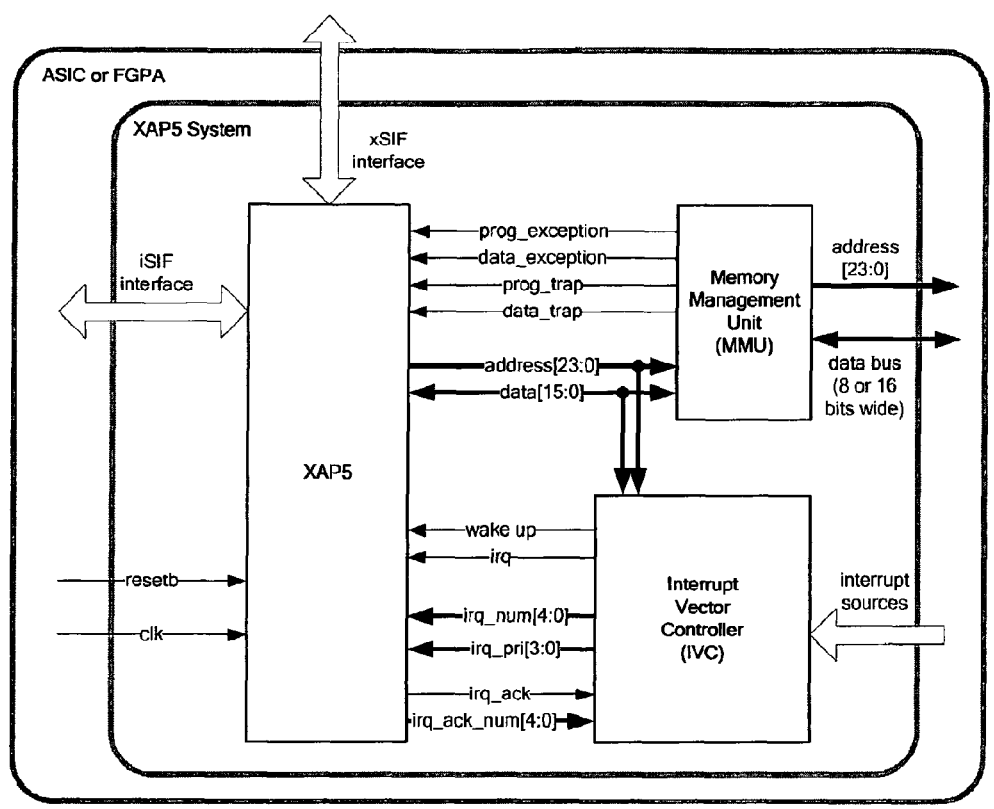
FIG. 7 shows another example implementation of the processor as part of an ASIC, in further detail.

FIG. 7 shows a schematic illustration of an example of a XAP5 processor implemented as part of an ASIC along with other appropriate circuitry.

Processor Architecture

In one example, the XAP5 processor is available in a form which provides 2-stage pipelining (referred to herein as XAP5a); another example (referred to herein as XAP5b), provides 3-stage pipelining and faster arithmetic than the XAP5a example.

The XAP5 processor architecture comprises the following:
 A processor core (XAP5), which is fixed and not changed from one ASIC implementation to another. This also contains the serial interface (SIF) circuitry.
 A Memory Management Unit (MMU), which may be varied depending on the ASIC application.
 An Interrupt Vector Controller (IVC), which may be varied depending on the ASIC application.

Figure 6:
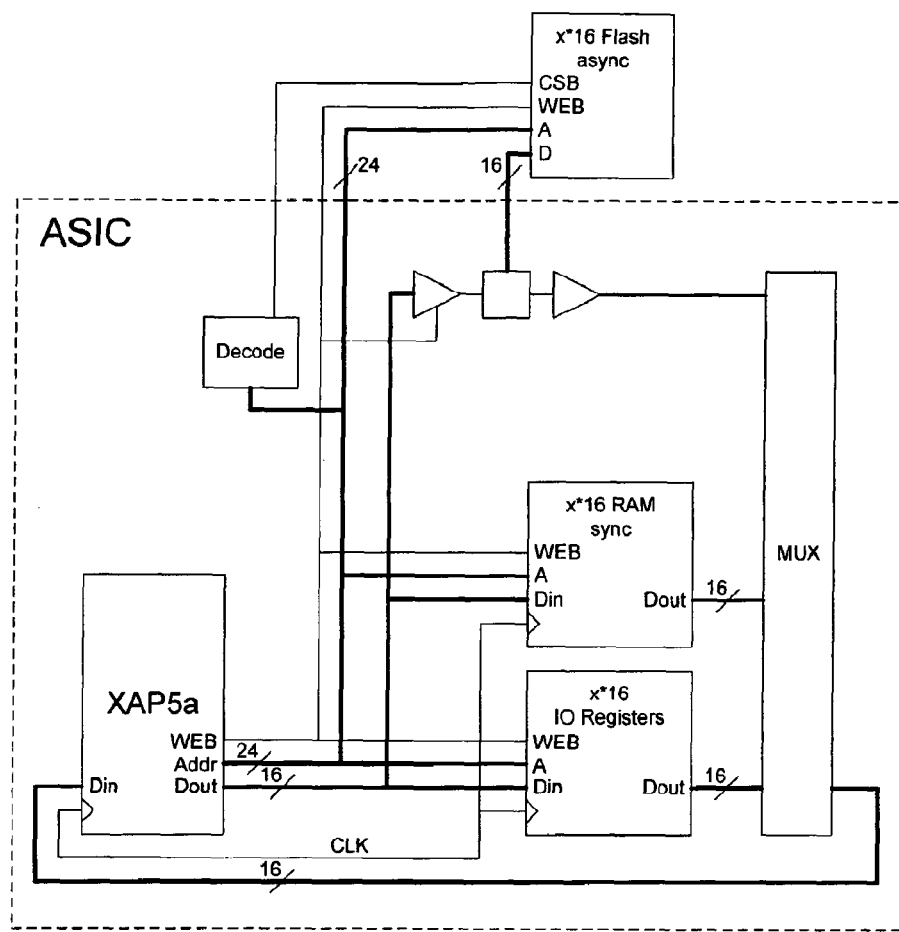
FIG. 6 shows the hardware architecture of the processor implemented in the form of an ASIC.

A schematic block diagram of a minimum implementation of a XAP5a processor using a single physical bus for all memory accesses (program and data) is shown in FIG. 6.

Programmer's Model

FIG. 8 shows a schematic diagram of the programmer's model for the (XAP5) processor.

Processor Modes

Figure 10:
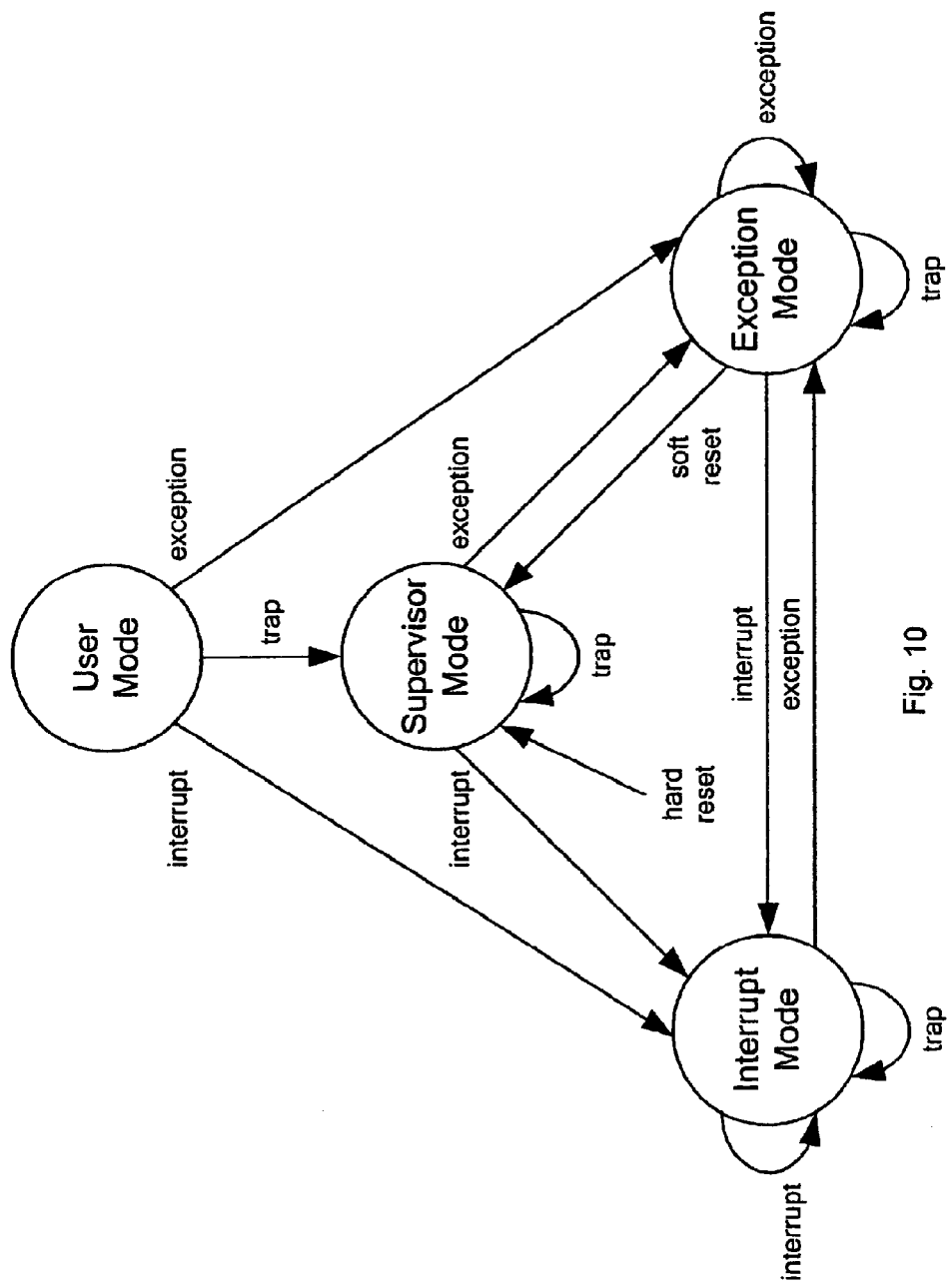
FIGS. 10 and 11 show diagrams illustrating changes in mode on invocation of trap, interrupt or exception events.
Figure 11:
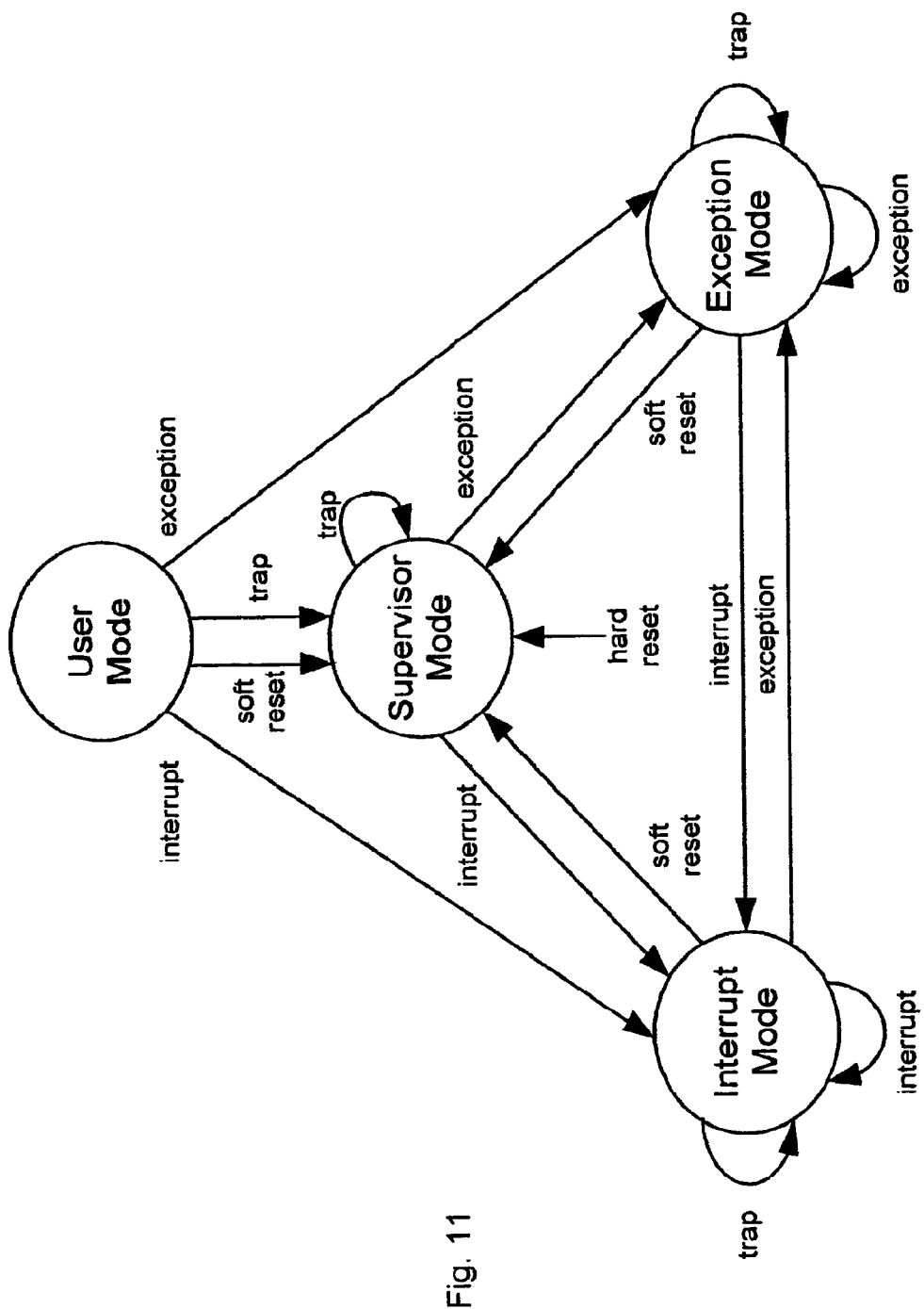

With reference to FIGS. 10 and 11 and corresponding Tables 1 and 2, the processor is configured to operate in any of four modes comprising three privileged modes, and a User Mode. The privileged modes comprise: Supervisor; Interrupt; and Exception Modes.

TABLE 1

| | | From | | | |
|---|---|---|---|---|---|
| | | User | Supervisor | Interrupt | Exception |
| To | User | not possible | rtie<br>movr2s<br>mov.2.i | rtie<br>movr2s<br>mov.2.i | rtie<br>movr2s<br>mov.2.i |
| | Supervisor | hard reset<br>trap | trap | rtie<br>movr2s<br>mov.2.i | soft reset<br>rtie<br>movr2s<br>mov.2.i |
| | Interrupt | interrupt | interrupt<br>rtie<br>movr2s<br>mov.2.i | trap<br>interrupt<br>rtie | trap<br>interrupt<br>rtie<br>movr2s<br>mov.2.i |
| | Exception | exception | exception<br>rtie<br>movr2s<br>mov.2.i | exception<br>rtie<br>movr2s<br>mov.2.i | exception<br>rtie |

TABLE 2

| | | From | | | |
|---|---|---|---|---|---|
| | | User | Supervisor | Interrupt | Exception |
| To | User | not possible | rtie<br>movr2s<br>mov.2.i | rtie<br>movr2s<br>mov.2.i | rtie<br>movr2s<br>mov.2.i |
| | Supervisor | hard reset<br>soft reset<br>trap | trap | soft reset<br>rtie<br>movr2s<br>mov.2.i | soft reset<br>rtie<br>movr2s<br>mov.2.i |
| | Interrupt | interrupt | interrupt<br>rtie<br>movr2s<br>mov.2.i | trap<br>interrupt<br>rtie | trap<br>interrupt<br>rtie<br>movr2s<br>mov.2.i |
| | Exception | exception | exception<br>rtie<br>movr2s<br>mov.2.i | exception<br>rtie<br>movr2s<br>mov.2.i | exception<br>rtie |

User Mode allows unknown software (application software) to be run safely without affecting the operation of code running in a privileged mode (Supervisor, Interrupt, Exception). Thus, User Mode is generally suitable for untrusted application code, and for complex software applications it is likely that most of the processing will occur in User Mode.

Most instructions can be executed in User Mode; however, access to certain instructions is specifically restricted.

Code running in User Mode can access registers R0-R7 and the User Mode stack pointer (SP_U). Furthermore, whilst access is restricted, a limited set of operations on the FLAGS register is allowed in User Mode. For example, the instruction mov.1.i (move single bit immediate) may be used in User Mode to operate on the carry flag, 'C'. User mode also does not have direct access to the other Special registers, the Breakpoint registers or the Privileged Stack Pointer.

Conversely, code running in privileged modes can access the entire register set, instruction set, and memory space subject to the specific MMU design for the chip. This includes the registers accessible to code in User Mode, the stack pointers and all the special registers. Note that the INFO register is read only even in privileged modes.

Code running in Supervisor Mode can execute all the processor instructions and can therefore control the activity of code running in User Mode. All code in User Mode is controllable from Supervisor Mode. The processor is configured to enter Supervisor Mode either after a reset, or on execution of a software interrupt ('swi') instruction (which corresponds to a 'trap' event). The Supervisor Mode is generally suitable for provision of operating system services, trap handlers, and communication stacks. Simple applications may also be executed in Supervisor Mode making no use of User Mode.

Advantageously, by enforcing these restrictions on User Mode code (along with MMU restrictions), the processor can allow an operating system to have complete control of user code. User code, however, is unable to affect the operation of the operating system.

Interrupt Mode is entered on a hardware invoked interrupt and Exception Mode is entered when an exception is caused, for example, by a software error. Interrupt Mode and Exception Mode are used for implementing interrupt and exception handlers respectively.

In a typical configuration code is linked to two areas of flash memory; one for User code and one for Privileged code. In operation in User mode, the MMU sets a prog_trap signal high if the processor attempts to execute code from the Privileged code memory address range (hence causing the MMUProgTrap trap). There is a corresponding trap for data accesses.

An application software architect can choose either to run the main application code in Supervisor mode or in User mode.

In a simpler system the application is run in Supervisor mode, which means that the processor never operates in User mode and only the Privileged Stack is used. Hence, the application is unconstrained and can execute all instructions and access all registers. However, this approach does not result in a secure system with a clear division between trusted code (running in Privileged modes) and untrusted code (running in User mode).

The processor architecture provides specifically for a more powerful system in which the main application is run in User mode while the operating system and communications stacks run in Supervisor mode. In this scenario much of the code running in Supervisor mode is likely to be bought-in software IP. The more powerful system makes use of both the User and Privileged stacks. Thus, this approach enables a secure system to be built in which the User mode code is protected; which cannot crash the processor; which cannot access Privileged areas of memory (separately specified for Program and Data); which cannot access hardware devices (must make swi requests to the operating system); and in which the Operating system (running in Supervisor mode) will shut down User tasks if they try to perform an illegal operation (for example, by overflowing the User stack).

FIGS. 10 and 11 and corresponding Tables 1 and 2 illustrate two different implementations of how the mode changes may take place in response to different TIE events, and will be described in more detail later.

Processor States

The processor is also configured to be in one of two states: Sleeping; and Awake. When the processor is awake, SIF accesses can only take place when the CPU is executing a sif instruction. In the Sleeping state the processor may be in one of two sleep modes, one which allows SIF accesses, and one which doesn't.

Run States

A program running on the processor may be in one of a plurality of run states in dependence on whether the core is executing instructions or not. The states comprise: Run Continuous; Run to Breakpoint; Stopped; and Single Step. The run state is determined by RUN_STATE[1:0] in the processor status register, as seen in Table 3. RunContinuous is the normal state used for program execution. The other three states are provided to allow interactive debugging.

TABLE 3

RUN_STATE

| Code | Meaning |
| --- | --- |
| 0 | Run Continuous |
| 1 | Run to Breakpoint |
| 2 | Stopped |
| 3 | Single Step |

Normal Registers

The eight normal operational registers, R0-R7, are illustrated in Table 4. Each register R0-R7 can be pushed to or popped from the Stack and each pair of adjacent registers can be joined to form a 32-bit register-pair. The register-pairs may be used by a plurality of instructions provided in the instruction set, including mult, div, rem, divrem, shift and rotate.

TABLE 4

Normal Registers

| Assembler Syntax | Instruction Encoding | Register Name | Notes |
| --- | --- | --- | --- |
| % r0 | 0 | R0 | Used as: return value function argument 0 |
| % r1 | 1 | R1 | Used as: function argument 1 |
| % r2 | 2 | R2 | Used as: function argument 2 |
| % r3 | 3 | R3 | Used as: function argument 3 |
| % r4 | 4 | R4 | |
| % r5 | 5 | R5 | |
| % r6 | 6 | R6 | |
| % r7 | 7 | R7 | |

The register-pairs are generally referred to by the lower register of the pair. For example: {R2, R1} is referred to as % r1; {R5, R4} is referred to as % r4; and {R0, R7} is referred to as % r7. Each register is only used for a single variable (whether it is 8-bit or 16-bit). The arithmetic and logical operations operate on full 16-bit words whereas Load, Store and Compare instructions have 16-bit and 8-bit forms (zero extended), thereby allowing programs to operate on 8-bit variables.

Address Registers

The address registers are 24-bit and comprise PC (Program Counter) and SP (Stack Pointer). There are two copies of SP, supporting two stacks, referred to as: User Stack which is used in the User mode; and Privileged Stack which is used in the Supervisor, Interrupt, and Exception modes. It will be appreciated that references to SP or 'Stack' generally, refer to the current Stack (i.e. depending upon the current processor mode).

As seen in Table 5 the user and privileged stacks have associated stack pointers stored in address registers SP_U and SP_P respectively.

TABLE 5

Stack Pointers

| Assembler Syntax | Instruction Encoding | Register Name | Notes |
| --- | --- | --- | --- |
| % sp_u | 0 | SP_U | Shadow Stack Pointer User Mode Used when in User mode. |
| % sp_p | 1 | SP_P | Shadow Stack Pointer Privileged Modes Used when in Supervisor, Interrupt or Exception mode. |
| | 2-7 | reserved | |

The Privileged Stack is used when there is a Trap, Interrupt or Exception (TIE) event. Each TIE event results in the current state being pushed onto the Privileged Stack and a move to the new mode. The SP_P (Privileged Stack Pointer) is initialised before such an event occurs.

Traps, Exceptions and Maskable Interrupts will not occur unless the software specifically enables it, or causes an error. However, the software cannot prevent a non-maskable interrupt (NMI) from happening soon after reset. For this reason NMIs are disabled until the NMI-Enable bit is set. NMI-Enable is 0 at reset and is set to 1 by any write to SP_P. NMI-Enable cannot be set back to 0 afterwards. This means that the Reset Handler software should initialise SP_P as soon as possible, as NMIs are disabled until this point.

Traps, Exceptions and Maskable Interrupt events are enabled immediately after hardware reset (though the I flag resets to 0). A Privileged Stack access error would occur if any events happen before SP_P is initialised. Hence, SP_P is preferably initialised as soon as possible in a Reset Handler. Note that NMIs will then be enabled. It may also be preferable to initialise the Watchdog counter before initialising SP_P, so as to avoid an unwanted NMI from the Watchdog.

In Near pointer mode, it is the responsibility of software to ensure that the stack pointer is always in low memory. There is no hardware to force this condition or detect violations, although other embodiments might implement such hardware, or SP[23:16] is always held at 0x00 and only SP[15:0] is used. In Far pointer mode there is no restriction on the location of the stack or the full SP[23:0] is used. PC is always used as a full 24-bit register. All PC-relative operations are done with offsets from the current value of PC, for example: unconditional branches; conditional branches; PC-relative loads and stores; and moving a PC-relative address to a register-pair.

PC and SP can only contain even values. SP[0] is therefore a constant zero. PC[0] is used for the Far bit with F=0 representing Near mode and F=1 representing Far mode.

The "Far" (F) Bit

The first or bit zero of the program counter (PC) i.e. PC[0] is used to indicate whether the processor is currently operating in Near or Far mode. It is referred to herein as the "F" or Far bit. PC[0] is a redundant bit since the processor uses 16-bit and 32-bit instructions which must be 16-bit aligned, and hence must start at a byte address that is a multiple of 2. This provides a redundant bit at the bottom of the PC.

When the F bit is set to zero the processor is in Near mode (this is also the state upon reset), and when the F bit is set to 1 the processor is in Far mode.

The F bit enables the processor to correctly interpret certain 16-bit instructions used for loading and storing data, and a few others (bra.i, add.i—see appendix A).

When the PC is updated, all 24 bits are set as follows:
PC[23:1]=address
PC[0]=the Far bit.

When the PC is copied to the stack (e.g. during a branch or subroutine) all 24 bits are copied to the stack, and when the stack is copied back to PC (e.g. following a pop.ret or rtie instruction), all 24 bits are copied back to the PC.

One possible example of the compile chain behaviour with regard to branches and the F bit is as follows:
- At compile time a compiler command line option is used to specify whether the particular code is to be run in Near mode or in Far mode. If the code is to be run in Near mode the compiler will set all branch instructions in the generated .s file to have "even" address offsets (i.e. PC[0] will be set to zero). If the code is to be run in Far mode the .s file will include "odd" address offsets (i.e. PC[0] will be set to one).
- The assembler makes no modifications to the F bit. It merely assembles the .s file to generate a .o file. The .o file does however indicate which compiler (and assembler) command line options have been used.
- The linker then sets the F bit in all appropriate instructions (such as branch instructions) as determined by the command line options stored in the .o file. If the branch is to a "near" function (i.e. a function in near mode) the F bit is set to 0, and if the branch is to a "far" function the F bit is set to 1.

Further details regarding the compiler, assembler and linker are provided below.

Special Registers

The movs2r and movr2s instructions allow Privileged modes access to the Special Registers (FLAGS, INFO, BRKE) as illustrated in Table 6.

TABLE 6

Special Registers

| Assembler Syntax | Instruction Encoding | Register Name | Notes |
|---|---|---|---|
| % flags | 0 | FLAGS | Operational Flags Register |
| % info | 1 | INFO | Information Register (read only) |
| % brke | 2 | BRKE | Break Enable |
| | 3-7 | Reserved | |

Flags Register

The layout of the Flags register is shown in Table 7. When the processor is in a Privileged mode, the entire FLAGS register can be modified by executing the movr2s instruction. The movs2r instruction allows the FLAGS register to be read. The mov.1.*, mov.2.* and mov.4.* instructions can be executed in Privileged modes. They enable specific Flags bits to be read and written.

TABLE 7

FLAGS Register

| Bit | Flag | Name | Description |
|---|---|---|---|
| 0 | Z | Zero | Set if result is zero (Rd = 0) |
| 1 | N | Negative | Set if result is negative (Rd[15] = 1) |
| 2 | C | Carry | Set if unsigned arithmetic overflowed |
| 3 | V | Overflow | Set if signed arithmetic overflowed |
| 5:4 | M[1:0] | Mode | 0 Supervisor mode<br>1 Interrupt mode<br>2 Exception mode<br>3 User mode<br>0-2 = Privileged modes.<br>3 = User mode. |
| 6 | | | FREE |
| 7 | I | Interrupt Enable | If set, interrupts are enabled. |
| 11:8 | S[3:0] | State | Indicates state of long multi-cycle instructions (e.g. push, pop, pop.ret). Enables shorter interrupt latency. |
| 15:12 | P[3:0] | Priority | 0 is processed first (highest priority)<br>15 is processed last (lowest priority<br>Priority meaning depends upon the current Mode. |

When a Trap, Interrupt or Exception event occurs, certain bits in the FLAGS register are automatically updated as follows:
Mode (not updated by Trap from privileged mode);
Priority (not updated by Trap)
Interrupt Enable (not updated by Trap or Exception)

The other bits remain unchanged. At reset the processor begins by executing code in Supervisor mode.

Condition flags, Z, N, C, and V are modified as instructions are executed.

The carry versions of add, subtract and compare instructions update the Z flag as follows:
If (result=0) and (Z=1), set Z=1
Otherwise set Z=0.

Hence, if (Z=0) before the instruction, then Z will always be 0 after the instruction (regardless of the instruction result). This is particularly beneficial in 32-bit arithmetic.

The State bits are used to track when a push, pop or pop.ret instruction is suspended part-way due to an interrupt. This allows the instruction to be resumed and completed after the interrupt is serviced. The purpose of this suspend/resume mechanism is to provide faster interrupt response times.

The Priority bits P[3:0] are used for different purposes in dependence on the current processor mode. The way in which the Priority bits are interpreted for the four processor modes is summarised in Table 8. When in Interrupt mode, for example, the priority bits keep track of the present interrupt priority.

TABLE 8

Use of Priority Bits

| M[1:0] | Mode | Meaning of P[3:0] |
|---|---|---|
| 0 | Supervisor | Reserved. |
| 1 | Interrupt | P[3:0] is automatically set by the IVC (Interrupt Vector Controller) to indicate the priority level of Maskable Interrupts: 0 is processed first (highest priority) 15 is processed last (lowest priority) |
| 2 | Exception | P[3:0] = vector number of Exception handler being processed. |
| 3 | User | P[0] = Break = B bit. If set and the processor is in User Mode, a break as a result of a brk instruction or the BRK registers will throw the Break trap. P[1]= Single Step = T bit. If set, each User Mode instruction that is executed will throw the SingleStep trap. P[3:2] = reserved. |

INFO Register

The layout of the INFO register is illustrated in Table 9. The INFO register can be read by a movs2r instruction or by the SIF. If used by movr2s, the instruction is executed, but the INFO register is not updated.

TABLE 9

INFO Register

| Bit | Bit Ref | Name | Description |
|---|---|---|---|
| 0 | NL | NMI-Lock | 0 = no NMI is being processed. 1 = NMI is being processed. Set to 1 when an NMI is started. Set to 0 by rtie. No new event can be processed when NMI-Lock = 1. |
| 1 | NE | NMI-Enable | Set to 1 by any write (by XAP or SIF) to SP_P (Privileged Stack Pointer). Once set to 1, it cannot be set back to 0. NMIs cannot be processed until NMI-Enable = 1. If not processed immediately, they are put in the interrupt pool. |
| 2-15 | | | FREE |

BRKE Register

The layout of the BRKE register is illustrated in Table 10. The movs2r and movr2s instructions allow read and write access to the BRKE register.

TABLE 10

BRKE Register

| Bit(s) | Flag(s) | Name | Description |
|---|---|---|---|
| 0, 4, 8, 12 | W0, W1, W2, W3 | Write | If set, an instruction making a memory write to the address matching the corresponding BRKn register will halt the processor after the instruction has executed. The PC will point at the next instruction to be executed. |

TABLE 10-continued

BRKE Register

| Bit(s) | Flag(s) | Name | Description |
|---|---|---|---|
| 1, 5, 9, 13 | R0, R1, R2, R3 | Read | Similar to above, but for memory reads. |
| 2, 6, 10, 14 | E0, E1, E2, E3 | Execute | If set, an instruction fetch from the address matching the corresponding BRKn register will halt the processor before the instruction is executed. The PC remains at the address of the instruction that caused the break. |

Breakpoint Registers

Software applications running on the processor can implement break points in either of two ways:
By swapping a normal instruction with a brk instruction in memory. This does not, however, support conditional breaks and can only be used in memory that supports individual word writes. Nevertheless, these are used, where possible, as they represent an unlimited resource.
By using the Break register. This does support conditional breaks and can be used with any kind of memory, because the memory itself is not modified.

As seen in Table 11 the processor is provided with four 24-bit breakpoint registers, BRK0-BRK3 which can be configured to stop the processor when an address is read, written, or executed.

TABLE 11

BRKn Registers

| Assembler Syntax | Instruction Encoding | Register Name | Notes |
|---|---|---|---|
| % brk0 | 0 | BRK0 | |
| % brk1 | 1 | BRK1 | |
| % brk2 | 2 | BRK2 | |
| % brk3 | 3 | BRK3 | |
| | 4-7 | reserved | |

Privileged mode access is provided to the breakpoint register. This beneficially allows Interrupt Mode debuggers to be implemented which allow User Mode tasks to be debugged, without needing to stop the processor. This allows, for example, the main operating system to remain running while User Mode applications are debugged.

The break conditions will only halt the processor if the following conditions are met:
(Break flag is 0) or (Processor is in a Privileged mode (Supervisor, Interrupt, Exception))
RUN_STATE=RunToBreak If the Break flag is 1 and the processor is in User mode, the processor will not halt, but will instead generate a Break trap.

The breakpoint registers can be written and read by privileged modes using the movr2b.32 and movb2r.32 instructions.

Reset State

All registers and flip-flops in the processor are asynchronously set or reset when the resetb_xap and resetb_sif input pins go low. Wherever possible, the registers and flip-flops are set to 0 (unless stated otherwise). Memories (internal and external) cannot be reset and so will not be.

Hard Reset

Following a hard reset, the Processor State is Awake, the Processor Mode is Supervisor and the memory mode is Near.

All registers (FLAGS, INFO, BRKE etc.) are set to zero and the program counter is 0x010000 (which means code execution starts from address 64 kB with processor in Near mode). The processor is thus configured to fetch the first instruction from address 0x010000, which is the start of the Interrupt Vector Table. With the FLAGS register being zero, interrupts are disabled, and on a switch to User Mode, single stepping and breakpoints are also disabled.

In summary, therefore, after a hardware reset, the XAP5 is in the following state:
Program Counter=0x010000
FLAGS=0:
 Z, N, C, V=0
 Mode=Supervisor mode. M[1:0]=0.
 Interrupts disabled. I=0.
 State, S[3:0]=0
 Priority, P[3:0]=0
INFO=0:
 NMI-Lock=0
 NMI-Enable=0
BRKE=0

Soft Reset

A soft reset is triggered by the hardware in response to a number of different conditions for example, three successive exceptions without one being successfully handled, or an error occurring in an NMI handler.

The soft reset is intended for recovery from error conditions and does not cause a global asynchronous hardware reset. Certain registers are synchronously set to new values to enable a re-start. Other registers are left with the value at the time of the error. Thus a Reset handler is provided with access to sufficient information to discover the cause of the Soft Reset.

The register contents after a soft reset are:
PC=0x010000 (same as hard reset).
FLAGS=0x0000 (same as hard reset).
INFO=0 (same as hard reset).
{R1, R0}=address of instruction that caused the error.
R2=FLAGS before the error.
R3=Error code.
All other registers are un-changed (left at their value at the time of the error).

The error code is indicative of the source of the error and is stored in R3 as illustrated in Table 12.

TABLE 12

R3 on Soft Reset

| Bit | Name | Description |
|---|---|---|
| 3:0 | Event No | that caused the error: i.e vector number (0-15) for the Event Type |
| 5:4 | Event Type | that caused the error: 0 Trap 1 Exception 2 Interrupts 0-15 3 Interrupts 16-31 |
| 6 | Context Push | at the time of the error: 0 Normal instruction execution (including rtie). 1 Context switch (pushing state to stack). Occurs at start of accepted Trap, Interrupt or Exception. |
| 11:7 | | FREE |
| 12 | NMI-Lock | Before the error. |
| 13 | NMI-Enable | Before the error. |
| 14 | | FREE |
| 15 | 1 | Hard coded constant. Indicates that there has been a Soft Reset. Reset handler can use this by starting with: bnz.r % r3, soft_reset_handler_label |

The R3 general purpose register comprises a bit (R3[15]) which indicates that a soft reset has occurred. If a soft reset has occurred then the rest of R3 contains information on what caused the soft reset (see Table 12).

Alternatively or additionally, however, the status bit may comprise a dedicated bit in the FLAGS, status or INFO register, which has the advantage of allowing software to accurately differentiate between an intentional reset and software accidentally invoking the reset vector handler.

A dedicated status bit may similarly be provided for indicating hard and soft resets.

Any such status bit (for hard or soft reset) may be read only, and the processor may be configured to clear the (read only) status bits on a write to the privileged or supervisor mode stack pointer register.

Hence, the Reset software handler can analyse the register contents to see whether there has been a hard or soft reset and then process them differently in dependence on requirements.

Soft reset operations, however invoked, cause an output signal from the processor to indicate that a soft reset operation has occurred. Specifically, whenever the processor generates a Soft Reset, it causes the 'error' output signal to go high for one (clock) clk cycle. This signal may be used by the surrounding system, for example: to cause peripherals or other system components to be returned to a known initial state; for safety, power saving, event logging or debug operations to be invoked; or for a supervisor system to be informed of the soft-reset so that it can respond in any of these ways, by re-initializing the local system, or by reconfiguring the wider system to use another processor.

A programmer can also write code that causes a soft reset (for example, by branching to 0x010000) if required. This code can also set the various registers before the soft reset and then analyse them in the Reset handler (after the soft reset) in the knowledge that their contents will not have changed. This enables the programmer to develop a powerful set of conventions to determine the reset source.

When a processor becomes unstable and multiple exceptions are occurring, it is often because memory errors have happened. It is therefore sensible to write simple, small Exception handlers that minimise the number of memory reads required. Obviously the processor still needs to read instructions from program memory, but ideally that should be all, the rest can be done with register and immediate operations only.

Advantageously key information about what went wrong is stored in the general-purpose registers rather than using the stack. Thus debug analysis may be done in situations where the stack pointer is pointing to an invalid location, or the stack points to RAM, DRAM, SDRAM memory that is not working correctly. Given the hardware debug features of the processor including the breakpoint registers and SIF debug facilities, this allows debug with minimal assumptions of working hardware.

Whilst the value of registers R0-R3 is lost when they are overwritten by the debug information the register contents may be saved to the stack before overwriting them. The stack save could be inhibited if the soft reset was caused by an Exception during a stack operation.

Exception Driven Soft-Reset

Exceptions occur when the processor detects programming errors. When an exception occurs, the processor moves execution to an exception handler that should take an appropriate response to the error or critical situation. The exception handler is generally a small, carefully constructed, trusted piece of code that uses minimum system resources.

Hence, exception handlers are not generally expected to create exception events. Thus, if an exception handler does invoke a further exception it is indicative of a failure in one of the most trusted pieces of code in the system.

Hence, the processor is provided with a system for handling nested exceptions (those occurring within another exception). If an exception handler itself causes a further exception, it is handled as a nested exception and invokes an exception handler in a nested fashion. The exception may be a recursive invocation of the same exception handler, or an invocation of a different exception handler.

If the nested exception handler then generates yet a further exception it indicates that the system is no longer operating correctly and the processor performs a soft-reset operation to restart the system at a known initial state.

The soft-restart operation records the cause of the error and various values useful for system debugging in the processor's registers. The processor stack pointers and general purpose registers R4-R7 are preserved to allow debug analysis of the stack contents.

To allow the processor to determine the the nesting depth, the level of exception→exception nesting is encoded within in a set of P bits in a processor register. This is optionally part of the programmer visible state, and necessarily part of the state that is saved when the execution thread is interrupted or otherwise pre-empted. A separate set of Exception Vectors is provided for each level of exception→exception nesting, in which case the P bits can encode the level of nesting by storing the vector number of the vector currently being handled (see Tables 8 and 13). For each exception type, a separate entry is provided in the exception vector table corresponding to each level of direct exception→exception nesting.

TABLE 13

| Current Mode | | New Event | | |
|---|---|---|---|---|
| Mode | Condition | Type | Condition | Action |
| User | NMI-Lock = 0 | Trap | | Change to Supervisor mode. Branch to selected trap vector address. |
| | | Interrupt | Inum = 0-3 | Change to Interrupt mode. Set NMI-Lock = 1. Branch to selected interrupt vector address (NMI). |
| | | Interrupt | Inum = 4-31 && I = 1 | Change to Interrupt mode. Branch to selected interrupt vector address. |
| | | Exception (first) | | Change to Exception mode (levels 0-7). Branch to selected exception vector address. |
| Supervisor | NMI-Lock = 0 | Trap (swi) | | Branch to selected trap vector address. |
| | | Interrupt | Inum = 0-3 | Change to Interrupt mode. Set NMI-Lock = 1. Branch to selected interrupt vector address (NMI). |
| | | Interrupt | Inum = 4-31 && I = 1 | Change to Interrupt mode. Branch to selected interrupt vector address. |
| | | Exception (first) | | Change to Exception mode (levels 0-7). Branch to selected exception vector address. |
| Interrupt | NMI-Lock = 0 | Trap (swi) | | Branch to selected trap vector address. |
| | | Interrupt | Inum = 0-3 | Stay in Interrupt mode. Set NMI-Lock = 1. Branch to selected interrupt vector address (NMI). |
| | | Interrupt | Inum = 4-31 && I = 1 && NewP < CurrentP | Stay in Interrupt mode. Branch to selected interrupt vector address. |
| | | Exception (first) | | Change to Exception mode (levels 0-7). Branch to selected exception vector address. |
| Exception | NMI-Lock = 0 | Trap (swi) | | Branch to selected trap vector address. |
| | | Interrupt | Inum = 0-3 | Change to Interrupt mode. Set NMI-Lock = 1. Branch to selected interrupt vector address (NMI). |
| | NMI-Lock = 0 && P = 0-7 | Exception (second) | | Stay in Exception mode. Go to levels 8-15. Branch to selected exception vector address. |

TABLE 13-continued

| Current Mode | | New Event | | |
|---|---|---|---|---|
| Mode | Condition | Type | Condition | Action |
| | NMI-Lock = 0 && P = 8-15 | Exception (third) | | Soft Reset. Set 'error' signal = 1 (for 1 clk cycle). |
| Any | NMI-Lock = 1 | Trap (swi) | | Soft Reset. Set 'error' signal = 1 (for 1 clk cycle). |
| | | Exception | | Soft Reset. Set 'error' signal = 1 (for 1 clk cycle). |

Thus, a different exception response can be provided in dependence on the exception→exception nesting depth encoded into the status bits.

Exception nesting may be considered to occur in 'levels' of nesting. An exception occurring during execution of code in a processor operating-mode other than exception mode is termed a 'first level exception'. The exception response to the first level exception is to invoke an appropriate exception handler via a first set of exception vector table entries.

Exceptions that occur during execution of code in exception mode, during execution of an exception handler invoked by a first level exception, are termed 'second level exceptions'. The exception response to a second level exception is to invoke an appropriate exception handler via a second set of exception vector table entries.

Exceptions that occur during execution of code in exception mode, during execution of an exception handler invoked by a second level exception, are termed 'third level exceptions'. The exception response to a third level exception is to perform the soft reset operation.

The process architecture determines whether an Exception is a second or third level exception by keeping a copy of the most recent Event Vector number in the P bits in the status register. If the processor mode is Exception Mode and P[3:0]=0 thru 7 when an exception occurs, then it is a second level Exception. If the processor mode is Exception Mode and P[3:0]=8 thru 15 when an exception occurs, then it is a third level Exception and causes a soft reset.

Exception handlers are higher priority than maskable interrupts. Non-maskable interrupts, however, can occur during the execution of exception handlers. If errors are detected in an NMI handler, which would otherwise cause an exception nested within the NMI handler, it leads to soft reset (see below) rather than an exception. Hence, an interrupt can never pre-empt an exception handler and then generate a further exception. Hence, only exceptions generated directly within an exception handler can increase the nesting depth that leads to the exception driven soft-reset described above.

Thus, the processor system sets a predetermined limit for the depth to which new exceptions, invoked while processing an existing exception, may nest. Exceeding the predetermined limit is effectively interpreted as meaning that the system is no longer trustworthy and should be restarted.

The P bits are advantageously shared with a different use in other modes thereby reducing the number of bits in the processor state saved during events (i.e. minimising the bits required in the FLAGS register). For example in interrupt mode the P bits store the priority level for maskable interrupts, and in User mode P[1:0] indicate Break and Single Step functions.

It will be appreciated that although the depth at which soft-reset occurs is described as being the third level of nesting, any appropriate nesting level may be set depending on requirements.

Other Event Driven Soft-Reset

The processor architecture is also configured for detecting other events that indicate the system can no longer be trusted, or recovered to a trusted state, and for re-starting the system with a soft-reset accordingly.

The further situations in which soft reset is invoked include:
  An attempt to execute a swi (software interrupt) instruction within an NMI handler.
  Invocation of any Exception while an NMI handler is being processed
  Invoking any Exception during a Context Push, (process of saving processor state onto the stack in response to accepting a TIE Event)
  In another embodiment, invoking any Exception while reading the stack during an rtie instruction (a Context Pop).

The type of problem that caused the restart is recorded, and other register information is preserved, which would normally be cleared during a reset operation, advantageously enabling system debug during development, event logging, etc, in the field.

Soft reset operations may also be intentionally invoked by privileged mode software executing a soft reset instruction, or by executing a recommended code sequence that will provoke an exception mechanism which causes a soft reset.

TIE Event Handling

FIGS. 10 and 11 and corresponding Tables 1 and 2 illustrate two different implementations of how the mode changes may take place in response to different trap, interrupt or exception (TIE) events. The description applies, in particular to the implementation shown in FIG. 11 and Table 2. It will be appreciated, however, that much of the description is equally applicable to both implementations.

Traps

Traps are internal events triggered by an action inside the processor core, for example by the SoftwareInterrupt instruction (swi), MMU Program Trap (MMUProgTrap), and the brk instruction. Most Traps occur in User mode although some Traps can occur in any mode (for example, the Software Interrupt instructions swi.i, swi.r).

As seen in FIG. 11 and Table 2, when a Trap is accepted while in User mode, the processor switches context to Supervisor mode and when a Trap is accepted in a Privileged mode, the processor remains in the same mode. Traps are nestable.

When a Trap is detected the current context is pushed to the Privileged Stack for later retrieval when returning from the Trap event.

The software interrupt traps (swi.i, swi.r) are the standard way for a User mode application to call an operating system function (which will be running in Supervisor mode). Conversely, when in a Privileged mode, it is generally more efficient to do a direct function call to the relevant part of the operating system.

Certain invalid events will also cause a Trap event (and hence a switch to Supervisor Mode) when detected in User mode, for example a null pointer (attempt to access address 0) or an attempt to divide by zero.

The processing required for dealing with the Trap event is implemented by a Trap handler running in Supervisor mode. All Trap handlers should end with a return from TIE event (rtie) instruction that will retrieve the original context (pop the Privileged Stack to return to the original mode).

Trap Processing

As described above, the use of Software Interrupt instructions (swi.i, swi.r) to cause a Trap is the only way in which User mode code can transfer control to Privileged mode code although Software Interrupt instructions may also be used in the Privileged modes.

When operating in User mode, swi.* causes the processor to save the current state to the Privileged Stack and to switch to Supervisor mode. If the processor is in any Privileged mode, then swi.* causes it to save the state to the Privileged Stack, and remains in the mode from which the Trap was invoked.

Hard and soft resets are treated as traps in the sense that they are handled by a trap vector, and that the processor switches to Supervisor mode when they occur, but they do not follow the same processing convention as for other 'Trap' events.

Hard reset forces the hardware to start in Supervisor mode at the Trap 0 vector. Soft reset can also occur from any mode. It changes the processor mode to Supervisor and branches to the Trap 0 vector. R0-R3 provide an indication of the reason for the error that caused the Soft Reset.

The implementation and effects of reset (soft and hard) are described above.

All other Traps operate only from within User mode. Each Trap event causes the state to be saved to the Privileged Stack, and a switch to Supervisor mode, before branching to a relevant Trap vector.

In response to a Trap, the processor typically does the following:

If the Trap event was caused by an swi instruction or by the SingleStep trap, then the current instruction is completed.

If it was caused by another trap (for example, Break, NullPointer, DivideByZero or PrivilegedInstruction) then the current instruction is not completed.

The address of the next instruction (the return address of the handler) is pushed to the privileged stack (high word then low word). This can be PC for current instruction, or (PC+2 or PC+4, depending upon whether the current instruction is 16 or 32-bit) for next instruction.

R1 and then R0 are pushed to the Privileged Stack.

The contents of the FLAGS register just before the Trap is pushed to the Privileged Stack.

If the current mode is User, the new mode (FLAGS[M]) is set to Supervisor.

The priority flags are updated with the number of the trap being processed.

The trap argument is stored in {R1, R0}. The value of this depends on which trap occurred. If the Trap argument is only 16-bit, then R1 is set to 0.

PC is updated with the address of the Trap handler which is then executed.

Traps do not change the value in FLAGS[P].

The core processes a Trap as summarised in the following code:

```
if ((NMI-Lock == 0) && (Trap event))
  {
    Privileged Stack push= Next Instruction;
    Privileged Stack push= R1;
    Privileged Stack push= R0;
    Privileged Stack push= FLAGS;
    {R1, R0} = Trap argument;
    if   (FLAGS[M] == UserMode)
      {
        FLAGS[M] = SupervisorMode;
      }
    PC = (TrapNum * 4) + IVTB;
  }
```

Various Trap types are summarised below by way of example only.

Reset

The type of reset may be determined by a Reset Handler reading the value in R3, on invocation of a reset.

If R3 is zero there has been a hard reset, which means that all the processor registers will be 0 (except PC=0x010000). If R3 is non-zero means there has been a soft reset (R3[15]=1 after Soft reset). The contents of R0 to R3 together indicate the cause of the Soft Reset (described in more detail previously). Hence, Reset handlers should analyse the register and stack contents to determine the error that caused the Soft Reset.

SoftwareInterrupt

The swi instructions cause the processor to move into a privileged mode and may be used for User Mode code to call an operating system. The swi instructions take an argument (either a register or an immediate) which is is used as the trap argument. On entry to the appropriate swi (trap) handler:

R0 is set to the instruction argument (e.g., OS function number).

R1 is set to 0.

The Software Interrupt instructions comprise:

swi.i swi.r

SingleStep

With reference to Table 8 in operation, when the T bit (i.e. P[1] in User Mode) is set in the FLAGS register the SingleStep Trap is triggered after every User Mode instruction, providing the instruction has not caused another trap (for example, DivideByZero). The argument to the trap handler is the address of the instruction that was executed, which {R1, R0} points to. Thus, run-mode debugging and single stepping of User Mode applications is supported.

Block instructions (blk*) appear as a sequence of instructions when single stepping.

Break

The Break flag is P0 in User mode. A Break trap can be invoked by any of four conditions, as seen in Table 14, which include invocation by a brk instruction, or invocation by any of a plurality of break conditions being satisfied in the breakpoint registers. The trap argument is the address of the instruction that caused the break event.

TABLE 14

Break Trap Conditions

| No | Cause | Mode | PC pushed to Stack |
|---|---|---|---|
| 1 | brk instruction | | current |
| 2 | BRK* register | E (execute) | current |
| 3 | BRK* register | R (read) | next |
| 4 | BRK* register | W (write) | next |

An example of how Break events are handled is shown below:

```
// Note: FLAGS[B] is the same as FLAGS[P0] in User Mode
if ((FLAGS[M] == User) && (FLAGS[P0] == 1))
   {
   throw break trap
   }
else
   {
   if (RUN_STATE == RunToBreak)
      halt;
   else
      nop;
   }
```

RunToBreak mode is enabled using the SIF. RUN_STATE cannot be set to RunToBreak unless the processor is in Debug mode, which is enabled with the SIF. The Break flag takes precedence over the debug mode action.

In operation when running a program in the xIDE simulator, or on an emulator, RunToBreak mode is always enabled. Any break conditions halt the processor unless the processor is in User Mode and the B/P0 flag (P[0]=Break=B bit) is set as illustrated in Table 8.

The brk instructions are valid in User Mode. The brk instructions are not protected instructions.

Any break conditions will halt the processor unless the processor is in User Mode and the Break flag is set. An operating system can prevent a User Mode task from stopping the processor by setting the Break flag (B bit of the FLAGS register). Similarly, an operating system can prevent a User Mode task from throwing a Break trap by clearing the Break flag.

The debugger for the hardware emulator will always: leave the processor in Debug mode and start the processor with RunToBreak (as opposed to Run continuously). For normal debugging of User Mode code the SingleStep and Break flags are not set and the Simulator and Emulator will use instruction replacement and the BRK registers to implement breakpoints.

NullPointer

The processor detects attempts by a User Mode program to perform data accesses to memory address zero. Such accesses are normally the result of a program using an un-initialised pointer variable. If a data access to address zero is detected the processor debug module generates a NullPointer trap. Address zero can be used for privileged mode data but not for user mode data. Thus, the NullPointer trap is a useful debug aid for user mode code.

The NullPointer trap does not, however, prevent a load instruction updating its registers, nor does it prevent a store instruction writing to memory. Nevertheless, if required, an ASIC designer may implement write protection for address zero in the MMU (using MMUDataException).

Furthermore, if a read or write access wraps around from high memory (address 0xFFFF for a Near mode instruction or address 0xFFFFFF for a Far mode instruction), the resulting memory access to address zero does not cause a NullPointer exception.

The trap argument is the address of the instruction that attempted the memory access ({R1, R0} points to the instruction just executed). The MMU is expected to place the address that caused the trap in a memory mapped register accessible to the trap handler code.

NullPointer can be caused by the following instructions:
 ld.1.i, st.1.i, ldand.1.i, ldor.1.i, ldxor.1.i
 ld.8z.i, ld.i, ld.32.i
 ld.8z.fi, ld.fi, ld.32.fi
 ld.8z.r, ld.r, ld.32.r
 ld.8z.fr, ld.fr, ld.32.fr
 st.8.i, st.i, st.32.i
 st.8.fi, st.fi, st.32.fi
 st.8.r, st.r, st.32.r
 st.8.fr, st.fr, st.32.fr
 swap.i
 swap.fi
 blkcp.r, blkst.r, blkst.8.r
 blkcp.fr, blkst.fr, blkst.8.fr
 bra.m, bsr.m
 push
 pop, pop.ret DivideByZero All forms of the divide and remainder instructions check the value of the denominator. If it is zero and the processor is in User Mode, then this throws a DivideByZero trap. On invocation of the DivideByZero trap, {R1, R0} points to the divide instruction just executed.

The DivideByZero trap can be caused by the following instructions:
 div.*
 divrem.*
 rem.*

MMUDataTrap

An MMUDataTrap trap is triggered by the external MMU in response to User Mode code accessing memory that violates the current access rights (e.g., reading from memory that does not belong to the currently executing process, or writing to memory that is tagged as read-only). It occurs when the data_trap input is activated.

The trap argument is the address of the instruction that caused the trap. The MMU is expected to place the accessed address in a memory mapped register accessible to the trap handler code.

This trap can be used to implement virtual memory systems or to implement memory protection schemes between different processes.

MMUDataTrap can be caused by the following instructions:
 ld.1.i, st.1.i, ldand.1.i, ldor.1.i, ldxor.1.i
 ld.8z.i, ld.i, ld.32.i
 ld.8z.fi, ld.fi, ld.32.fi
 ld.8z.r, ld.r, ld.32.r
 ld.8z.fr, ld.fr, ld.32.fr
 st.8.i, st.i, st.32.i
 st.8.fi, st.fi, st.32.fi
 st.8.r, st.r, st.32.r
 st.8.fr, st.fr, st.32.fr
 swap.i
 swap.fi
 blkcp.r, blkst.r, blkst.8.r
 blkcp.fr, blkst.fr, blkst.8.fr bra.m, bsr.m
push
pop, pop.ret
MMUProgTrap An MMUProgTrap is triggered by the external MMU in response to the processor core attempting to fetch an instruction from a location that violates the current access rights. It occurs when the prog_trap input is activated. The trap argument is the address of the instruction that caused the trap.

MMUProgTrap can be used to implement virtual memory systems or to implement memory protection schemes between different processes.

Both the MMUDataTrap and MMUProgTrap are indicative of a User task attempting to access Privileged memory. The task is therefore illegal and the operating system will typically terminate the task and return instead to the main task scheduler, rather than the trap handler attempting to return to the task which invoked the trap.

PrivilegedInstruction

In an application using an operating system or supervisor, the processor executes most code in User Mode. As discussed above, User Mode is restricted in its access rights to certain instructions. Accordingly, executing any privileged instruction in User Mode triggers a PrivilegedInstruction trap. The trap argument is the address of the instruction that caused the trap (which {R1, R0} points to).

Some instructions may cause the PrivilegedInstruction trap, because they provide access to the FLAGS register and therefore could be used to invoke mode changes, for example:
  rtie (return from TIE event)
  movr2s, movs2r (move from register to special and vice versa)
  movr2b.32, movb2r.32 (move register pair to breakpoint register pair vice versa)
  movr2a.16, movr2a.32, mova2r.16, mova2r.32 (move an address register to a register (pair) and vice versa)
  mov.1.i (unless operating on the C flag), mov.2.i, mov.4.i (move 1-bit/2-bit/4-bit immediate to FLAGS register)

Other instructions cause this exception, because they alter the behaviour of the processor core, for example:
  sleepsif, sleepnop (put processor into SIF/NOP sleep state)
  halt (stop the processor)
  sif (perform SIF cycle)
  in another embodiment, mov.1.i (unless operating on the C flag), mov.4.i The sif instruction is not allowed in User Mode, because it can alter the timing of accesses from external devices to the registers and memory of the processor. Systems wishing to allow User Mode to control when SIF accesses can take place are required to provide a Supervisor Mode routine accessible via the trap instruction. For example, if SIF cycles are required in User Mode code, the sif instruction may be implemented in a SoftwareInterrupt trap handler (to run in Supervisor Mode) invoked using an swi instruction.

Interrupts

Interrupts are special events triggered by an action outside the processor core, for example by a timer reaching its terminal count, or by a serial port receiving a character. Interrupts can be a Maskable interrupt or Non-Maskable Interrupt.

Interrupts are external hardware events and are preferably serviced quickly by the processor. Interrupts are accompanied by an Interrupt Number (0 to 31) and a Priority (0=highest to 15=lowest).

Interrupts are generally nestable. New Interrupts can be serviced from any of the four processor modes. The new Interrupt is serviced immediately if any of a plurality of priority conditions are met, otherwise the Interrupt event is pooled to wait until one of the conditions is met. For example, the new Interrupt number, Interrupt Priority and I flag together determine whether the interrupt is processed immediately, or kept in the pool for later processing. NMIs take precedence over Exceptions, but Maskable interrupts do not.

When the Interrupt is serviced, it causes the processor to switch to Interrupt Mode and sets FLAGS[I] to 0. Privileged mode software can also set FLAGS[I] with the mov.1.i or movr2s instructions. The processing required for dealing with the Interrupt event is implemented by an Interrupt handler running in Interrupt mode. Interrupt handlers are terminated with a return from TIE event (rtie) instruction to return the processor to the original mode from where the Interrupt was invoked.

The processor has a single interrupt request line for non-maskable and maskable interrupts. When an interrupt is requested, the interrupt controller supplies the interrupt number and a priority.

Interrupt numbers 0 to 3 represent non-maskable interrupts whilst Interrupt numbers 4 to 31 represent maskable interrupts. The interrupt number is also used to determine which interrupt handler to invoke via the Interrupt Vector Table (IVT), the layout of which is illustrated in Table 15.

TABLE 15

| Address | No | Event Type | Src Mode | Dest Mode | Dest P[3:0] | PC to Stack | Vector |
|---|---|---|---|---|---|---|---|
| 0x010000 | 0 | Trap | USIE | S | 0 | / | Reset - hard |
|  |  |  | E | S | 0 |  | - soft |
| 0x010004 | 1 | Trap | U | S | = | next | SoftwareInterrupt |
|  |  |  | SIE | = | = |  |  |
| 0x010008 | 2 | Trap | U | S | = |  |  |
|  |  |  | SIE | = | = |  |  |
| 0x01000C | 3 | Trap | U | S | = |  |  |
|  |  |  | SIE | = | = |  |  |
| 0x010010 | 4 | Trap | U | S | = | next | SingleStep |
| 0x010014 | 5 | Trap | U | S | = | next or current | Break |
| 0x010018 | 6 | Trap | U | S | = | next | NullPointer |
| 0x01001C | 7 | Trap | U | S | = | next | DivideByZero |
| 0x010020 | 8 | Trap | U | S | = | next | MMUDataTrap |
| 0x010024 | 9 | Trap | U | S | = | current | MMUProgTrap |

TABLE 15-continued

| Address | Event No | Event Type | Src Mode | Dest Mode | Dest P[3:0] | PC to Stack | Vector |
|---|---|---|---|---|---|---|---|
| 0x010028 | 10 | Trap | U | S | = | next | PrivilegedInstruction |
|  | 11-15 | Trap | U | S | = |  |  |
| 0x010040 | 0 | Exception | USI | E | 0 | next | UnknownInstruction1 |
| 0x010044 | 1 | Exception | USI | E | 1 | next | OddAddress1 |
| 0x010048 | 2 | Exception | USI | E | 2 | next | MMUDataException1 |
| 0x01004C | 3 | Exception | USI | E | 3 | current | MMUProgException1 |
|  | 4-7 | Exception | USI | E | 4-7 |  |  |
| 0x010060 | 8 | Exception | E | E | 8 | next | UnknownInstruction2 |
| 0x010064 | 9 | Exception | E | E | 9 | next | OddAddress2 |
| 0x010068 | 10 | Exception | E | E | 10 | next | MMUDataException2 |
| 0x01006C | 11 | Exception | E | E | 11 | current | MMUProgException2 |
|  | 12-15 | Exception | E | E | 12-15 |  |  |
| 0x010080-0x1008C | 0-3 | Interrupt | USIE | I | irq_priority[3:0] | next or current | Int00-Int03 = NMI |
| 0x010090-0x0100FC | 4-31 | Interrupt | USI | I | irq_priority[3:0] | next or current | Int04-Int31 = Maskable Interrupt |

NOTE:
'=' represents 'no change'

The priority is used to determine the execution order of waiting maskable interrupts, in conjunction with the interrupt number as all NMIs are higher priority than maskable interrupts. If more than one NMI source raises a request in the same clock cycle, or more than one NMI sources are waiting with an outstanding request at the end of processing of an NMI handler, the one with the lower interrupt number is serviced first.

Non-Maskable Interrupts

An NMI system is provided for handling Non-Maskable Interrupts (NMIs) in a safe and efficient manner. The NMI system is specifically configured to prevent an NMI being serviced both while a software system is being initialized (i.e. between reset and initialisation) and while an NMI handler is running (i.e. while another NMI is already being processed).

As seen in Table 12, the processor maintains two NMI status bits (NL and NE) in a preferably read-only information register (INFO). The architecture is configured such that the ability of application software (i.e. instructions of the instruction set) to write to the NMI status bits directly is severely restricted (or prevented).

The first bit, NE (NMI-Enable), is used by the processor to determine when NMIs are enabled (NE=1) or disabled (NE=0). The status bit NE is set to enable by a write to the privileged stack pointer and to disable by a reset (soft or hard). Hence, once NMIs are enabled they cannot be disabled other than by triggering a hard or soft reset.

Thus the NE bit protects the system from attempting to service an NMI before the supervisor mode stack pointer has been set to a valid area of memory. The system can perform any other essential initialization before initializing the stack. Furthermore, the fact that no software action other than invocation of a soft reset can clear NMI-Enable protects the system from NMIs being blocked by software action. It will be appreciated that soft-reset does not threaten the availability of NMIs because the reset handlers are stored in non-volatile memory and will quickly initialize the stack thereby re-enabling NMIs.

In an alternative embodiment the ability of the instruction set to write to NE may be restricted rather than completely blocked. For example, a separate instruction may be provided for enabling NMIs (setting NE to 1) as an alternative to enablement as consequence of a (privileged) stack write. However, in such an embodiment there is no complementary instruction for disabling NMIs (setting NE to 0). Having a separate instruction has the benefit that code initialising the processor can use the stack for subroutine calls before enabling NMIs.

The status bit NE is set to enable by a write to the privileged stack pointer and to disable by a reset (soft or hard). Hence, once NMIs are enabled they cannot be disabled other than by triggering a hard or soft reset.

The second bit, NL (NMI-Lock), is used by the processor, after NMIs are enabled, to lock (NL=1) or unlock (NL=0) NMIs in certain situations. For example, when an NMI occurs, the processor enters Interrupt mode and invokes the appropriate Interrupt handler the NMI-Lock bit is automatically set to lock (NL=1). When locked no other events can interrupt the NMI processing, not even another NMI. When the resulting NMI handler has finished processing the NMI, NMI-Lock bit is automatically set to unlock (NL=0) on execution of the associated rtie instruction.

The lock bit NL is also set to enable (0) at hard and soft reset.

Software cannot write to the INFO register to set NMI-Lock, it can only be set by the processor accepting an NMI interrupt request from an interrupt source outside the processor. NMI-Lock can, however, be automatically cleared when the NMI handler exits with an rtie. Hence, NMI handlers always run to completion, and an NMI can never be pre-empted by anything (other than hard or soft reset), not even by a higher priority NMI.

The provision of the two status bits advantageously renders the NMI system robust and ensures that NMIs will continue to be serviced provided that the NMI handlers themselves are well written and exit correctly with an rtie instruction. The NMI handlers are generally relatively small pieces of code that are carefully written. Hence, they are generally one of the most trusted pieces of code in the microprocessor system. NMI handlers are used to respond to critical issues such as power supply failure, clock PLL (Phase-Lock-Loop) going out of lock, watchdog timer reaching it's limit, or other critical situations that demand the most urgent attention, and a very high level of reliability. Hence, regardless of any software programming errors (Traps or Exceptions) in other parts of the system, it is important that NMI requests are serviced as a priority.

Programming errors that are detected by the system in an NMI handler cause soft-reset because a programming error detected in such a trusted pieces of code may be indicative of the system operating incorrectly. Thus, the best course of action is to return the system to a known state through the soft reset mechanism.

It will be appreciated that in some implementations incorporating the NMI handling system, the NMIs could even continue to be serviced if the privileged mode stack has overflowed. However, for correct functionality of the wider system it is important that the privileged mode stack does not overflow.

A further advantage of this system, stemming from the fact that an NMI cannot be interrupted even by a higher priority NMI, is that returning from an NMI always clear the NMI-Lock bit without considering what it is returning to. Hence, the NMI-Lock bit and the NMI-Enable bit do not need to be saved on the stack along with other processor states during an interrupt, exception, trap, or subroutine call.

Furthermore, the NMI system means that it is possible to have just a single rtie instruction for returning from traps, interrupts, and exceptions, because the rtie instruction can always write NMI-Lock=0 regardless of what type of event handler it is returning from. When servicing a trap, exception, or maskable interrupt, NMI-Lock is already 0, so re-writing 0 to it cannot cause a problem. The only time NMI-Lock is 1 is during the execution of a non-nestable NMI handler, and it is always correct to write 0 to NMI-Lock when returning from the NMI handler.

Interrupt Processing

As discussed above, the processor has a single interrupt request (IRQ) input used for all interrupts. If interrupts are enabled, activating the IRQ input will cause the processor to switch to Interrupt Mode when the current instruction finishes and query the interrupt controller for an interrupt number (IRQ_NUM). The interrupt number is converted into a word offset, and is used to index (plus offset 0x010080) into the IVT (see Table 15) to point to the interrupt handler.

As described previously, if the new Interrupt number is between 0 and 3 it determined to be a Non-Maskable Interrupt (NMI). NMIs are only enabled after NMI-Enable (NE) has been set (i.e. on initialisation when the Privileged Stack Pointer (SP_P) is updated). NMIs treated as having a higher priority than all other events. NMIs cannot be nested (i.e cannot themselves be interrupted). This means that a new NMI will be processed immediately, unless the processor is already processing an NMI. If the NMI is not processed immediately, it is put in the Interrupt pool for subsequent processing, in dependence on interrupt number (lowest first) rather than priority number (the priority bits are ignored for NMIs).

Similarly, if a new Interrupt number is between 4 and 31 it is determined to be a Maskable Interrupt. Any Maskable Interrupt occurring while another Maskable Interrupt is being processed takes precedence if interrupts are enabled (I=1) and the priority number of the new interrupt is lower than that of the current interrupt.

Priority numbers are 0 to 15, with 0 representing highest priority (process first) and 15 the lowest (process last). Unlike NMIs, maskable Interrupts do not take precedence over Exceptions. Exception checking is performed during Interrupt Handlers. If an Exception occurs during a maskable interrupt, an appropriate exception handler is invoked. If an exception occurs during an NMI, however, the processor does a Soft Reset (as described previously).

An IVC (interrupt vector controller) hardware designer may implement different priority schemes for the various interrupt sources depending on requirements.

For example, when there is an Interrupt, the processor typically does the following:

Most instructions are completed, except:
  div.*, rem.* and divrem.* are aborted.
  push, pop and pop.ret are stopped in an intermediate state, and their state is recorded in the S flags.
  blk* instructions are stopped at an intermediate cycle (the end of the current memory cycle) and the state is maintained in the registers.

The return address of the handler is pushed to the privileged stack (high word then low word). If the previous instruction completed, the return address is the address of the next instruction (i.e. PC+2 or PC+4 depending upon whether the current instruction is 16 or 32-bit), otherwise it is the address of the current instruction (PC).

R1 is pushed to the Privileged Stack.
R0 is pushed to the Privileged Stack.
The contents of the FLAGS register just before the interrupt is pushed to the Privileged Stack.
The processor switches to Interrupt Mode, (i.e. FLAGS[M] is set to Interrupt).
Interrupts are disabled (FLAGS[I]=0) to disable further (maskable) interrupts.
The priority flags (FLAGS[P]) are updated with the priority of the interrupt being processed (set to 0 for NMIs).
If an NMI occurred (interrupt number is 0-3), it is always processed except when another NMI is already running. The setting of FLAGS[I] is completely ignored for NMIs.
In another embodiment, if an NMI occurred (interrupt number is 0-3), it is always processed (even if FLAGS [I]=0) when an NMI NMI-Lock bit is set to 1.
PC is updated (usually) with the address of the appropriate Interrupt handler. Hence, the processor branches to an address (normally of an Interrupt handler) in the Interrupt Vector Table.

An example of the way in which the core processes an Interrupt is shown below:

```
if ((NMI-Lock == 0) && (Interrupt event))
  {
  MI-Now = 0;
  NMI-Now = 0;
  if (FLAGS[M] == User or Supervisor)
    {
    if ((InterruptNumber == 0-3) && (NMI-Enable ==1))
      NMI-Now = 1;
    if ((InterruptNumber == 4-31) && (FLAGS[I] == 1))
      MI-Now = 1;
    }
  if (FLAGS[M] == Interrupt)
    {
    if ((InterruptNumber == 0-3) && (NMI-Enable ==1))
      NMI-Now = 1;
    if((InterruptNumber == 4-31) && (FLAGS[I] == 1) &&
              (newPriority < currentPriority))
      }
      MI-Now = 1;
    }
  if (FLAGS[M] == Exception)
    {
    if ((InterruptNumber == 0-3) && (NMI-Enable ==1))
      NMI-Now = 1;
    }
  if (NMI-Now)
    {
    NMI-Lock = 1;
    }
  if (NMI-Now || MI-Now)
```

```
{
Privileged Stack push=
        (Next Instruction or Current Instruction);
Privileged Stack push= R1;
Privileged Stack push= R0;
Privileged Stack push= FLAGS;
FLAGS[I]      = 0;
FLAGS[M]      = InterruptMode;
FLAGS[P]      = irq_priority[3:0]; // Input signal
PC            = 0x80 + (IRQ_NUM * 4) + IVTB;
}
else
{
  Put Interrupt on queue and wait for
  MI-Now or NMI-Now conditions to be met;
}
```

Interrupt Response Time

Interrupt processing begins within 7 cycles when a valid interrupt is pending. Most instructions execute fully within 7 cycles, so these complete normally. Instructions which do not complete normally include:

- div, divrem, and div—these abort if an Interrupt is invoked before the final cycle of the instruction. The instruction is then restarted when the interrupt handler completes.
- push, pop, pop.ret, blkcp.r, blkst.r, blkst.8.r, blkcp.fr, blkst.fr, and blkst.8.fr—these suspend in mid-execution if an Interrupt is invoked before the final cycle of the instruction. The instruction is then resumed when the interrupt handler completes.

An Exception is an error event triggered by an action inside the processor core, for example a failed memory access or an unknown instruction.

Whilst exceptions should not occur in well written code, the processor is provided with hardware for exposing illegal code by throwing an Exception (invoking an Exception Event) when executed. Exceptions may be thrown by code executing in any mode.

Exceptions can occur from any mode and cause the processor to switch to Exception mode. The processing required for dealing with an Exception event is implemented by an Exception handler running in Exception mode. Exception handlers are terminated with a return from TIE event (rtie) instruction to return the processor to the original mode from where the Exception was invoked.

Exceptions are processed immediately, unless the processor is already processing an NMI (i.e NMI-Lock=1). There is no pool for delayed exceptions, so if an Exception is not processed immediately, it is ignored. Exceptions have higher priority than everything apart from NMIs. This advantageously allows a hardware designer to develop a scheme of priorities for internal (exception and trap) and external (interrupt) events.

Various exception types are summarised below by way of example only. The OS will kill (and maybe restart) on some exceptions.

Unknown Instruction

All opcodes that do not correspond to a valid instruction trigger the UnknownInstruction exception after which {R1, R0} points to the undefined instruction just executed.

This exception is beneficial; firstly because it can quickly trap bad code causing the processor to attempt to executing data, other non-code or the like; and secondly because it provides a simple, proven, mechanism for supporting pseudo-instructions in a processor.

The support of pseudo-instructions allows any version of the processor core to support, through software emulation, any custom instruction of any other version of the processor core, albeit at a slower rate of execution. This includes dynamically updating a system with new instructions simply by adding more functionality to the instruction emulation code. Furthermore, it supports experimentation and analysis of any new instruction simply by adding emulation code, perhaps to evaluate code size or feature exploration.

In another embodiment, the immediate forms of all branches should only have even addresses or offsets. If the assembler generates invalid code with odd addresses or offsets, the processor will generate an UnknownInstruction exception.

OddAddress

All entries in the Near mode function table are word aligned (start on an even address) or such that PC[0]=0. An OddAddress exception is triggered when an attempt is made to access or to read an odd address from the function table by one of the 'branch via memory' instructions bra.m or bsr.m with an odd address. The entries within the table can be odd or even, which specifies which of Near mode and Far mode the processor should be in when it branches to the address encoded in bits {pt[23:1],0} where pt[23:1] refers to bits [23:1] of the 32-bit pointer in the selected table entry. Stated another way, the LSB of the table entry will be loaded into the F bit when the table entry is loaded into the Program Counter.

In another embodiment, this exception can also be triggered by passing a register containing an odd address to bra.m or bsr.m, since the table itself is also word aligned.

After invocation of the OddAddress exception {R1, R0} points to the instruction just executed.

The following instructions can cause this exception:

bra.m bsr.m

It is not possible for ordinary branch instructions or rtie or pop.ret to throw this exception, because writing an odd number to the PC will cause the processor to enter Far mode and is therefore valid.

MMUDataException

The processor vectors to an MMUDataException when the data_exception input signal goes high.

The MODE[1:0] signal from xap5_core to xap5_mmu indicates whether the xap5_core is in User, Supervisor, Interrupt or Exception Mode. The xap5_core has a data_exception input signal that allows the xap5_mmu to indicate when a memory data access has failed for any reason.

Exceptions of this type are triggered by an external Memory Management Unit (xap5_mmu) in response to the xap5 core accessing memory that violates the current access rights (e.g., reading from memory that does not belong to the currently executing process, or writing to memory that is tagged as read-only, or an attempt to access memory that is currently paged out).

MMUDataException is thrown when an instruction's data read or write fails for any reason. This may be because it violates the access rights. On invocation {R1, R0} points to the instruction that caused the exception and the xap5_mmu preferably places the address that caused the exception in some memory mapped register accessible to the exception handler code.

These exceptions are important in virtual memory systems (implemented in software with an appropriate hardware MMU). When a program accesses data (or program) in its memory space that currently belongs to another task, this exception will be triggered since it violates the memory protection afforded to the other task. The virtual memory manager can then swap out the sleeping task's memory chunk, in the active task's memory chunk, and then restart the current instruction.

MMUDataException does not prevent a load instruction updating the processor registers, the data returned by the MMU is all zeros but does prevent a store instruction from writing to memory (it is blocked in the MMU).

MMUDataException can be caused by the following instructions:

ld.8z.i, ld.i, ld.32.i
ld.8z.fi, ld.fi, ld.32.fi
ld.8z.r, ld.r, ld.32.r
ld.8z.fr, ld.fr, ld.32.fr
st.8.i, st.i, st.32.i
st.8.fi, st.fi, st.32.fi
st.8.r, st.r, st.32.r
st.8.fr, st.fr, st.32.fr
swap.i
swap.fi
blkcp.r, blkst.r, blkst.8.r
blkcp.fr, blkst.fr, blkst.8.fr
push
pop, pop.ret
ld.1.i, st.1.i, ldand.1.i, ldor.1.i, ldxor.1.i MMUProgException The processor vectors to MMUProgException when the prog_exception input signal goes high. MMUProgException is thrown, for example, when an instruction fetch fails for any reason. This may be because it violates the access rights.

On invocation, {R1, R0} points to the instruction that caused the exception. Preferably the xap5_mmu places the address that caused the exception in a memory mapped register accessible to the exception handler code.

Generation of MMUDataException or MMUProgException indicate a potentially dangerous error with serious consequences. Hence, handlers for such exceptions will generally not attempt to return to the task which caused them. Instead the operating system terminates the task and returns to the main task scheduler. If this generates further memory exceptions, then the processor hardware automatically invokes a Soft Reset when exceptions become nested beyond a predetermined depth (typically on the third exception, as described in more detail with reference to Soft Reset below).

Exception Processing

Exceptions in the processor are 'precise' exceptions in the sense that the exact instruction causing the exception can be derived. Hence, the operating system can be very specific in the way each exception is handled.

If the NMI-Lock bit (NL) is set to lock (1) the Exception causes a soft reset. In another embodiment, the Exception is ignored and the processor continues in Interrupt mode. In all other cases, the following actions are typically carried out by the processor:

The attempt to execute the current instruction is abandoned. In another embodiment, the current instruction is aborted.

If the processor is already in Exception Mode, and the priority flags are in the range 8-15, a soft reset is performed. The exception processing does not continue.

The address of the next instruction to be executed, when the handler finishes, is pushed to the Privileged Stack (high word then low word). This can be current instruction (PC) or next instruction (PC+2 or PC+4, depending upon whether the current instruction is 16 or 32-bit).

R1 is pushed to the Privileged Stack.
R0 is pushed to the Privileged Stack.

The contents of the FLAGS register just before the exception is pushed to the Privileged Stack.

The address of the instruction that caused the exception is placed in {R1, R0}.

The processor switches to Exception mode ((FLAGS[M]) is set to Exception).

The priority bits (FLAGS[P]) are set to the Exception Number (0 to 15).

PC is updated with the address of the Exception handler.

If the processor is not in Exception Mode, this is a first-level handler (the exception number is in the range 0-7), e.g. the UnknownInstruction1 exception.

If the processor is in Exception Mode, this is a second-level handler (the exception number is in the range 8-15), e.g. the UnknownInstruction2 exception.

On entry to the Exception handler {R1, R0} will point to the instruction that caused the exception. This is beneficial because instructions are variable in length and hence determining the start of the instruction that caused the exception by working back through the instruction stream is not a trivial task. Furthermore, in certain situations this could cause further exceptions (for example, if the instruction that caused the exception was the first instruction in a code segment then attempts to access the previous word could potentially cause a memory protection exception).

The various exceptions are listed in Table 15.

An example of the way the core processes an Exception is shown below:

```
if ((NMI-Lock == 0) && (Exception event))
{
Privileged Stack push= Next Instruction;
Privileged Stack push= R1;
Privileged Stack push= R0;
Privileged Stack push= FLAGS;
{R1, R0}      = LastPC;
FLAGS[M]      = ExceptionMode;
FLAGS[P]      = ExceptionNum;
PC            = 0x40 + (ExceptionNum * 4) + IVTB;
}
```

As described previously, returning from an exception is done by the rtie instruction. Accordingly a null exception handler is simply the rtie instruction alone, which can be accommodated within the Interrupt Vector Table.

TIE Events Generally

Traps and Exceptions are fixed properties of the processor. The IVC (Interrupt Vector Controller), however, is customisable for different applications thereby enabling a hardware designer to customise the Interrupt scheme (to fit in with the fixed Trap and Exception schemes) as required.

Generally the scheme used for Traps, Interrupts and Exception events is designed to minimise the work done by the rtie instruction. The scheme is also designed such that advantageously a single return instruction (rtie) can be used substantially identically when returning from any TIE event.

The address that rile pops from the Stack to the PC is that for the next instruction to be executed. Trap and Exception events can push the (address of the current instruction (currentInstruction) or the next instruction (nextInstruction) to be executed) to the Stack. Most Trap and Exception events require nextInstruction to be pushed to the Stack.

The value pushed to the Stack by an Interrupt event is one of:

The address of the next Instruction (PC+2 or PC+4), if the current instruction is completed.

The address of the current instruction (PC), if the current instruction is not completed, for example because:

A (div.*, divrem.*, rem.*) is aborted.

A (push, pop, pop.ret) is stopped at an intermediate state.

A (blkcp.r, blkst.r, blkst.8.r) is stopped at an intermediate cycle.

If a Trap, Interrupt or Exception handler is required to pop a different PC address from the address pushed to the Stack on execution of rtie, then it should be configured to modify the Stack value in dependence on the requirement, before executing the rtie instruction.

Some Trap events cause the processor to complete the current instruction before invoking the Trap handler, others do not.

Some Interrupt events cause the processor to complete the current instruction before invoking the Interrupt handler, whilst others do not. This determines whether the PC address pushed to the Stack is that for the next or current instruction (as described above).

Exception events cause the processor to invoke an Exception handler without completing the current instruction. The PC address pushed to the Stack is normally that for the next instruction (i.e. PC+2 or PC+4). However, the address of the current instruction (PC) is also retained (in {R1, R0}). If the Exception Handler is required to return operation to the current instruction on execution of ale, therefore, it should first copy {R1, R0} to the PC location on the Stack. On the other hand, if the Exception Handler is required to return to the next instruction on rtie, then no further operations are required.

Privileged Stack After a TIE Event

Figure 12:
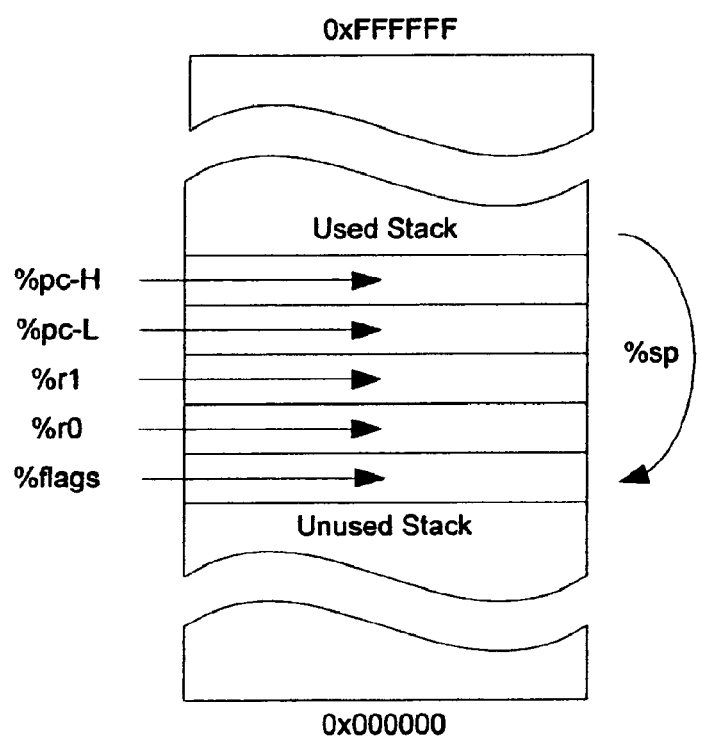
FIG. 12 shows a diagram illustrating changes to the privileged stack on invocation of trap, interrupt or exception events.

When a Trap, Interrupt or Exception event occurs, the processor performs a context-switch. It stores the current processor state by pushing four registers to the Privileged Stack using five word writes as illustrated in FIG. 12.

In operation, the Trap, Interrupt or Exception handler executes in a Privileged mode and will thus use the Privileged Stack. The Privileged Stack will therefore grow downwards as the handler uses it to store additional temporary variables. When the Trap, Interrupt or Exception handler has finished, terminating with an rtie instruction as described previously, it pops the five words from the Privileged Stack, thus restoring the processor to its original state before the Trap, Interrupt or Exception event.

Returning from Traps, Interrupts and Exceptions

As described above the rtie instruction is used to return from all Traps, Interrupts and Exceptions and can only be executed in Privileged modes. Regardless of the privileged mode from which it is executed, the rtie instruction unlocks NMIs (sets NMI-Lock to zero) before popping the FLAGS, R0, and R1 registers and then the Program Counter from the privileged stack as illustrated below:

```
NMI-Lock = 0;
FLAGS   pop= Privileged Stack;
R0      pop= Privileged Stack;
R1      pop= Privileged Stack;
PC      pop= Privileged Stack;   // low word then high word
```

Thus a null interrupt handler is simply the rtie instruction, restoring R0, R1, FLAGS and PC, enabling NMIs, then returning to the original code (being executed when the event originally happened).

Interrupt Vector Table for Traps, Interrupts, Exceptions

The layout of the Interrupt Vector Table (IVT) is shown in Table 15. The IVT contains instructions, typically for example the bra.i instruction (branch immediate) for branching to the relevant handler routines. The IVT manages traps, interrupts and exceptions. The IVT occupies 256 bytes from 0x010000 to 0x0100FF. The base addresses are: Trap base=0x010000; Exception base=0x010040; Interrupt base=0x010080. Resets (hard and soft) vector to Trap 0, which sets PC to 0x010000.

Each table entry has room for a 32-bit instruction (though a 16-bit instruction can also be used). This is typically a branch to the start of the actual handler, but may simply be the null handler (rtie instruction).

Relative Timing of Traps, Interrupts, Exceptions

Traps and Exceptions are processed when they occur, even if in the middle of an instruction. Interrupts (maskable and non-maskable) are generally analysed between instructions. A decision is then made as to whether to process them immediately, or to leave them in the interrupt pool.

Instruction Atoms

The exact timing of traps, interrupts and exceptions, may be considered in terms of 'instruction atoms' which are the 'indivisible' units which may be combined to build up an instruction. Accordingly, each instruction is built up of one or more instruction atoms. All instructions consist of one or more instruction atoms. At the end of each instruction atom, the system state is modified either by the update of one or more registers and/or the update of a further memory location Some events only occur when the complete instruction is finished. Other events, however, can be processed as soon as the current instruction atom is finished.

Most XAP5 instructions comprise a single instruction atom, however, others do not, for example:

ld.32.*=2 atoms st.32.*=2 atoms push=up to 8 atoms pop=up to 8 atoms pop.ret=up to 10 atoms (8 registers, PC-L, PC-H)

It will be appreciated that instruction atoms are not equivalent to clk cycles and each instruction atom will take one or more clk cycles.

Figure 13:
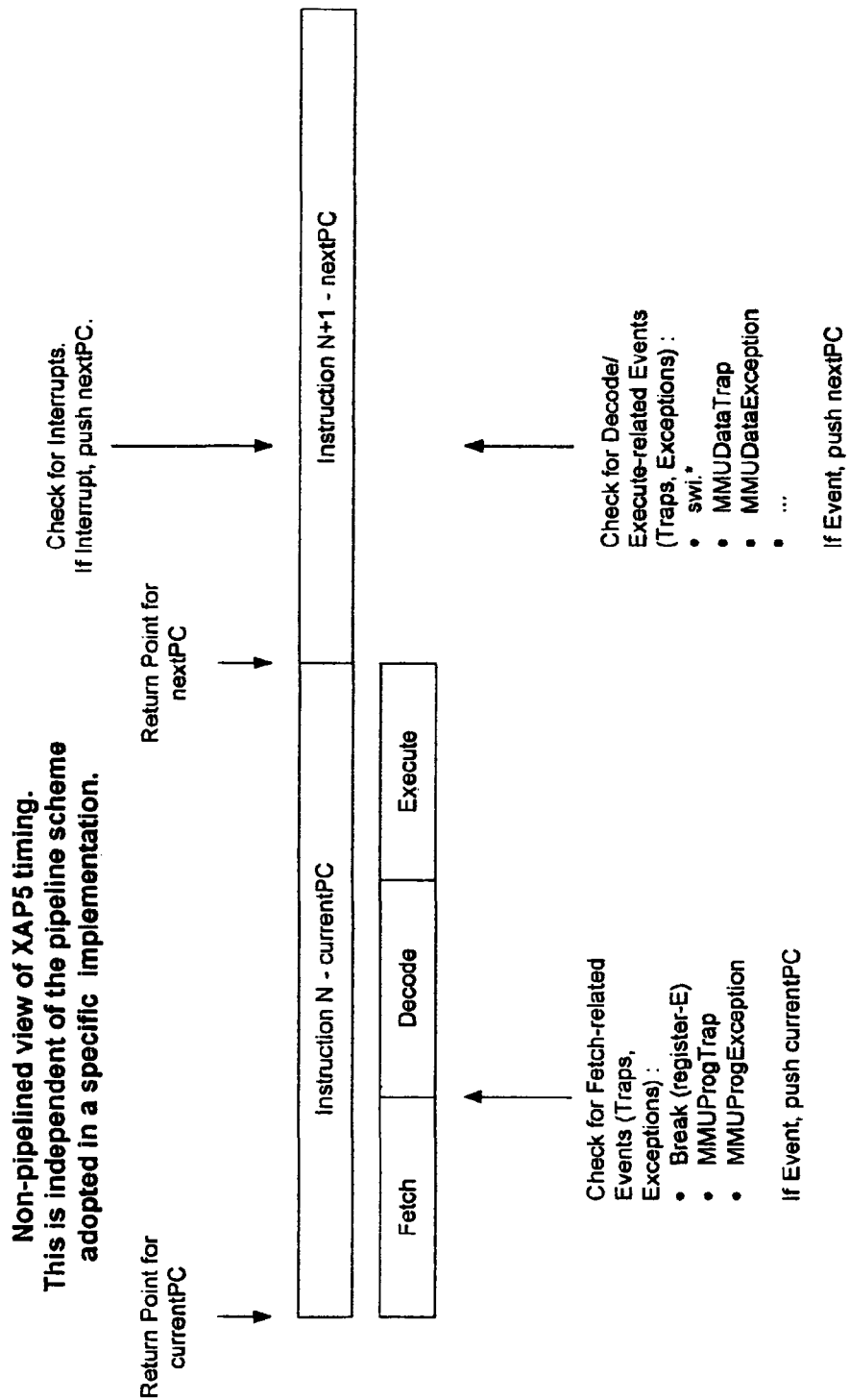
FIG. 13 illustrates the timing of events.

The timing of events is illustrated in FIG. 13.

Relative Priority of Traps, Interrupts and Exceptions

Table 13 illustrates the relative priority of different events and, in particular the events which take precedence over a current mode (and therefore switch processing to service the new event). Generally, other events do not take precedence and therefore do not change processor mode.

If an Exception occurs while pushing registers to the Privileged Stack for a context switch (after an accepted Trap, Interrupt or Exception event), the processor does a Soft Reset and sets 'error' output signal high for one clk cycle.

The processor does not immediately do a Soft Reset if an Exception occurs in the middle of the rtie instruction (doing a context return by popping registers from the Privileged Stack). Normal Exception processing is followed, which means that the Exception handler will be invoked. A Soft Reset only occurs on the third successive Exception.

As discussed above NMIs take precedence over Exceptions and Exceptions take precedence over Maskable Interrupts. They all take precedence over code currently executing in User or Supervisor mode. If the processor is already processing a maskable interrupt, a new maskable interrupt can only be processed if (I=1) and (the new Priority number is lower than the current one).

Whenever a new Maskable interrupt or NMI cannot be processed immediately, it is put into an interrupt pool which can only hold one interrupt request for each interrupt number (0-31). When the processor finishes processing the current interrupt, it will process the highest priority interrupt waiting in the pool.

Firstly, any NMIs are processed, the NMI with the lowest Interrupt Number (i.e Int00 then Int01 then Int02 then Int03) being processed first (the priority bits are ignored). Then any Maskable Interrupts are processed, with the lowest Priority number (0) being serviced first followed by interrupts with higher priority numbers. If there is more than one maskable interrupt with the same Priority number, the one with the lowest Interrupt Number (Int04 first to Int31 last) is processed first.

Thus, NMI is the highest priority level. NMI handlers should not use the swi.* instructions and should not cause any Exceptions. If these are encountered, the processor does a Soft Reset and sets the 'error' output signal high for one clk cycle. A hardware designer can decide what action to take if it does go high. It is preferable that the signal should be processed in the xap5_clocks_resets module.

These interrupt characteristics beneficially enable the hardware designer to create a system that mixes external (Interrupt) and internal (Trap and Exception) event priorities as required. The Trap and Exception characteristics are fixed. The hardware designer can choose the appropriate Interrupt numbers (fixed) and Priority numbers (fixed or programmable) for the various interrupt sources, to give the desired behaviour.

Simultaneous Traps, Interrupts, Exceptions

In the event of simultaneously occurring TIE events a number of rules determine which should be processed first (see table 16).

events relating to the instruction just completed, or to program fetch events for the next instruction. Program fetch events are therefore treated with a lower priority than any events arising from the instruction just completed.

There are four trap/exception events related to instruction decode. At most there can only be one of these active at a time. If one is active, then there cannot be any data read-write events, since none of the instruction-decode events access memory. Hence, instruction decode events effectively have a higher priority.

Within the data read/write events, the HW breakpoint trap (for memory read/write) has the highest priority to ensure proper debugger operation. Data_exception has a higher priority than data_trap, on the grounds that an exception is a more serious event. The OddAddress (illegal address) exception comes next, since this is based on the data that is returned from a memory read. Finally, null pointer has the lowest priority of the data read/write events, since if this occurs the related memory access is blocked from reaching the MMU.

Within the program fetch events, the priorities are similar to those for the corresponding data read/writes. The HW breakpoint trap (for memory execute) is the highest to ensure proper debugger operation. Similarly Prog_exception has a higher priority than prog_trap, on the grounds that an exception is a more serious event than a trap.

The priorities of simultaneously occurring events is summarised in Table 12.

Memory Model and Memory Architecture

Figure 9:
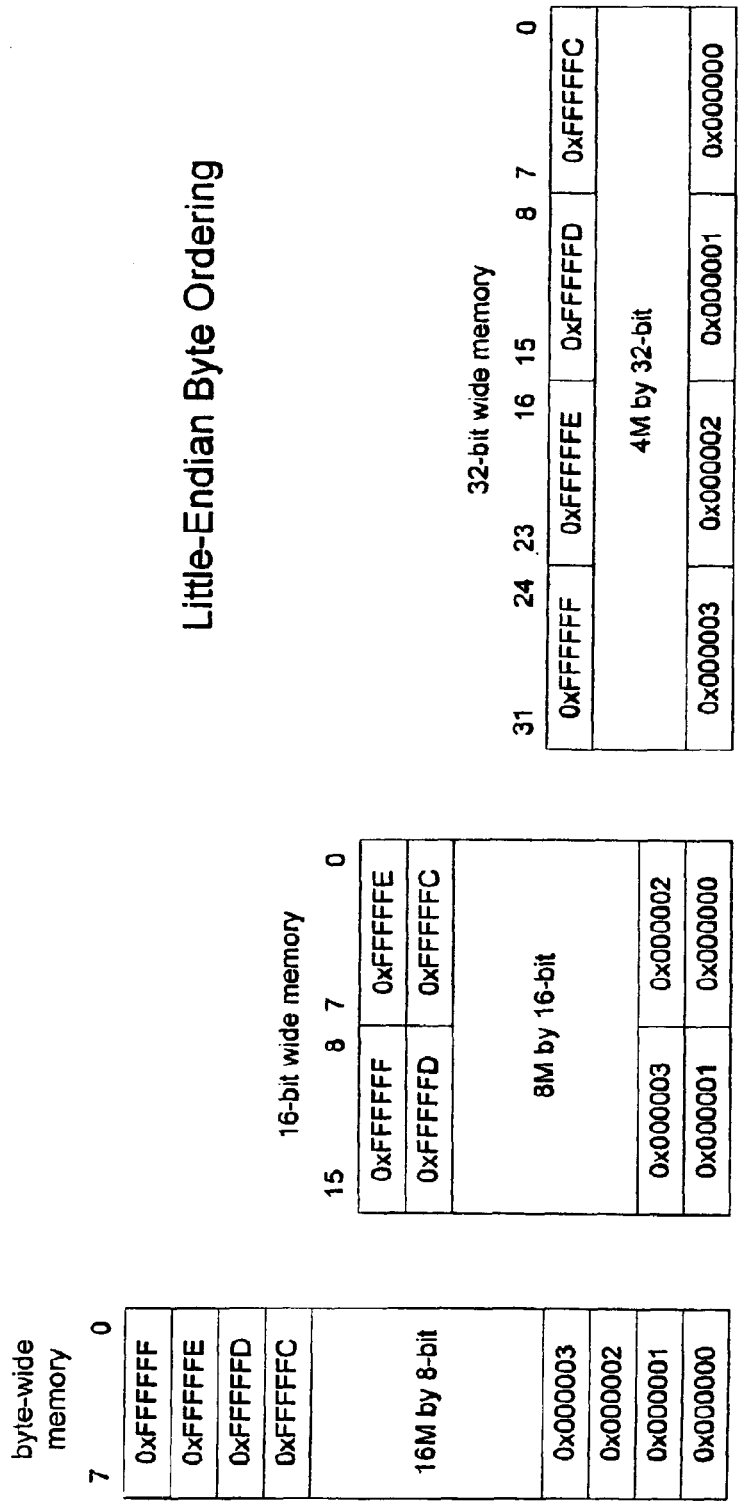
FIG. 9 shows a memory model for the processor, and in particular little endian byte ordering in a range of memory widths when using byte addressing.

FIG. 9 shows various example memory configurations.

As mentioned above, the processor memory model has a 24-bit address space (16 MB) which may contain both program code and data. This address space is byte addressed, and all function pointers are kept as full 24-bit byte addresses, which can be stored within a 32-bit register pair.

Near data pointers are 16-bit byte addresses and can be stored in a 16-bit register. Far data pointers are 24-bit byte addresses and can be stored in a 32-bit register pair. Instruc-

TABLE 16

| | Instruction Decode | | | Data read/write | | | | | Program Fetch (next instruction) | | | |
| --- | --- | --- | --- | --- | --- | --- | --- | --- | --- | --- | --- | --- |
| DivByZero | Software interrupt | Priviledged instruction | Break (SW) | Break (HW read/write) | Data_exception | Data_trap | Illegal address exception | Null-pointer trap | Next Break (HW execute) | Next Prog_exception | Next Prog_trap | Step Single-step trap |
| 1 | NA | NA | NA | NA | NA | NA | NA | NA | X | X | X | X |
| NA | 1 | NA | NA | NA | NA | NA | NA | NA | X | X | X | X |
| NA | NA | 1 | NA | NA | NA | NA | NA | NA | X | X | X | X |
| NA | NA | NA | 1 | NA | NA | NA | NA | NA | X | X | X | X |
| NA | NA | NA | NA | 1 | X | X | X | NA | X | X | X | X |
| NA | NA | NA | NA | 0 | 1 | X | X | X | X | X | X | X |
| NA | NA | NA | NA | 0 | 0 | 1 | X | NA | X | X | X | X |
| NA | NA | NA | NA | 0 | 0 | 0 | 1 | NA | X | X | X | X |
| NA | NA | NA | NA | 0 | 0 | 0 | 0 | 1 | X | X | X | X |
| 0 | 0 | 0 | 0 | 0 | 0 | 0 | 0 | 0 | 1 | X | X | X |
| 0 | 0 | 0 | 0 | 0 | 0 | 0 | 0 | 0 | 0 | 1 | X | X |
| 0 | 0 | 0 | 0 | 0 | 0 | 0 | 0 | 0 | 0 | 0 | 1 | X |
| 0 | 0 | 0 | 0 | 0 | 0 | 0 | 0 | 0 | 0 | 0 | 0 | 1 |

NA = cannot occur (must be 0)
X = don't care

The single-step trap is lowest priority because the state when the trap is triggered is retained and hence there is no penalty for delaying execution. The single-step event will eventually get handled when all higher priority events are dealt with.

Events are generally handled at the end of an instruction, and relate either to instruction decode or data read/write tions are aligned to a 16-bit boundary (i.e. bit 0 of the address is 0). However, it is not necessary for 32-bit instructions to be aligned to a 32-bit boundary.

All data objects may be unaligned, which means that 8-bit, 16-bit and 32-bit data may have any byte address. Aligned data may give a performance increase by requiring fewer bus operations, thus the programmer can trade off convenience, performance, and memory footprint against one-another. In FIG. 9 all data objects are shown aligned.

All words use little endian byte ordering, i.e. the low bits of a 16-bit or 32-bit word are at the low byte address.

The XAP5 can address 16 MB of linear byte-addressable memory space. Both code and data reside in the same memory space.

There are two memory modes which allow the processor operation to be optimised to different application types. The interactions between memory modes and the memory space are discussed below.

Near and Far Memory Modes

The processor switches between memory modes during operation, under program control, with zero time overhead.

The various memory spaces provided to program code and data are shown in the table below.

TABLE 17

|  | Near Mode | Far Mode |
|---|---|---|
| Maximum Code Size | 16 MB | 16 MB |
| Maximum Data Size | 16 MB but general use is 64 kB when using a simple compiler | 16 MB |
| Size of Code Pointer | 24 bits | 24 bits |
| Size of Data Pointer | 16 bits | 24 bits |

As mentioned above, the processor's current operating mode is indicated by the least-significant bit of the program counter. To change operating modes, the program writes to this bit using the normal instruction set—typically using a branch instruction (bra, bsr, bcc) or return instruction (pop.ret, rtie).

There are a number of differences between the memory modes. In particular, certain 16-bit instructions are interpreted differently depending on the mode. Furthermore, the stack pointer is used differently; in near mode it is limited to 16-bits by software, and in far mode the full 24-bits are used. The compiler also generates different instructions for some constructs; notably function and data pointers are treated as 32-bit numbers, requiring register pairs.

The desired memory mode is specified to the compiler and assembler. This allows the assembler to select the correct encoding for the subset of instructions whose encoding changes between memory modes. The assembler can also produce "Universal" binaries which execute correctly in both near and far modes, at the cost of decreased code density, since 32-bit instruction encodings must be used instead of mode-specific 16-bit variants.

Near Mode

Near mode is suitable for applications with large code requirements and data of less than 64 kB. Operation in Near mode is very efficient in terms of code density, speed and power consumption.

In Near mode, data pointers and indirect code pointers are 16 bits wide. To provide access to all 16 MB of memory (for program code), the pointers are indirected through a function table located in low memory (the first 64 kB of memory). Each function table entry is a full 24-bit program address requiring two code words. The indirection is supported by the instruction set with the bra.m and bsr.m instructions. The function table is generated automatically by the compiler.

Far Mode

Far mode is suitable for applications where the full 16 MB address space is required for both code and data. This involves the exclusive use of 32-bit pointers and therefore has a small performance penalty. This penalty is minimised by the inclusion of several instructions based on 32-bit values (e.g. ld.32.fi, st.32.fr) in the instruction set.

Both code and data pointers are 32 bits wide requiring a register pair to represent a pointer (although there is nothing to prevent use of 16-bit indirect pointers in Far mode, other than that it is not convenient for the compiler, and so we have chosen not to do so).

Figure 4:
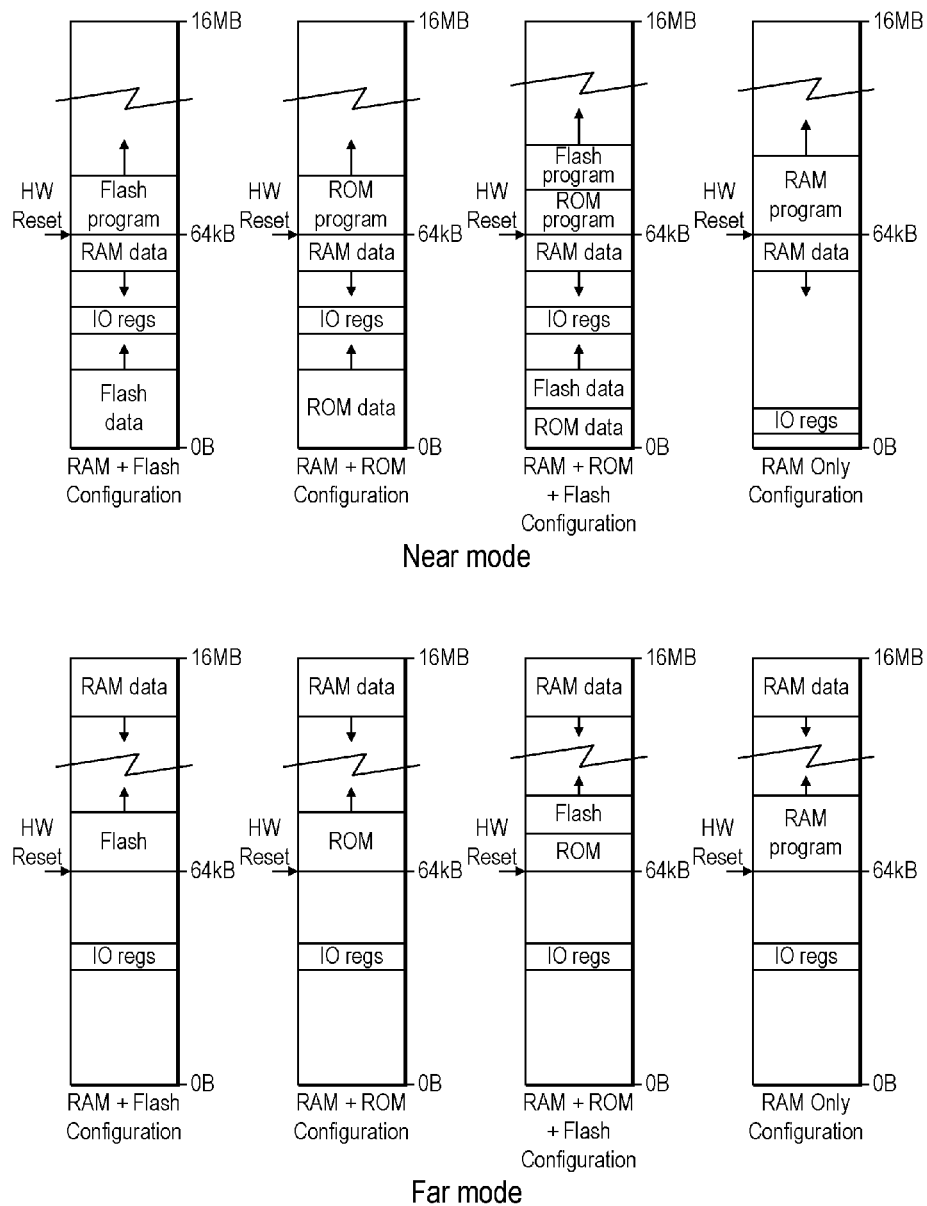
FIG. 4 shows a number of example recommended memory maps or models.

FIG. 4 shows some example recommended memory layouts.

Generating Addresses

When executing a program, the processor is often required to generate addresses or pointers.

The move instructions to generate base addresses (Ra) in general purpose registers are shown below:

Zero-relative:—mov.i sets bits [15:0] in a single register, mov.32.i sets bits [23:1] and forces bit[0] to 0 and bits[31:24] to zero in a register pair. Setting bit[0] to zero saves instruction encoding space by allowing a narrower literal and can be done because we are pointing to word aligned data objects.

PC-relative:—mov.32.i sets bit[23:0] and forces bits[31:24] to zero in a register pair.

In many examples the processor will have three types of memory mapped hardware: flash memory (used for program code and constants); RAM memory (used for variables, including local variables on the stack and global variables); and 10 registers (hardware interfaces to other devices).

There are two types of load and store instructions that use the following addressing modes to read and write memory: indexed addressing, which uses two registers to form an address which can access all memory from 0 to 0xFFFFFF; and displacement addressing, which uses a single register and offset to form an address which can access all memory from 0 to 0xFFFFFF.

The compiler can adopt various address generation strategies. A number of example address generation strategies are shown in the following table.

TABLE 18

|  |  | Near Mode | | | Far Mode | | |
|---|---|---|---|---|---|---|---|
| Type | Likely Device | Memory Range | Relative to? | Instruction | Memory Range | Relative to? | Instruction |
| Code | Flash | High | PC | mov.32.i | High | PC | mov.32.i |
| Constant | Flash | Low | Zero | ld.i or (mov.i then ld.r) | All | PC | mov.32.i then (ld.fi or ld.fr) |
| Global Variable | RAM | Low | Zero | ld.i or (mov.i then ld.r) | All | Zero or PC | mov.32.i then (ld.fi or ld.fr) |

TABLE 18-continued

| | | Near Mode | | | Far Mode | | |
|---|---|---|---|---|---|---|---|
| Type | Likely Device | Memory Range | Relative to? | Instruction | Memory Range | Relative to? | Instruction |
| Stack | RAM | Low | SP | ld.fi | All | SP | ld.fi |
| IO | IO Register | Low | Zero | ld.i | Low | Zero | ld.i |

Instruction Set Aspects
Notation Conventions

The following conventions are used to describe various aspects of the instruction set.

Registers are prefixed by %.

Rd is the destination register of the instruction

Rs, and Rt are the primary and secondary registers containing source operands

Ra, and Rx are registers containing a base address and index for an operand. An offset may also be added to the register contents to form the actual address of the operand. Ra is a byte address for the base. Rx is a scaled address for the index (*4 for 32-bit, *2 for 16-bit, *1 for 8-bit data). Both Ra and Rx are unsigned numbers.

Immediate[ ] indicates a constant operand encoded as part of the instruction. In the documentation #immediate [highbit:lowbit]s or #immediate[highbit:lowbit]u is used to distinguish between signed and unsigned immediates. Immediates are prefixed by #. Note, the # is not used for address offsets (e.g. @ (0, % r1))

Address[ ] indicates an absolute address. This is a byte-address, unless specified otherwise. Addresses are prefixed by @. In Near mode assembly by the assembler, Absolute addresses are interpreted as 16-bit unsigned numbers. In Far mode assembly by the assembler, Absolute addresses are interpreted as 24-bit unsigned numbers.

Base addresses stored in Ra are interpreted as byte addresses. Index offsets stored in Rx should be multiplied by (1, 2, 4) respectively for (8, 16, 32) bit data to get the desired byte address offset (16 bits, 17 bits, 18 bits). In Near access instruction, Ra is a single 16-bit register. In Far access instructions, Ra is a 32-bit register pair.

Offset[ ] indicates an address offset. This may be relative to the program counter (in branch instructions, for example), or to a pointer read from a register (the stack pointer, for example) or to 0 (i.e absolute addressing). Offsets can be signed or unsigned numbers (indicated by appended s or u). Offsets are byte-address values, unless specified otherwise. In the documentation offset [highbit:lowbit]s or offset[highbit:lowbit]u is used to distinguish between signed, unsigned and index offsets. In Near mode assembly, an offset should be extended to a 16-bit word before calculating an address. In Far mode assembly, an offset should be extended to a 24-bit word before calculating an address. A signed offset should be sign extended. An unsigned offset should be zero extended.

An example of a full instruction set for the processor is provided in Appendix A.

Instruction Encodings

There are 3 types of instructions:
16-bit only (e.g. most .r instructions)
32-bit only (e.g. most .i instructions)
16-bit and 32-bit (commonly used .i instructions)

The processor instructions are either 32-bits or 16-bits long. Certain instructions have either 32-bit encodings or 16-bit encodings, and other instructions have both 32-bit and 16-bit encodings. For instructions which are available in both 32-bit and 16-bit forms the assembler syntax is identical for both. The assembler normally selects the smallest encoding available. One exception is the branch instruction bra.i, which is commonly used to implement C "switch" statements. In such a situation it is necessary to force the assembler to generate either a 16-bit or 32-bit bra.i instructions. There are therefore specific variants of the bra.i instruction which force the assembler to generate either a 16-bit encoding or a 32-bit encoding.

The assembler can also be instructed to generate "universal" binaries, which contain only 32-bit encodings of the instruction set and can therefore be run both in Near and Far modes.

16-bit and 32-bit instructions can be freely mixed in the instruction stream.

The primary opcode for each instruction is OP[2:0] of the instruction. The OP values are interpreted as follows:
0-6 16-bit instruction (requiring a single fetch)
7 32-bit instruction (requiring a double fetch)

Appendix B shows the instruction encodings and opcodes for various 16-bit encoded instructions which have particular encodings depending on whether they operate in Near or Far mode.

Instruction Mnemonics

As shown in Appendix A, each instruction includes a mnemonic, which is a string in one of the following formats:
Base
Base.Parameters
Base.Type
Base.Parameters.Type
Base.Parameters.Type.Size Examples of Base are:
add
mov
ld
bra Examples of the Parameter are:
c—with carry
x—exchange order
z—zero-extend
s—signed
u—unsigned
8—8-bit operation
32—32-bit operation Examples of Type are:
r—register
i—immediate
h—high immediate
a—absolute address
p—PC-relative address
f—far pointer (32-bit base address register, Ra)

Examples of Size are:
2—2 byte, 16-bit instruction
4—4 byte, 32-bit instruction

A number of exemplary versions of the add instruction are shown below:
add.r (Add Rt to Rs and store result in Rd)
add.c.r (Add Rt to Rs with carry and store result in Rd)

add.i (Add Immediate to Rs and store result in Rd)
Registers
The 8 normal registers are referred to as % r0 to % r7. The Stack Pointer is referred to as % sp.

There can be several Registers in each instruction. They will be in the following sequence from left to right:
Rd—Destination Register
Rs—Primary Source Register
Rt—Secondary Source Register
Rx—Index Address Register (scaled by 2 or 1 for 16 and 8 bit data)
Ra—Base Address Register (address in bytes)

Some instructions, for example, push and pop, require a list of registers as an argument. The number of registers can vary. Such lists are enclosed in brackets. Within such register lists, registers can be specified in ranges which enables more compact assembler code (from the C compiler and disassembler).

Register-Pairs

Some instructions use two adjacent registers grouped together as a single 32-bit register-pair. The processor can use any adjacent register pair as a 32-bit register-pair using circular (modulo 8) counting, so there are 8 valid pairs {r1,r0}, {r2,r1}, {r3,r2}, . . . , {r0, r7}. Note that the register pairs do no need to start with an even numbered register which is a restriction see on other processor designs and so we call the pairs "unaligned pairs" because this lack of restriction is analogous to the lack of restriction described by the term "unaligned data". This assumes little-endian ordering i.e. the least significant 16-bits of data or address goes in the lowest numbered register of the pair and most significant 16-bits of data or address in highest numbered register of the pair, and note that in modulo 8 counting in the pair {r0,r7} r0 is the highest numbered register. The register-pair is referenced by the lower register. Valid register-pair references are written as % r0-% r7 in assembler code.

Immediates

There can be several immediates in each instruction. Immediate values in the assembly files are treated as 16-bit numbers, and the assembler determines whether the immediate value is compatible with the values permitted by the instruction mnemonics.

Addresses

There can only be one data address in each instruction. This will be prefixed by a "@" symbol. Address indirection is specified in one of the following formats:

| | | |
|---|---|---|
| @(offset, Ra) | @(−56, %r7) | // Ra = byte address |
| @(offset, SP) | @(−56, %sp) | // SP-relative addressing |
| @(offset, 0) | @(125, 0) | // Zero-Relative (absolute) addressing |
| @(label, 0) | @(name1, 0) | // Zero-Relative label |
| @(offset, PC) | @(125, PC) | // PC-Relative addressing |
| @(label, PC) | @(name1, PC) | // PC-Relative label |
| @(Rx, Ra) | @(%r4, %r7) | // Rx = scaled addr, Ra = byte addr |

Code addresses are resolved as 24-bit byte addresses. They are stored in registers and memory as 32-bits. Data addresses are resolved as 24-bit when far pointers are used, and are stored in registers and memory as 32-bits.

Data addresses are resolved as 16-bit when Near pointers are used, and are stored in registers and memory as 16-bits.

Details Relating to the Compiler, Assembler and Linker

The C compiler used to compile code for the processor is based on the GNU Compiler Collection (GCC) and is referred to herein as xap5-gcc. The assembler and linker are based on the GNU Binary Utilities (Binutils).

The word sizes that the GCC C compiler assumes in Near and Far mode are as follows:

TABLE 19

| | No of bits | |
|---|---|---|
| C compiler Type | Near mode | Far mode |
| Char | 8 | 8 |
| Short | 16 | 16 |
| Long | 32 | 32 |
| Int | 16 | 16 |
| Data Pointer | 16 | 32 |
| Function Pointer | 32 direct 16 indirect | 32 |

For function pointers in Near mode, the compiler places a table of "direct pointers", which are pointers that point to the function, in a table in memory, and stores indirect pointers in single 16-bit registers, which are pointers to entries in the table.

A XAP5 word is defined to be 16-bit.

The format used by the compiler and library for floating point variables is IEEE 754 Standard, implemented as little-endian (bit order within words and word order within the structure). This is consistent with the hardware support for 8-bit, 16-bit and 32-bit variables in the processor itself.

Addresses are computed in two ways, either PC-relative or absolute. The compiler generates PC-relative addresses for all code. Data objects (constants and variables) are PC-relative or zero-relative for Near and Far compile modes.

The instruction set contains 16-bit and 32-bit branch instructions. The compiler generates instruction mnemonics (in a .s file) and the assembler decides whether the instructions will be 16-bit or 32-bit. All branch mnemonics generated by the compiler are PC relative branches. Conditional branches generated by the compiler will be to locations within the same function; the assembler will compact most of these branches to 16-bit instructions. Unconditional branches within a source file (module) will be either 16 or 32-bit instructions (decided by the assembler). Unconditional branches between modules will be 32-bit instructions and will be resolved by the linker. By providing inter-module branches as 32-bit instructions, the need to perform relaxation in the linker is avoided, which makes the link time shorter and simplifies software tools. The linker may also perform "relaxation", so that some unconditional branches between modules could be implemented as 16-bit instructions.

Figure 5:
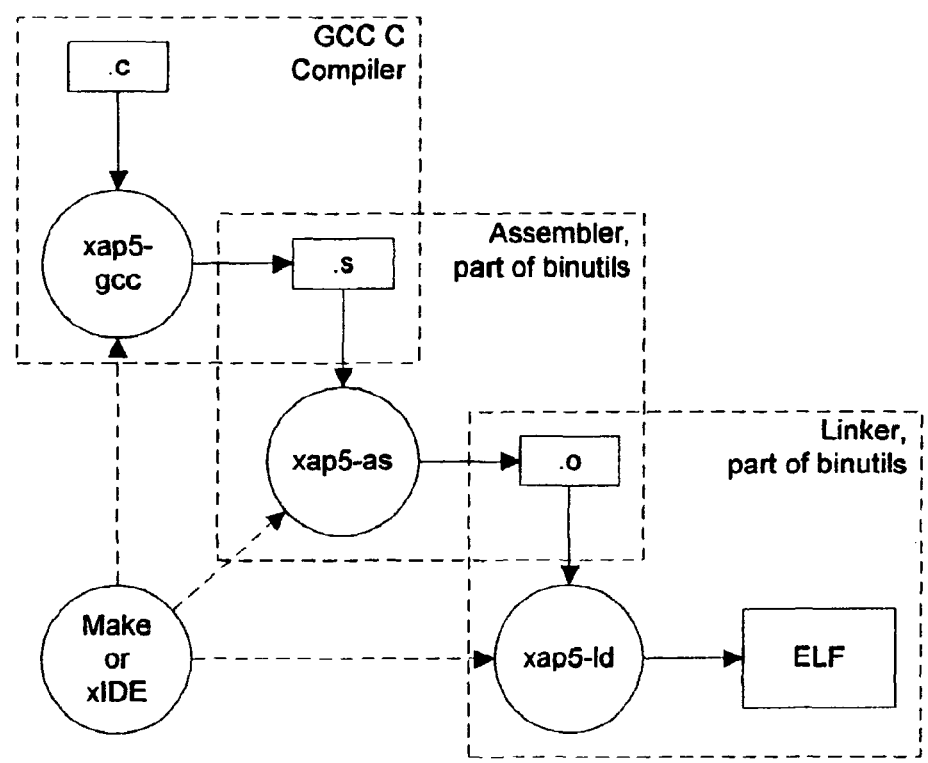
FIG. 5 shows a schematic diagram which illustrates the interaction between the compiler, linker and binary utilities.

FIG. 5 shows a schematic diagram of the interrelationship between xap5-gcc and the GNU Binutils.

Compiler and Assembler command line options for near and far data pointers are illustrated below in the following table.

TABLE 20

| Program | Option | Meaning | Comment |
|---|---|---|---|
| xap5-gcc | Near | .s file DataType = Near.<br>.s file contains:<br>Ra = R0-R7:<br>ld.*.r, st.*.r<br>ld.*.i, st.*.i<br>Ra = SP, PC:<br>ld.*.fi, st.*.fi<br>Ra = 0:<br>ld.*.i, st.*.i | All data pointers are 16-bit. They occupy a single register. Loads and stores use the full 24-bit SP. Software should manage the SP value to always stay in the range 0-64 kB. When SP is copied, only the bottom 16 bits are copied to a single register. |
| xap5-gcc | Far | .s file DataType = Far.<br>.s file only contains:<br>ld.*.fr, st.*.fr<br>ld.*.fi, st.*.fi | All data pointers are 32-bit. They occupy a register-pair. Loads and stores use the full 24-bit SP. SP can have any value in the range 0-16 MB. When SP is copied, the full 24 bits are copied to a register-pair. |
| xap5-as | Near | .o file DataType = Near.<br>16-bit instructions are used for:<br>ld.*.r, st.*.r<br>If the offsets are small enough, 16-bit instructions are used for:<br>ld.*.i, st.*.i<br>otherwise 32-bit instructions are used.<br>32-bit instructions are used for:<br>ld.*.fr, st.*.fr<br>ld.*.fi, st.*.fi | Generate warning if .s file DataType is Far. The generated .o file should only be linked with .o files that have DataTypes Near or Universal. The linked executable will only execute correctly if the XAP5 is in Near mode. |
| xap5-as | Far | .o file DataType = Far.<br>16-bit instructions are used for:<br>ld.*.fr, st.*.fr<br>If the offsets are small enough, 16-bit instructions are used for:<br>ld.*.fi, st.*.fi<br>otherwise 32-bit instructions are used.<br>32-bit instructions are used for:<br>ld.*.r, st.*.r<br>ld.*.i, st.*.i | Generate warning if .s file DataType is Near. The generated .o file should only be linked with .o files that have DataTypes Far or Universal. The linked executable will only execute correctly if the XAP5 is in Far mode. |
| xap5-as | Universal | .o file DataType = Universal.<br>32-bit instructions are used for:<br>ld.*.r, st.*.r<br>ld.*.i, st.*.i<br>ld.*.fr, st.*.fr<br>ld.*.fi, st.*.fi | The generated .o file can be linked with any other .o file. The linked executable will execute correctly when the XAP5 is in Near or Far mode. For a given .s file, the .o file will be bigger if Universal, than if Near or Far. |

The ".s file" contains a data type to indicate whether the file is expecting to access data in Near or Far mode. If the data type is not indicated, the .s file is assumed to be access data in Near mode only. The xap5-gcc generates the data type for all .s files (near or far, taken from a command line option provided to the compiler at compilation time).

The .o file also contains a data type to indicate whether they are Near, Far or Universal mode. The xap5-as generates the data type for all .o files (Near, Far or Universal, taken from the command line option). The xap5-as generates a warning if its command line option (Near or Far) does not match the data type of the .s file. If the command line option is Universal, the .s file data type can be Near or Far.

The xap5-ld generates a warning message if there are a mixture of Near and Far .o files to be linked. It does not generate warning messages if there are a mixture of near and Universal, or Far and Universal .o files.

Further Details of Near and Far Mode Aspects of the Processor

As mentioned above, the processor CPU architecture supports a single flat 24-bit (16 Mbyte) address space with 16-bit general-purpose registers and 16-bit arithmetic. A word is 16-bits and the C compiler defines an int to be a 16-bit value. The architecture is intended to be implemented in a CPU connected to a 16-bit wide memory system with 16-bit data buses.

This architecture provides most efficient operation when all data, including constants variables and I/O registers is contained within the low 64 kB of memory (16-bit address space, or low memory), without any restriction on the location of program code within the memory space. Thus, code can be located anywhere within the 24-bit address space. As mentioned, when the processor operates in this way it is said to be operating in Near mode.

The processor architecture can also support data access anywhere in the full 24-bit address space in both modes, however such accesses are most likely to be used when it operates in Far mode due to Compiler limitations and the advantageous assignment of the 16-bit instruction encodings to support Far accesses in that mode. This results in only a modest degradation in processing speed, RAM use, and code density.

The address space has been limited to 24-bits in the described example as it is expected that it will be sufficient for target applications at present and provides some cost savings and clock frequency benefits (e.g. 24-bit adders will have fewer gates and a shorter carry-chain than equivalent 32-bit adders). In another example, the processor architecture may be modified to support a 32-bit (4 GB) address space, since in most cases 24-bit addresses are stored in two 16-bit words in memory or two 16-bit registers, in both cases with 8 bits unused.

In both near and far modes, code (instructions) can be anywhere in the 24-bit (16 Mbyte) address space of the machine. The CPU contains a small number of 24-bit registers that are dedicated to holding addresses. These are the program counter, user and privileged mode stack pointers, and four breakpoint registers. Internal operations on the 24-bit registers can be accomplished in a single cycle using a 24-bit wide internal data path and 24-bit adders. Program addresses saved on the stack during subroutine calls, traps, exceptions or interrupts are saved and restored with two word-aligned word-wide accesses.

Addresses formed in general purpose registers from a value within one of the 24-bit registers may occupy one or two of the 16-bit general purpose registers depending on the operating mode. For example, the base address of an array held on the stack may be computed using "stack pointer relative" addressing, where an offset is added to the stack pointer, and the result stored in a single general purpose register in near mode, and in a general purpose register pair in far mode.

In near mode the instruction set is optimised to access data within a 16-bit (64 kB) address space. This has the advantage that data pointers can be stored in a single 16-bit register, and saved to the stack with a single 16-bit word access. When producing code for near mode the compiler, assembler, linker produce code optimised by using the assumption that all data accesses will be to addresses in the low 64 kB of memory, and by using the first configuration of the instruction set encoding optimisation described below. The stack pointer is also restricted to point to addresses in the bottom 64 kB of memory by software, even though the hardware stack pointer is still an unrestricted 24-bit register. This ensures that when the address of an object on the stack must be computed and stored in a general-purpose register the address can be stored in a single register.

When the processor is in near mode, zero relative addressing is used for global data (global constants and global variables). Thus, the load and store instructions in near mode are relative to R0-R7 and to zero.

In far mode the instruction set is optimised to access data that can appear anywhere within the 24-bit (16 MB) address space. Data pointers thus use two 16-bit registers, which increases the number of times registers must be saved to, and restored from, the stack to free up usable registers. Two 16-bit accesses are required in order to save data pointers to the stack when in far mode.

When producing code for far mode the compiler, assembler and linker produce code that can access data anywhere within the 24-bit address space, and by using the second configuration of the instruction set encoding optimisation described below. Far mode uses PC-relative addressing for global data (global constants and global variables). It is also possible to support zero-relative addressing in far mode.

Changing the Instruction Set Encoding Between Near and Far Modes

The near mode/far mode instruction set optimization mentioned above is implemented by changing the subset of the instructions that are mapped to short instruction encodings depending on the selected mode.

Since the number of bit patterns that can be expressed in an n-bit instruction encoding is $2^n$ it follows that there are many fewer short instruction encodings than long instruction encodings available for a given instruction set. Thus, short instruction encodings are a scarce resource, and since they enable code of a higher efficiency and code density to be compiled the allocation of short instruction encodings has a significant impact on the performance of the processor. Accordingly, instead of statically allocating short instruction encodings to particular near or far mode instructions, the instruction encodings are dynamically allocated for each of near and far modes during compilation and linking, so as to ensure that the operation of the processor is optimised for the particular memory mode in which it operates.

In particular, during compilation and linking those memory access instructions that are most likely to be executed frequently by code operating in a selected mode are assigned short instruction encodings. This provides improved code density and a corresponding reduction in instruction fetch bandwidth and instruction fetch time.

Further details relating to the compiler and linker have been described above.

All instructions are available for both near and far modes, with some instructions having short encodings in both near and far mode and other instructions having short encodings in only one of the modes. However, those instructions that have short encodings in one mode and not the other mode have equivalent long instruction encodings available in the other mode. There are also a small number of cases where the behaviour of an instruction is changed by the mode setting. For example the bra.i instruction writes a different constant value to PC[0] in Near mode and in Far mode, that has the effect of ensuring that the mode does is not changed by bra.i Long instruction encodings are also of use in either mode since they provide wider literal fields than the short encodings of the same instruction, and hence support a greater range of arguments, offsets, and branch span.

In the processor there are two lengths of instruction encoding, either 16-bits or 32-bits, which are mixed together freely in the instruction stream. Of the 16-bit encodings those which map to load and store instructions change their behaviour depending on the near mode/far mode setting. In near mode the 16-bit encodings of load and store instructions map to instructions for performing memory access to the first 64 kB of memory using addresses held in a single general-purpose register (for example ld.i, lds, st.i, st.r in all their variants for different data types). In far mode the 16-bit encodings of load and store instructions map to instructions that allow memory access to the entire 24-bit address space using addresses held in register pairs (for example ld.fi, ld.fr, st.fi, st.fr in all their variants for different data types).

Note that near mode operation achieves efficiencies in several other ways in addition to the efficiencies that arise from the changing of the instruction set encoding. In particular, the use of a single 16-bit register to hold data pointers rather than a register pair reduces "register pressure" which reduces the number of times registers must be saved on the stack and subsequently restored from the stack in order to free up a register for another purpose. Furthermore, the use of 16-bit integers and 16-bit pointers means that the total RAM usage is reduced and the number of cycles required to access 16-bit wide memory is also reduced compared to using 24-bit or 32-bit values.

Regardless of whether the processor is configured to operate in near mode or far mode, all load and store instructions are always available in the longer 32-bit encodings. Thus the full range of instructions for performing near and far mode memory accesses are indeed available in both modes via the longer instruction encodings. The 32-bit encodings also have wider immediate operand fields, and hence can be selected in cases where the immediate operand is out of the range that can be expressed in the narrower immediate operand field of the 16-bit encoding.

The optimisation of the instruction set by changing which instructions are assigned to the shorter 16-bit encodings improves the code density and reduces the instruction fetch time by allowing more frequent use of the 16-bit instructions.

It is also possible to write code that will operate correctly regardless of whether the processor is configured to operate in near mode of far mode, by only using 32-bit encodings of load and store instructions. In this case the code is compiled with a "Universal" command line setting to generate such code. This is one method for allowing library routines to be called from subroutines running in either mode. Another method of doing so is for the library to force the processor into either near or far mode upon entry, and then restore the processor mode upon return.

When creating universal code that can be called from either near mode or far mode, it is necessary to ensure that the universal code will work correctly in a system where different register allocation strategies and pointer widths are used in near mode code and far mode code calling conventions. To accommodate this universal code libraries either provide different entry-points for near mode and far mode callers, or examine the state of the F bit to determine the correct handling of operands passed by callers.

Having all instructions always available in their longer instruction encodings also means that a machine running in near mode has a mechanism for accessing data above the 64 kB limit. In particular, if most of the data were small enough to fit into the bottom 64 kB except for one large data object, the processor could be generally run in near mode, and a subroutine could be written specifically to access the one larger data object, which would be located in high memory, using the 32-bit encoding of far mode instruction.

Alternatively, it would be possible to switch to far mode upon entry into the subroutine which uses the larger data object, and then switch back to near mode when the subroutine exits. This provides improved code density and allows the routine to be compiled using the far mode compilation option which would allocate registers using far mode register conventions.

In one 2-stage pipelined implementation of the XAP5 RISC processor near mode achieves 0.6 DMIPS/MHz and far mode achieves 0.4 DMIPS/MHz. This demonstrates the improved efficiency achieved by near mode. DMIPS/MHz is Dhrystone VAX MIPS per MHz. This means that in near mode the processor running at 100 MHz achieves 60 times the performance of a VAX 11/780 running the same Dhrystone benchmark. In far mode at 100 MHz, the processor achieves 40 times the performance of the VAX 11/780. The VAX 11/780 is widely used as the industry reference 1MIPS machine.

Dynamic Switching Between Near and Far Mode

The processor allows the operating mode (near or far) to be dynamically altered by the software as the software is executed on the processor. This allows different code modules to be compiled with the instruction encodings which are optimal for the modules particular data usage pattern. Thus, for example, if a system generally accesses only a small area of memory and has one library of code that accesses a large data object, most of the code could be compiled to run in near mode, with only the particular library of code that calls the large data object being compiled to run in far mode.

The operating mode is controlled by the processor using a spare or redundant bit located in the program counter register. In this way, the operating mode is conveniently stored together with the address of the next instruction to be executed. Thus, when a subroutine is called, which requires the mode of the processor to be changed, the PC is pushed onto the stack, along with the bit in the PC which indicates the present mode of the processor, and the subroutine is then executed in the mode in which it has been compiled to execute. When the subroutine then returns to the calling function, the PC is then restored, thereby restoring the processor to the previous operating mode.

Redundant bits in the Program Counter arise when instructions are restricted to starting at a byte address that is a multiple of $2^n$ for some small integer n. In one example, the processor uses 16-bit and 32-bit instructions that must be 16-bit aligned, which is equivalent to saying that they must start at a byte address that is a multiple of 2. This gives one redundant bit at the bottom of the PC. In an alternative example, in which instructions are 32-bit aligned (i.e. having a start address which is a multiple of $2^2$), 2 redundant bits are available at the bottom of the PC.

As mentioned above, this control bit that determines whether instructions are interpreted as being in near mode or far mode is referred to as the "F" bit, and is stored in the redundant least significant bit of the PC. When F=0 the processor operates in near mode, and when F=1 the processor operates in Far mode. F is set to zero at reset.

For convenience, the following terms are used herein:
Program Counter Register or PCR is the 24 bit register holding 23 program counter bits and the F bit.
F bit is PCR[0]
Program Counter Value or PCV is the 23 bits that hold address information, it is the field held in PCR[23:1].
Program Counter Address or PCA is the byte address of the instruction the PCV currently refers to. It is the 24-bit address PC1=1[23:0] AND 0xFFFFFE, which is equivalent to PCV[23:1]*2.

In one example, when the code branches during execution the return address is stored on the stack, for example, following a branch instruction or following a processor event such as an interrupt, exception or trap. In an alternative example, the return address might be saved in a link register or on a hardware return stack, in which case the same principle of using redundant bits in such registers will apply.

A further advantage of using the redundant bit in the PC register is that a branch instruction can change the PC to the new execution point, and switch to the new operating mode in parallel. It is convenient, though not essential, to use the bottom bit of the branch instruction's target address operand, which is often an offset for PC relative addressing, and which might be a register operand or an immediate operand to supply the F bit.

Using the redundant bit also allows dynamic mode switching to be implemented without increasing storage use and without adding extra instructions or machine cycles to change operating mode during a subroutine call or event handler entry, and without adding extra instructions or machine cycles to switch back to the original mode when returning to the originally executing code segment.

The storing of the operating mode together with the program counter information in this way allows the operating mode to be altered according to the needs of the subroutine, interrupt handler, or exception handler. The operating mode can then be conveniently restored by writing the saved value of the operating mode bit(s) at the same time that the program counter is restored. Since the program counter value and operating mode control bits are stored within one register the restoration of these two values will happen in a single operation. Similarly operating mode information can be encoded within function pointers and absolute or offset addresses used for calling functions/subroutines.

Details Relating to the Use and Updating of the PCV and F Bit in the PCR

In one example implementation of the processor instruction fetches are performed in a pipelined manner, i.e. one instruction ahead of the currently executing instruction. The byte address of the current instruction is PCA=PCR[23:0] AND 0xFFFFFE, i.e. it is formed by replacing F with a zero bit. The instruction fetch will use the address PCA+2 or PCA+4 depending on whether the current instruction has a 16-bit or 32-bit encoding.

The PC is always used as a full 24-bit register. The following operations are all PC-relative operations and are carried out based on offsets from the current value of the PC:
  Unconditional Branches
  Conditional Branches
  PC-relative loads and stores
  Moving a PC-relative address to a register-pair When the PCR is updated, all 24 bits are set, i.e. PCR[23:1] is set to the address of new execution point, and PC[0] is set to the new value of the F bit.

When the PCR is copied to the stack (e.g. during a branch, trap, interrupt, or exception), all 24 bits are copied, and when the stack is copied back to the PCR (e.g. by a pop.ret or rtie instruction) all 24 bits are copied back to the PCR.

The PCR register value is used or modified by unconditional branches, conditional branches, PC-relative loads and stores, and when moving a PC-relative address to a register-pair.

Unconditional Branches and Branch Subroutines

The offset specifies which of near or far mode the processor should be executing in after the branch.
Zero relative addressing:—
  PCR[23:0]=Offset[23:0] so F bit is set to be Offset[0]
PC relative addressing:—
  PCR[23:1]=offset[23:1]+PC[23:1]
  PCR[0]=offset[0]
  (Note that the F bit is a copy of offset[0] even though other bits are updated with an addition.)
Register:—
  Register operand giving the target address is even.
Zero relative branch via memory:—
  This is a branch via a function pointer table located in low memory. The bra.m or bsr.m instruction specifies a zero relative 16-bit offset which specifies an address in low memory. The processor loads two 16-bit words starting at the specified address and interprets this as a 24-bit function pointer fp (with 8 unused bits), and branches to the 24-bit address created by anding fp with 0xFFFFFE. The F bit is loaded from the LSB of the 24-bit function pointer, so that even function pointers cause the target function to be executed in Near mode, and odd function pointers cause the target function to be executed in Far mode.
Register branch via memory:—
  Similar to the zero relative branch via memory, except that the address of the 24-bit function pointer in low memory is specified by the value in a single 16-bit general purpose register. The address of the 24-bit function pointer in low memory and the 24-bit function pointer itself is even.

Conditional Branches

All conditional branches are relative to the current program counter value. The conditional branches do not change the value of the F bit (PC[0]), i.e. the processor remains in its current mode (either near mode or far mode). Thus, the new PCR[23:1] will equal the current PCR[23:1] plus an offset, and the new PCR[0] will equal the current PCR[0], leaving the F bit unchanged.

PC Relative Addressing for Load and Store Instructions

PC relative addressing for load and store instructions uses the PCA as the base address, i.e. it ands PCR[23:0] with 0xFFFFFE to form the base address and then adds a signed byte address offset.

PC Relative mov.32.i

This instruction loads a 24-bit address into a pair of 16-bit general-purpose registers by adding a signed offset to the address of the current instruction. This facilitates the generation of position independent code.

The LSB (least significant bit) of the register pair is loaded with a copy of the LSB of the offset. This way the value in the register pair indicates an address, and also the operating mode required by code located at that address.

This instruction calculates a 24-bit PC-relative address and stores it in the 32-bit register-pair {R(d+1), Rd} as follows:
  Rd[0]=offset[0] (near or far mode indication for code at address)
  {R(d+1)[7:0], Rd[15:1]}=PCR[23:1]+offset[23:1]
  R(d+1)[15:8]=0

The Operation of the Stack in Near and Far Mode

In near mode the stack is limited via software to the bottom 64 kB of memory (low memory). In far mode the stack can be located anywhere within the 16 MB address space. This is required since addresses may be formed in a general-purpose register by taking the stack pointer and adding an offset to it, for example, to create a pointer to the start of an array in the stack frame of the current C function. If the stack is restricted to use the low 64 kB of memory the resulting address can be stored in a single 16-bit general purpose register in a manner consistent with other near mode register usage for addresses (pointers). If the stack uses addresses above the first 64 kB the resulting address will need to be stored in two 16-bit registers in a manner consistent with other far mode register usage for addresses (pointers). This consistency simplifies code generation and register allocation by the compiler and allows the code density optimisation that comes from allocating the short instruction encodings to match the needs of the selected one of near or far mode.

Far mode instructions use register pairs to hold 24-bit address values. The register pairs which may be used are described above.

The "unaligned pairing" of adjacent registers, described in detail earlier, allows a mix of 16-bit and 32-bit registers to be allocated by the compiler without wasting any registers.

Function Pointers via an Indirection Table

The instruction set allows register pairs to be used to store function pointers in both near and far modes and this can be used by assembler language programmers and compilers. However, the GNU GCC compiler has difficulty handling function pointers that are a different length to data pointers. In near mode code size and RAM use is optimised by using 16-bit pointers to data with data being restricted to the low 64 kB of memory. Data pointers then only require one 16-bit general purpose register, and data addresses pushed onto the stack are local variables or operands which also only need to store 16-bits of data. Furthermore, data pointers are used extensively by C programs, and hence being able to use 16-bit data pointers is an important optimisation. However, in near mode the processor also supports a full 24-bit address space for program code, so function pointers need to be 24-bits, and given the 16-bit architecture of the processor, they are usually stored as two 16-bit values consuming 32-bits. This presents some difficulties for the GCC compiler, since it is required to generate code with two different pointer sizes.

Accordingly, a table comprising all the 24-bit function pointer values used by the processor is constructed in low memory, where it can be referenced with a 16-bit pointer. The table thus contains the entry point addresses for each function in the code whose entry point is assigned to a function pointer. In this way the C compiler can use pointers of the same length for both data and function pointers which makes it easier to use an existing compiler, such as the GCC compiler. In this case the pointers are all 16-bit pointers. Function pointers do not point directly to the function (which would require a 24-bit pointer), but instead point to the entry in the table in low memory that points to the function. Each entry in the table is a pair of 16-bit words starting on a 16-bit aligned boundary (an even byte address). This consumes 32-bits of memory for each 24-bit pointer. This design is preferable since it allows the use of two efficient word aligned word accesses to read entries from the table.

In practice the software system may contain several such tables, each containing a subset of the functions that are assigned to particular function pointers. The details of this will depend on the exact details of the software tools, the way the system's code is partitioned, and the compilation and link strategy employed.

The instruction set also includes the following zero relative and register forms of two instructions to support efficient indirection through this table:

bra.m (branch via memory)
bsr.m (branch subroutine via memory)

Further Hardware Implementation Aspects

An example of the processor has 16-bit wide register—memory data buses, and 32-bit internal busses between the registers and ALU thereby allowing various operations on addresses and register pairs to be performed in a single cycle. Thus, the computation of addresses for branches and load/store operations, the copying of data from a register pair or 24-bit address register to another register pair or address register, and certain 32-bit arithmetic operations can be performed in a single cycle. The processor also supports a range of 32-bit arithmetic instructions. In one example implementation of the processor a 32-bit addition of a register pair with an immediate operand can be performed in a single cycle. The 32-bit addition of two register pairs is performed in two cycles thereby to avoid the need to read four registers in the same clock cycle.

In one example there is provided a processor capable of (preferably) dynamically switching between near and far memory models, and which (preferably) comprise an efficient method for handling larger program memory (16 MB) than data memory (64 kB) when in near mode. The processor preferably includes a Von Neumann memory model and a modern RISC load-store architecture.

It is often difficult to predict the full memory requirements of a software system until the software system has been completely written and debugged. Given that many systems involve long development times for dedicated system-on-chip development, or for printed-circuit-board development and software development, changing to a different microprocessor late in the product development cycle would be extremely costly. Thus, if a microprocessor that can only access a small (e.g. 64 kB) memory system limit for data is used this carries the risk that the memory size may eventually prove to be insufficient. This might then lead to a significant cost increase if the development reaches the "hard" 64 kB data limit, and a larger microprocessor is then required. In contrast, the processor as herein described allows development to proceed using highly efficient code in near mode for a small memory system, and enables the use of further memory should the small memory address space prove to be insufficient. In particular, if access to a data address space greater than 64 kB is required the entire code base could be re-compiled using far mode, with only some modest performance reduction, or alternatively the code can be partitioned into code that only accesses the lower small memory space in near mode (hence running as an efficient 16-bit processor), and code that can access the larger address space in far mode. The near mode code will suffer no performance penalty.

Summary of Certain Features and/or Characteristics of the Processor

In an example, the processor exhibits the following characteristics or features:

The processor is a 16-bit RISC processor with advanced C compiler support, capable of addressing 16 MB.

The processor includes eight 16-bit (general purpose) registers.

The processor includes the following 24-bit registers: a Program Counter (PC), a Stack Pointer (SP) and four Breakpoint registers.

The processor has a user mode and three privileged modes (Supervisor, Exception and Interrupt).

The processor is capable of providing nested traps, exceptions and interrupts, with a response time of 9 to 15 clock cycles.

The processor is based on a Von Neumann architecture with little endian addressing/organisation.

The processor is provided with a serial debug interface, for example, the Cambridge Consultants Limited™ SIF™ interface.

Implementations of the processor may be developed and tested using the Cambridge Consultants Limited™ xIDE™ developer environment with a GCC C compiler.

The processor may be provided as a soft IP core in Verilog RTL.

At around 18,000 gates the processor offers a small footprint, low power, and high performance processor core for ASIC designs.

This 16-bit processor may be used instead of costly 32-bit cores in many applications.

The processor provides protected operating modes for secure software execution and isolation of user, supervisor, exception and interrupt code.

The processor is a Von Neumann RISC machine which provides efficient low power system design using a unified memory architecture that simplifies Flash memory programming.

The processor supports C program constructs and provides software portability, position-independent code, and near and far mode compiler linking options.

The processor exhibits high code density (comparable to 32-bit processors).

Fast interrupt response time is provided (within 9 cycles or 15 cycles in the case of a nested interrupt).

Multi-cycle instructions accelerate C function entry/exit, block copies, string handling, multiplication, division and MAC.

The processor is a little-endian machine with byte addressing and unaligned data access that is adapted to pack data tightly in memory.

The following performance characteristics apply to an example of the processor:

0.6 Dhrystone MIPS/MHz.
Fast 50 DMIPS at 83 MHz.
Small 18,000 gates in 0.09 mm².
Dynamic power of 26 µW/MHz.

The above performance figures are based on 130 nm CMOS logic.

| Certain preferred characteristics of one example of the processor | |
|---|---|
| Preferred Memory Width | 16 bit |
| Data Bus | 16 bit |
| Address Bus | 24 bit |
| Memory limit | 16 MB |
| Memory Organisation | little endian |
| Instructions | 16 bit - 87.5% |
| | 32 bit - 12.5% |
| External serial interface shift register | 84 bit |
| Internal serial interface registers (Address, Control, Data, Status) | 24, 8, 32, 20 bit |
| Processor Modes | 4 |
| User Registers | 8 * 16 bit, R0-R7 |
| Stack Pointer | 2 * dedicated 24 bit |
| Program Counter | Dedicated 24 bit PC |
| Breakpoint Registers | 4 * 24 bit |
| int variable | 16 bit |
| Data Pointers | 16 bit - Near Mode; 32 bit - Far Mode |
| Function Pointers | 32 bit |
| Software Toolkit | xIDE ™ for XAP5 |
| C Compiler | GCC |
| Assembler | GNU Binutils |
| Linker | GNU Binutils |
| Code | PC-relative (Near and Far Mode) |
| Const | PC-relative (Far Mode); 0 relative (Near Mode) |
| Global Variables | PC-relative (Far Mode); 0 relative (Near Mode) |

It will be understood that the present invention has been described above purely by way of example, and modifications of detail can be made within the scope of the invention.

Each feature disclosed in the description, and (where appropriate) the claims and drawings may be provided independently or in any appropriate combination.

APPENDIX A

Instruction Set

Programmer's Model

| | | | | |
|---|---|---|---|---|
| Memory | 16 MB, byte addressing, little-endian. All 16 MB available for programs. Reset starts execution from 0x010000. | Low memory = 0x000000 to 0x00FFFF | | Available for Near and Far mode data accesses. |
| | | High memory = 0x010000 to 0xFFFFFF | | Available for Far mode data accesses. |
| Registers | 16-bit | R0-R7, FLAGS, INFO, BRKE | | |
| | 24-bit | PC, SP, BRK0-BRK3 | | |
| Flags | 16-bit | 15 14 13 12 11 10 9 8 7 6 5 4 3 2 1 0 | | |
| | | P3 P2 P1 P0 S3 S2 S1 S0 I _ M1 M0 V C N Z | | |

Assumptions

Flags are not updated when Rd == SP. PC, SP imply all 24-bits of each register.
Rd, Rs, Rt, Ra, Rx imply all 16-bits of each register.
Rd = Destination. Rs, Rt = Source. Ra = Address. Rx = Index.
Possible register values are R0-R7 unless stated otherwise.
The figures for number of cycles assume aligned memory accesses.
Add one cycle per unaligned access.
All figures for number of cycles assume 16-bit single cycle memory is used.
This example of the XAP5 processor has 187 instructions.

| Mnemonic | Operands | Operation | | Flags | Cycles | |
|---|---|---|---|---|---|---|
| | | | | | 16-bit instr | 32-bit instr |
| Branches | | | | | | |
| Unconditional | | | | | | |
| bra.i | (label, 0) | PC = label. Zero-relative. | | — | — | 3 |
| | (label, PC) | PC = label. PC-relative. | | | | |
| bra.i.2 | (label, PC) | PC = label. PC-relative. | | — | 2 | — |
| bra.i.4 | (label, PC) | PC = label. PC-relative. | | — | — | 3 |

APPENDIX A-continued

Instruction Set

| | | | | | |
|---|---|---|---|---|---|
| bra.r | Ra | PC = {R(a+1), Ra}[23:0] | — | 2 | — |
| bra.m | @(label, 0) | PC = *(label) | — | — | 6 |
| | @(0, Ra) | PC = *(Ra) | — | 5 | |
| bsr.i | (label, 0) | Stack = nextPC; PC = label. Zero-relative. | — | | 4 |
| | (label, PC) | Stack = nextPC; PC = label. PC-relative. | | | |
| bsr.r | Ra | Stack = nextPC; PC = {R(a+1), Ra}[23:0] | — | 3 | — |
| bsr.m | @(label, 0) | Stack = nextPC; PC = *(label) | — | — | 6 |
| | @(0, Ra) | Stack = nextPC; PC = *(Ra) | | | |

Conditional

| | | | | | |
|---|---|---|---|---|---|
| bcc (= bge.u) | (label, PC) | if (C == 0) PC = label; else PC = next_instruction; | — | 1 / 2 | 2 / 3 |
| bcs (= blt.u) | (label, PC) | if (C == 1) PC = label; else PC = next_instruction; | — | 1 / 2 | 2 / 3 |
| beq | (label, PC) | if (Z == 1) PC = label; else PC = next_instruction; | — | 1 / 2 | 2 / 3 |
| bez.r | Rs, (label, PC) | Flags set for Rs;<br>if (Rs == 0) PC = label; else PC = next_instruction; | ZNCV | 1 / 2 | 2 / 3 |
| bge.s | (label, PC) | if (N == V) PC = label; else PC = next_instruction; | — | 1 / 2 | 2 / 3 |
| bge.u (= bcc) | (label, PC) | if (C == 0) PC = label; else PC = next_instruction; | — | 1 / 2 | 2 /3 |
| bgt.s | (label, PC) | if ((N == V) && (Z == 0)) PC = label; else PC = next_instruction; | — | 1 / 2 | 2 / 3 |
| bgt.u | (label, PC) | if ((C == 0) && (Z == 0)) PC = label; else PC = next_instruction; | — | 1 / 2 | 2 / 3 |
| ble.s | (label, PC) | if ((N != V) \|\| (Z == 1)) PC = label; else PC = next_instruction; | — | 1 / 2 | 2 / 3 |
| ble.u | (label, PC) | if ((C == 1) \|\| (Z == 1)) PC = label; else PC = next_instructions; | — | 1 / 2 | 2 / 3 |
| blt. s | (label, PC) | if (N != V) PC = label; else PC = next_instruction; | — | 1 / 2 | 2 / 3 |
| blt.u (= bcs) | (label, PC) | if (C == 1) PC = label; else PC = next_instruction; | — | 1 / 2 | 2 / 3 |
| bmi | (label, PC) | if (N == 1) PC = label; else PC = next_instruction; | — | — | 2 / 3 |
| bne | (label, PC) | if (Z == 0) PC = label; else PC = next_instruction; | — | 1 / 2 | 2 / 3 |
| bnz.r | Rs, (label, PC) | Flags set for Rs;<br>if (Rs != 0) PC = label; else PC = next_instruction; | ZNCV | 1 / 2 | 2 / 3 |
| bpl | (label, PC) | if (N == 0) PC = label; else PC = next_instruction; | — | — | 2 / 3 |
| bvc | (label, PC) | if (V == 0) PC =label; else PC = next_instruction; | — | — | 2 / 3 |
| bvs | (label, PC) | if (V == 1) PC = label; else PC = next_instruction; | — | — | 2 / 3 |

Note: The number of cycles = a / b. a = branch not taken. b = branch taken.

Load and Store

Load (displacement)

| | | | | | |
|---|---|---|---|---|---|
| ld.8z.i | Rd, @(offset, Ra) | Rd = (uint16) (* (int8*) (offset[15:0]s + Ra ) )<br>Ra = R0-R7, 0 | ZN— | 2 | 3 |
| ld.i | Rd, @(offset, Ra) | Rd = * (int16*) (offset[15:0]s + Ra )<br>Ra = R0-R7, 0 | ZN— | 2 | 3 |
| ld.32.i | Rd, @(offset, Ra) | {R(d+1), Rd} = * (int32*) (offset[15:0]s + Ra )<br>Ra = R0-R7, 0 | ZN— | 3 | 4 |

Load Far (displacement)

| | | | | | |
|---|---|---|---|---|---|
| ld.8z.fi | Rd, @(offset, Ra) | Rd = (uint16)(*(int8*)(offset[15:0]s + {R(a+1),Ra}[23:0])) Ra = R0-R7, PC, SP | ZN— | 2 | 3 |
| ld.fi | Rd, @(offset, Ra) | Rd = * (int16*) ( offset[15:0]s + {R(a+1), Ra}[23:0] )<br>Ra = R0-R7, PC, SP | ZN— | 2 | 3 |
| ld.32.fi | Rd, @(offset, Ra) | {R(d+1) Rd} = *(int32*)(offset[15:0]s + {R(a+1),Ra}[23:0])<br>Ra = R0-R7, PC, SP | ZN— | 3 | 4 |

Load (indexed)

| | | | | | |
|---|---|---|---|---|---|
| ld.8z.r | Rd, @(Rx, Ra) | Rd = (uint16) (* (int8*) ( Rx + Ra )) | ZN— | 2 | 3 |
| ld.r | Rd, @(Rx, Ra) | Rd = * (int16*) ( 2*Rx + Ra ) | ZN— | 2 | 3 |
| ld.32.r | Rd, @(Rx, Ra) | {R(d+1), Rd} = * (int32*) ( 4*Rx + Ra) | ZN— | 3 | 4 |

Load Far (indexed)

| | | | | | |
|---|---|---|---|---|---|
| ld.8z.fr | Rd, @(Rx, Ra) | Rd = (uint16) (* (int8*) ( Rx + {R(a+1), Ra} [23:0])) | ZN— | 2 | 3 |
| ld.fr | Rd, @(Rx, Ra) | Rd = * (int16*) ( 2*Rx + {R(a+1), Ra}[23:0] ) | ZN— | 2 | 3 |
| ld.32.fr | Rd, @(Rx, Ra) | {R(d+1), Rd} = * (int32*) ( 4*Rx + {R(a+1), Ra}[23:0] ) | ZN— | 3 | 4 |

Store (displacement)

| | | | | | |
|---|---|---|---|---|---|
| st.8.i | Rs, @(offset, Ra) | *(int8*) (offset[15:0]s + Ra ) = Rs[7:0]<br>Rs = R0-R7, #0<br>Ra = R0-R7, 0 | — | 2 | 3 |
| st.i | Rs, @(offset, Ra) | *(int16*) (offset[15:0]s + Ra ) = Rs<br>Rs = R0-R7, #0<br>Ra = R0-R7, 0 | — | 2 | 3 |
| st.32.i | Rs, @(offset, Ra) | *(int32*) (offset[15:0]s + Ra ) = {R(s+1), Rs}<br>Rs = R0-R7, #0<br>Ra = R0-R7, 0 | — | 3 | 4 |

APPENDIX A-continued

Instruction Set

Store Far (displacement)

| | | | | | |
|---|---|---|---|---|---|
| st.8.fi | Rs, @(offset, Ra) | *(int8*) (offset[15:0]s + {R(a+1),Ra}[23:0]) = Rs[7:0]<br>Rs = R0-R7, #0<br>Ra = R0-R7, PC, SP | — | 2 | 3 |
| st.fi | Rs, @(offset, Ra) | *(int16*) (offset[15:0]s + {R(a+1),Ra}[23:0]) = Rs<br>Rs = R0-R7, #0<br>Ra = R0-R7, PC, SP | — | 2 | 3 |
| st.32.fi | Rs, @(offset, Ra) | *(int32*) (offset[15:0]s + {R(a+1),Ra}[23:0]) = {R(s+1),Rs}<br>Rs = R0-R7, #0<br>Ra = R0-R7, PC, SP | — | 3 | 4 |

Store (indexed)

| | | | | | |
|---|---|---|---|---|---|
| st.8.r | Rs, @(Rx, Ra) | * (int8*) ( Rx + Ra ) = Rs[7:0]<br>Rs = R0-R7, #0 | — | 2 | 3 |
| st.r | Rs, @(Rx, Ra) | * (int16*) ( 2*Rx + Ra ) = Rs<br>Rs = R0-R7, #0 | — | 2 | 3 |
| st.32.r | Rs, @(Rx, Ra) | * (int32*) ( 4*Rx + Ra) = {R(s+1), Rs}<br>Rs = R0-R7, #0 | — | 3 | 4 |

Store Far (indexed)

| | | | | | |
|---|---|---|---|---|---|
| st.8.fr | Rs, @(Rx, Ra) | * (int8*) ( Rx + {R(a+1), Ra}[23:0] ) = Rs[7:0]<br>Rs = R0-R7, #0 | — | 2 | 3 |
| st.fr | Rs, @(Rx, Ra) | * (int16*) ( 2*Rx + {R(a+1), Ra}[23:0] ) = Rs<br>Rs = R0-R7, #0 | — | 2 | 3 |
| st.32.fr | Rs, @(Rx, Ra) | * (int32*) ( 4*Rx + {R(a+1), Ra}[23:0] ) = {R(s+1), Rs} Rs = R0-R7, #0 | — | 3 | 4 |

Swap

| | | | | | |
|---|---|---|---|---|---|
| swap.i | Rd, @(0, Ra) | Swap Register with low memory: *Ra <-> Rd | ZN— | — | 4 |
| swap.fi | Rd, @(0, Ra) | Swap Register with high or low memory: *{R(a+1), Ra}[23:0] <-> Rd | ZN— | — | 4 |

Push and Pop

| | | | | | |
|---|---|---|---|---|---|
| push | RegList, #offset | Push registers in RegList to stack. | — | n + 1 | n + 2 |
| pop | RegList, #offset | Pop registers in RegList from stack. | — | n + 1 | n + 2 |
| pop.ret | RegList, #offset | Pop registers in RegList and PC from stack (i.e return). | ZNCV | n + 5 | n + 6 |
| Note: | RegList example: {%r0, %r1, %r3-%r6}<br>n = number of 16-bit words pushed/popped. | | | | |

Move

| | | | | | |
|---|---|---|---|---|---|
| mov.i | Rd, #imm<br>Rd, (label, 0) | Rd = #imm[15:0]<br>Rd = label. Zero-relative. | ZN— | 1 | 2 |
| mov.r | Rd, Rs | Rd = Rs | ZN— | 1 | 2 |
| mov.32.i | Rd, #imm<br>Rd, (label, 0)<br>Rd, (label, PC)<br>Rd, !(label, PC) | {R(d+1), Rd} = {#immediate[23:1], 0}<br>{R(d+1), Rd} = label. Zero-relative.<br>{R(d+1), Rd} = data label. PC-relative.<br>{R(d+1), Rd} = code label. PC-relative. | — | — | 2 |
| mov.32.r | Rd, Rs | {R(d+1), Rd} = {R(s+1), Rs} | ZN— | 1 | 2 |

ALU Operations

Add

| | | | | | |
|---|---|---|---|---|---|
| add.i | Rd, Rs, #imm | Rd = Rs + #imm[15:0]s | ZNCV | 1 | 2 |
| add.r | Rd, Rs, Rt | Rd = Rs + Rt | ZNCV | 1 | — |
| add.c.i | Rd, Rs, #imm | Rd = Rs + #imm[15:0]s + C | ZNCV | 1 | 2 |
| add.c.r | Rd, Rs, Rt | Rd = Rs + Rt + C | ZNCV | 1 | — |
| add.32.i | Rd, Rs, #imm ** | {R(d+1), Rd} = {R(s+1), Rs} + #imm[15:0]s | ZNCV | 1 / 2 * | 2 / 3 * |
| add.32c.i | Rd, Rs, #imm ** | {R(d+1), Rd} = {R(s+1), Rs} + #imm[15:0]s + C | ZNCV | — | 3 |

Subtract

| | | | | | |
|---|---|---|---|---|---|
| sub.r | Rd, Rs, Rt | Rd = Rs − Rt | ZNCV | 1 | — |
| sub.c.r | Rd, Rs, Rt | Rd = Rs − Rt − C | ZNCV | 1 | — |
| sub.x.i | Rd, Rs, #imm | Rd = #imm[15:0]s − Rs | ZNCV | — | 2 |
| sub.xc.i | Rd, Rs, #imm | Rd = #imm[15:0]s − Rs − C | ZNCV | — | 2 |
| sub.32x.i | Rd, Rs, #imm ** | {R(d+1), Rd} = #imm[15:0]s − {R(s+1), Rs} | ZNCV | — | 3 |
| sub.32xc.i | Rd, Rs, #imm ** | {R(d+1), Rd} = #imm[15:0]s − {R(s+1), Rs}− C | ZNCV | — | 3 |

APPENDIX A-continued

Instruction Set

Logical

| | | | | | |
|---|---|---|---|---|---|
| and.i | Rd, Rs, #imm | Rd = Rs & #imm[15:0]u | ZN— | 1 | 2 |
| and.r | Rd, Rs, Rt | Rd = Rs & Rt | ZN— | 1 | — |
| or.i | Rd, Rs, #imm | Rd = Rs \| #imm[15:0]u | ZN— | 1 | 2 |
| or.r | Rd, Rs, Rt | Rd = Rs \| Rt | ZN— | 1 | — |
| xor.i | Rd, Rs, #imm | Rd = Rs ^ #imm[15:0]u | ZN— | 1 | 2 |
| xor.r | Rd, Rs, Rt | Rd = Rs ^ Rt | ZN— | 1 | — |

Multiply

| | | | | | |
|---|---|---|---|---|---|
| mult.i | Rd, Rs, #imm | Rd = (int16*) (Rs * #imm[15:0]s) | ZN— | — | 4 |
| mult.r | Rd, Rs, Rt | Rd = (int16*) (Rs * Rt) | ZN— | — | 4 |
| mult.32s.i | Rd, Rs, #imm | {R(d+1), Rd} = Rs * #imm[15:0]s | ZN— | — | 5 |
| mult.32s.r | Rd, Rs, Rt | {R(d+1), Rd} = Rs * Rt | ZN— | — | 5 |
| mult.32u.i | Rd, Rs, #imm | {R(d+1), Rd} = Rs * #imm[15:0]u | ZN— | — | 5 |
| mult.32u.r | Rd, Rs, Rt | {R(d+1), Rd} = Rs * Rt | ZN— | — | 5 |
| mult.sh.r | Rd, Rs, Rt, #imm | Rd = (Rs * Rt) >> #imm[4:0]u | ZN—V | — | 6 |

Divide and Remainder (signed)

| | | | | | |
|---|---|---|---|---|---|
| div.s.i | Rd, Rs, #imm | Rd= Rs / #imm[15:0]s | ZN—V | — | 20 |
| div.s.r | Rd, Rs, Rt | Rd = Rs / Rt | ZN—V | — | 20 |
| div.32s.i | Rd, Rs, #imm | Rd = {R(s+1), Rs} / #imm[15:0]s | ZN—V | — | 20 |
| div.32s.r | Rd, Rs, Rt | Rd = {R(s+1), Rs} / Rt | ZN—V | — | 20 |
| divrem.s.i | Rd, Rs, #imm | Rd = Rs / #imm[15:0]s ; R(d+1) = Rs % #imm[15:0]s | —V | — | 20 |
| divrem.s.r | Rd, Rs, Rt | Rd = Rs / Rt ; R(d+1) = Rs % Rt | —V | — | 20 |
| divrem.32s.i | Rd, Rs, #imm | Rd = {R(s+1), Rs} / #imm[15:0]s ; R(d+1) = {R(s+1), Rs} % #imm[15:0]s | —V | — | 20 |
| divrem.32s.r | Rd, Rs, Rt | Rd = {R(s+1), Rs} / Rt ; R(d+1) = {R(s+1), Rs} % Rt | —V | — | 20 |
| rem.s.i | Rd, Rs, #imm | Rd = Rs % #imm[15:0]s | ZN—V | — | 20 |
| rem.s.r | Rd, Rs, Rt | Rd = Rs % Rt | ZN—V | — | 20 |
| rem.32s.i | Rd, Rs, #imm | Rd = {R(s+1), Rs} % #imm[15:0]s | ZN—V | — | 20 |
| rem.32s.r | Rd, Rs, Rt | Rd = {R(s+1), Rs} % Rt | ZN—V | — | 20 |

Divide and Remainder (unsigned)

| | | | | | |
|---|---|---|---|---|---|
| div.u.i | Rd, Rs, #imm | Rd = Rs / #imm[15:0]u | ZNC— | — | 18 |
| div.u.r | Rd, Rs, Rt | Rd = Rs / Rt | ZNC— | — | 18 |
| div.32u.i | Rd, Rs, #imm | Rd = {R(s+1), Rs} / #imm[15:0]u | ZNC— | — | 18 |
| div.32u.r | Rd, Rs, Rt | Rd = {R(s+1), Rs} / Rt | ZNC— | — | 18 |
| divrem.u.i | Rd, Rs #imm | Rd = Rs / #imm[15:0]u ; R(d+1)[15:0] = Rs % #imm[15:0]u | —C— | — | 18 |
| divrem.u.r | Rd, Rs, Rt | Rd = Rs / Rt ; R(d+1) = Rs % Rt | —C— | — | 18 |
| divrem.32u.i | Rd, Rs, #imm | Rd = {R(s+1), Rs} / #imm[15:0]u ; R(d+1) = {R(s+1), Rs} % #imm[15:0]u | —C— | — | 18 |
| divrem.32u.r | Rd, Rs, Rt | Rd = {R(s+1), Rs} / Rt ; R(d+1) = {R(s+1), Rs} % Rt | —C— | — | 18 |
| rem.u.i | Rd, Rs, #imm | Rd = Rs % #imm[15:0]u | ZNC— | — | 18 |
| rem.u.r | Rd, Rs, Rt | Rd = Rs % Rt | ZNC— | — | 18 |
| rem.32u.i | Rd, Rs, #imm | Rd = {R(s+1), Rs} % #imm[15:0]u | ZNC— | — | 18 |
| rem.32u.r | Rd, Rs, Rt | Rd = {R(s+1), Rs} % Rt | ZNC— | — | 18 |

\* Note: if (Rs == SP) Instruction takes one fewer clock cycle (as shown);
\*\* Note: 16-bit #imm is sign extended to 32-bits

Compare Operations — Flags set for

| | | | | | |
|---|---|---|---|---|---|
| cmp.8.i | Rs, #imm | Rs[7:0] − #imm[7:0] | ZNCV | 1 | 2 |
| cmp.8.r | Rs, Rt | Rs[7:0] − Rt[7:0] | ZNCV | 1 | — |
| cmp.8c.i | Rs, #imm | Rs[7:0] − #imm[7:0] − C | ZNCV | — | 2 |
| cmp.8c.r | Rs, Rt | Rs[7:0] − Rt[7:0] − C | ZNCV | 1 | — |
| cmp.8x.i | Rs, #imm | #imm[7:0] − Rs[7:0] | ZNCV | — | 2 |
| cmp.8xc.i | Rs, #imm | #imm[7:0] − Rs[7:0] − C | ZNCV | — | 2 |
| cmp.i | Rs, #imm | Rs − #imm[15:0] | ZNCV | 1 | 2 |
| cmp.r | Rs, Rt | Rs − Rt | ZNCV | 1 | — |
| cmp.c.i | Rs, #imm | Rs − #imm[15:0] − C | ZNCV | — | 2 |
| cmp.c.r | Rs, Rt | Rs − Rt − C | ZNCV | 1 | — |
| cmp.x.i | Rs, #imm | #imm[15:0] − Rs | ZNCV | — | 2 |
| cmp.xc.i | Rs, #imm | #imm[15:0]− Rs − C | ZNCV | — | 2 |
| cmp.32.i | Rs, #imm \*\* | {R(s+1), Rs} − #imm[15:0]s | ZNCV | 2 | 3 |
| cmp.32.r | Rs, Rt | {R(s+1), Rs} − {R(t+1), Rt} | ZNCV | 2 | — |
| cmp.32c.i | Rs, #imm \*\* | {R(s+1), Rs} − #imm[15:0]s − C | ZNCV | — | 3 |
| cmp.32c.r | Rs, Rt | {R(s+1), Rs} − {R(t+1), Rt} − C | ZNCV | 2 | — |
| cmp.32x.i | Rs, #imm \*\* | #imm[15:0]s − {R(s+1), Rs} | ZNCV | — | 3 |
| cmp.32xc.i | Rs, #imm \*\* | #imm[15:0]s − {R(s+1), Rs} − C | ZNCV | — | 3 |

\*\* Note: 16-bit #imm is sign extended to 32-bits

APPENDIX A-continued

Instruction Set

Shift and Rotate

| | | | | | |
|---|---|---|---|---|---|
| shiftl.i | Rd, Rs, #imm | As shiftl.32.i, but not including R(s+1) → R(d+1) and repeated #imm[3:0] times. | ZNC— | 1 | — |
| shiftl.r | Rd, Rs, Rt | As shiftl.i, but repeated Rt[3:0] times. | ZNC— | 1 | — |
| shiftl.32.i | Rd, Rs, #imm | 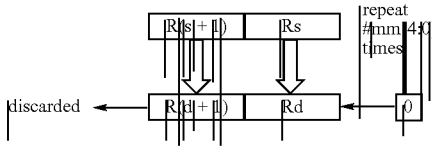 | ZNC— | — | 2 |
| shiftl.32.r | Rd, Rs, Rt | As shiftl.32.i, but r-pe.ted Rt[4:0] times. | ZNC— | — | 2 |
| shiftr.s.i | Rd, Rs, #imm | As shiftr.32s.i, but not including R(s+1) → R(d+1) and repeated #imm[3:0] times. | ZNC— | 1 | — |
| shiftr.s.r | Rd, Rs, Rt | As shiftr.s.i, but repeated Rt[3:0] times. | ZNC— | 1 | — |
| shiftr.32s.i | Rd, Rs, #imm | 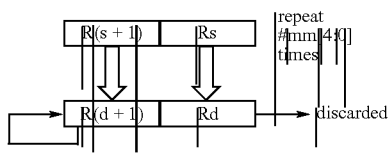 | ZNC— | — | 2 |
| shiftr.32s.r | Rd, Rs, Rt | As shiftr.32s.i, but repeated Rt[4:0] times. | ZNC— | — | 2 |
| shiftr.u.i | Rd, Rs, #imm | As shiftr.32u.i, but not including R(s+1) → R(d+1) and repeated #imm[3:0] times. | ZNC— | 1 | — |
| shiftr.u.r | Rd, Rs, Rt | As shiftr.u.i, but repeated Rt[3:0] times. | ZNC— | 1 | — |
| shiftr.32u.i | Rd, Rs, #imm | 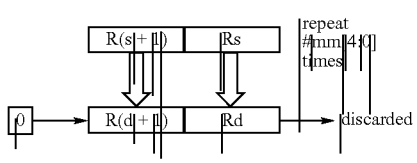 | ZNC— | — | 2 |
| shiftr.32u.r | Rd, Rs, Rt | As shiftr.32u.i, but repeated Rt[4:0] times. | ZNC— | — | 2 |
| rotatel.i | Rd, Rs, #imm | As rotatel.32.i, but not including R(s+1) → R(d+1) and repeated #imm[3:0] times. | ZNC— | — | 2 |
| rotatel.r | Rd, Rs, Rt | As rotatel.i, but repeated Rt[3:0] times. | ZNC— | — | 2 |
| rotatel.32.i | Rd, Rs, #imm | 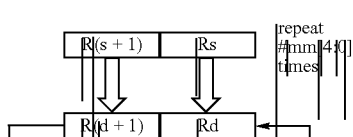 | ZNC— | — | 2 |
| rotatel.32.r | Rd, Rs, Rt | As rotatel.21, but repeated Rt[4:0] times. | ZNC— | — | 2 |

Block Copy and Store

| | | | | | |
|---|---|---|---|---|---|
| blkcp.r | Rd, Rs, Rt | Copy Rt bytes from memory starting at Rs to memory starting at Rd. | — | — | 2n + 8 |
| blkst.8.r | Rd, Rs, Rt | Store Rt bytes to memory starting at Rd. All bytes equal Rs[7:0]. | — | — | n + 9 |
| blkst.r | Rd, Rs, Rt | Store Rt bytes to memory starting at Rd. All byte pairs equal Rs. | — | — | n + 9 |
| blkcp.fr | Rd, Rs, Rt | Copy Rt bytes from memory starting at {R(s+1), Rs}[23:0] to memory starting at {R(d+1), Rd}[23:0]. | — | — | 2n + 8 |
| blkst.8.fr | Rd, Rs, Rt | Store Rt bytes to memory starting at {R(d+1), Rd}[23:0]. All bytes equal Rs[7:0]. | — | — | n + 9 |
| blkst.fr | Rd, Rs, Rt | Store Rt bytes to memory starting at {R(d+1), Rd}[23:0]. All byte pairs equal Rs. | — | — | n + 9 |
| Note: | | n is the number of memory transfers. See C7508-UM-002 for more details. | | | |

DSP instructions

| | | | | | |
|---|---|---|---|---|---|
| flip.r | Rd, Rs | Flip bits; 0-15, 1-14, . . . | ZN— | — | 2 |
| flip.8.r | Rd, Rs | Flip byte bits; 0-7, 8-15; 1-6, 9-14; . . . | ZN— | — | 3 |

APPENDIX A-continued

Instruction Set

| | | | | | |
|---|---|---|---|---|---|
| abs.r | Rd, Rs | if (Rs ≥ 0) Rd = Rs; else Rd = −Rs; | ZN— | — | 2 |
| msbit.r | Rd, Rs | Rd = (1 + highest bit to contain a 1 in Rs) | ZN— | — | 2 |

Single-bit instructions

| | | | | | |
|---|---|---|---|---|---|
| ld.1.i | %flags[c], @(offset[bit], 0) | Load selected bit into C flag. | —C— | — | 3 |
| ldand.1.i | %flags[c], %flags[c], @(offset[bit], 0]) | AND C flag with selected bit, then store result in C flag. | —C— | — | 3 |
| ldor.1.i | %flags[c], %flags[c], @(offset[bit], 0]) | OR C flag with selected bit, then store result in C flag. | —C— | — | 3 |
| ldxor.1.i | %flags[c], %flags[c], @(offset[bit], 0]) | XOR C flag with selected bit, then store result in C flag. | —C— | — | 3 |
| st.1.i | #imm, @(offset[bit], 0) | Store 1-bit immediate to selected bit in bit-enabled IO register. | — | — | 3 |
| st.1.i | %flags[c], @(offset[bit], 0) | Store C flag to selected bit in bit-enabled IO register. | — | — | 3 |

Miscellaneous instructions

| | | | | | |
|---|---|---|---|---|---|
| sext.r | Rd | Sign Extend: Set Rd[15:8] = Rd[7] | ZN— | 1 | — |

System Instructions

| | | | | | |
|---|---|---|---|---|---|
| brk | — | Break | — | 1 | — |
| halt | — | Halt | — | 1 | — |
| nop | — | No Operation | — | 1 | — |
| sif | — | Perform SIF cycle | — | 7 | 8 |
| sleepnop | — | Sleep | — | 1 | — |
| sleepsif | — | Sleep and allow SIF | — | 1 | — |
| print.r | Rs | Print Register | — | 1 | — |
| lic | Rd | Rd = XAP5 licence number | — | 1 | — |
| rtie | — | Return from Trap, Interrupt, Exception | ZNCV | 8 | — |
| swi.i | #imm | Software Interrupt - Immediate | — | — | 6 |
| swi.r | Rs | Software Interrupt - Register | — | — | 6 |
| ver | Rd | Rd = XAP5 version number | — | 1 | — |

Flags Register

| | | | | | |
|---|---|---|---|---|---|
| mov.1.i | %flags[F], #imm | F flag = #imm[0] | | 1 | — |
| | | F = p3, p2, p1, p0, s3, s2, s1, s0, i, m1, m0, v, c, n, z | | | |
| mov.1.r | %flags[c], Rs | C flag = Rs[0] | —C— | — | 2 |
| mov.1.r | Rd, %flags[F] | Rd[15:1] = 0; Rd [0] = F flag | ZN— | — | 2 |
| | | F = p3, p2, p1, p0, s3, s2, s1, s0, i, m1, m0, v, c, n, z | | | |
| mov.2.i | %flags[m], #imm | {M1, M0} flags = #imm[1:0] | — | 1 | — |
| mov.2.r | Rd, %flags[m] | Rd[15:2] = 0; Rd[1:0] = {M1, M0}flags | ZN— | — | 2 |
| mov.4.i | %flags[p], #imm | {P3, P2, P1, P0} flags = #imm[3:0] | — | 1 | — |
| mov.4.r | Rd, %flags[p] | Rd[15:4] = 0; Rd[3:0] = {P3, P2, P1, P0} flags | ZN— | — | 2 |
| xor.1.i | %flags[c], %flags[c], #1 | Toggle C flag. | —C— | 1 | — |

Address Registers

| | | | | | |
|---|---|---|---|---|---|
| mova2r.16 | Rd, As | Rd = As[15:0] | ZN— | — | 2 |
| mova2r.32 | Rd, As | R(d+ 1) = {0x00, As[23:16]}; Rd = As[15:0] | ZN— | — | 2 |
| movr2a.16 | Ad, Rs | Ad[23:16] = 0; Ad[15:0] = Rs | — | — | 2 |
| movr2a.32 | Ad, Rs | Ad[23:16] = R(s+1)[7:0]; Ad[15:0] = Rs | — | — | 2 |

Breakpoint Registers

| | | | | | |
|---|---|---|---|---|---|
| movb2r.32 | Rd, Bs | R(d+1) = {0x00, Bs[23:16]}; Rd = Bs[15:0] | ZN— | — | 2 |
| movr2b.32 | Bd, Rs | Bd[23:16] = R(s+1)[7:0]; Bd[15:0] = Rs | — | — | 2 |

Special Registers

| | | | | | |
|---|---|---|---|---|---|
| movs2r | Rd, Ss | Rd = Ss | ZN— | — | 2 |
| movr2s | Sd, Rs | Sd = Rs | — | — | 2 |

Appendix B: Instruction Encodings and Opcodes for Various 16-Bit Instructions
OP=0-3, 16-Bit Instructions

| 15 14 13 | 12 11 10 | 9 8 7 | 6 5 4 3 | 2 1 | 0 |
|---|---|---|---|---|---|
| OPD | OPC | OPB | OPA | | OP |
| OPD | OPC | OPM | OPN | | OP |
| OPD | OPG | OPF | | | OP |

Near mode:

| OPD | OPC | OPM, OPN | OP | Assembler | Flags Updated | Clks |
|---|---|---|---|---|---|---|
| Rd | Ra | offset[7:1]u | 0 | ld.i Rd, @(offset, Ra) | Z, N | 2 |
| Rs | Ra | offset[7:1]u | 1 | st.i Rs @(offset, Ra) | | 2 |
| Rd | Ra | 00, offset[4:0]u | 2 | ld.8z.i Rd, @(offset, Ra) | Z, N | 2 |
| Rs | Ra | 01, offset[4:0]u | 2 | st.8.i Rs @(offset, Ra) | | 2 |
| Rd 0-6 | Ra | 10, offset[5:1]u | 2 | ld.32.i Rd, @(offset, Ra) | Z, N | 3 |
| 7 | Ra | 10, offset[5:1]u | 2 | st.i #0, @(offset, Ra) | | 2 |
| Rs 0-6 | Ra | 11, offset[5:1]u | 2 | st.32.i Rs @(offset, Ra) | | 3 |
| 7 | Ra | 11, offset[5:1]u | 2 | st.32.i #0, @(offset, Ra) | | 3 |

Far mode:

| OPD | OPC | OPM, OPN | OP | Assembler | Flags Updated | Clks |
|---|---|---|---|---|---|---|
| Rd | Ra | offset[7:1]u | 0 | ld.fi Rd, @(offset, Ra) <br> a = offset + {R(a + 1), Ra} | Z, N | 2 |
| Rs | Ra | offset[7:1]u | 1 | st.fi Rs @(offset, Ra) <br> a = offset + {R(a + 1), Ra} | | 2 |
| Rd | Ra | 00, offset[4:0]u | 2 | ld.8z.fi Rd, @(offset, Ra) <br> a = offset + {R(a + 1), Ra} | Z, N | 2 |
| Rs | Ra | 01, offset[4:0]u | 2 | st.8.fi Rs @(offset, Ra) <br> a = offset + {R(a + 1), Ra} | | 2 |
| Rd 0-6 | Ra | 10, offset[5:1]u | 2 | ld.32.fi Rd, @(offset, Ra) <br> a = offset + {R(a + 1), Ra} | Z, N | 3 |
| 7 | Ra | 10, offset[5:1]u | 2 | st.fi #0, @(offset, Ra) | | 2 |
| Rs 0-6 | Ra | 11, offset[5:1]u | 2 | st.32.fi Rs @(offset, Ra) <br> a = offset + {R(a + 1), Ra} | | 3 |
| 7 | Ra | 11, offset[5:1]u | 2 | st.32.fi #0, @(offset, Ra) | | 3 |

All modes:

| OPD | OPG | OPF | OP | Assembler | Flags Updated | Clks |
|---|---|---|---|---|---|---|
| Rd | 0 | offset[8:1]u | 3 | ld.fi Rd, @(offset, SP) <br> a = offset + SP[23:0] | Z, N | 2 |
| Rs | 1 | offset[8:1]u | 3 | st.fi Rs, @(offset, SP) <br> a = offset + SP[23:0] | | 2 |
| Rd | 2 | 0, offset[6:0]u | 3 | ld.8z.fi Rd, @(offset, SP) <br> a = offset + SP[23:0] | Z, N | 2 |
| Rs | 2 | 1, offset[6:0]u | 3 | st.8.fi Rs, @(offset, SP) <br> a = offset + SP[23:0] | | 2 |
| Rd 0-6 | 3 | 0, offset[7:1]u | 3 | ld.32.fi Rd, @(offset, SP) <br> a = offset + SP[23:0] | Z, N | 3 |
| 7 | 3 | 0, offset[7:1]u | 3 | st.fi #0, @(offset, SP) <br> a = offset + SP[23:0] | | 2 |
| Rs 0-6 | 3 | 1, offset[7:1]u | 3 | st.32.fi Rs, @(offset, SP) <br> a = offset + SP[23:0] | | 3 |
| 7 | 3 | 1, offset[7:1]u | 3 | st.32.fi #0, @(offset, SP) <br> a = offset + SP[23:0] | | 3 |

These instructions are all available in 32-bit form as well.

OP=4, 16-Bit Instructions

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| OPD | | | OPG | | | OPF | | | | | | OP | | | |

All modes:

| OPD | OPG | OPF | OP | Assembler | Flags Updated | Clks |
|-----|-----|-----|----|-----------|---------------|------|
| Rd | 0 | imm[7:0]u | 4 | mov.i Rd, #imm | Z, N | 1 |

| 15 | 14 | 13 | 12 | 11 | 10 | 9 | 8 | 7 | 6 | 5 | 4 | 3 | 2 | 1 | 0 |
|----|----|----|----|----|----|---|---|---|---|---|---|---|---|---|---|
| OPD | | | OPC | | | OPB | | | OPA | | | OP | | | |

All modes:

| OPD | OPC | OPB, OPA | OP | Assembler | Flags Updated | Clks |
|-----|-----|----------|----|-----------|---------------|------|
| Rd | 2 | imm[6:0]u | 4 | and.i Rd, Rd, #imm | Z, N | 1 |
| Rd | 3 | imm[6:0]u | 4 | add.i Rd, Rd, #imm | Z, N, C, V | 1 |
| Rs | 4 | imm[6:0]u | 4 | cmp.i Rs, #imm | Z, N, C, V | 1 |

All modes:

| OPD | OPC | OPB | OPA | OP | Assembler | Flags Updated | Clks |
|-----|-----|-----|-----|----|-----------|---------------|------|
| Rd | 5 | 0 | imm[3:0]u | 4 | or.i Rd, Rd, #imm | Z, N | 1 |
| Rs | 5 | 1 | imm[3:0]u | 4 | add.i R3, Rs, #imm | Z, N, C, V | 1 |
| Rd | 5 | 2 | imm[3:0]u | 4 | add.c.i Rd, Rd, #imm | Z, N, C, V | 1 |
| Rd | 5 | 3 | imm[3:0]u | 4 | add.32.i Rd, Rd, #imm | Z, N, C, V | 2 |
| Rd | 5 | 4 | imm[3:0]u | 4 | mov.i Rd, (#imm-16) | Z, N | 1 |
| Rd | 5 | 5 | imm[3:0]u | 4 | and.i Rd, Rd, (#imm-16) | Z, N | 1 |
| Rd | 5 | 6 | imm[3:0]u | 4 | add.i Rd, Rd, (#imm-16) | Z, N, C, V | 1 |
| Rs | 5 | 7 | imm[3:0]u | 4 | cmp.i Rs, (#imm-16) | Z, N, C, V | 1 |

Near mode:

| OPD | OPC | OPB, OPA | OP | Assembler | Flags Updated | Clks |
|-----|-----|----------|----|-----------|---------------|------|
| 10:8 | 6 | offset[7:1]s | 4 | bra.i (offset, PC) offset[0] = 0 = Near mode | | 2 |
| Rd | 7 | imm[6:0]u | 4 | add.i Rd, SP, #imm Rd = SP[15:0] + #imm | Z, N, C, V | 1 |

Far mode:

| OPD | OPC | OPB, OPA | OP | Assembler | Flags Updated | Clks |
|-----|-----|----------|----|-----------|---------------|------|
| 10:8 | 6 | offset[7:1]s | 4 | bra.i (offset, PC) offset[0] = 1 = Far mode | | 2 |
| Rd | 7 | imm[6:0]u | 4 | add.32.i Rd, SP, #imm {R(d + 1), Rd} = SP[23:0] + #imm | Z, N, C, V | 1 |

These instructions are all available in 32-bit form as well.
OP=6, 16-Bit Instructions

| 15 14 13 | 12 11 10 | 9 8 7 | 6 5 4 3 | 2 1 0 |
|---|---|---|---|---|
| OPD | OPC | OPB | OPA | OP = 6 |

Near mode:

| OPD | OPC | OPB | OPA | Assembler | Flags Updated | Clks |
|---|---|---|---|---|---|---|
| Rd | Ra | Rx | 0 | ld.8z.r Rd, @(Rx, Ra)<br>a = Rx + Ra | Z, N | 2 |
| Rs | Ra | Rx | 1 | st.8.r Rs, @(Rx, Ra)<br>a = Rx + Ra | | 2 |
| Rd | Ra | Rx | 2 | ld.r Rd, @(Rx, Ra)<br>a = 2 * Rx + Ra | Z, N | 2 |
| Rs | Ra | Rx | 3 | st.r Rs, @(Rx, Ra)<br>a = 2 * Rx + Ra | | 2 |
| Rd | Ra | Rx | 4 | ld.32.r Rd, @(Rx, Ra)<br>a = 4 * Rx + Ra | Z, N | 3 |
| Rs | Ra | Rx | 5 | st.32.r Rs, @(Rx, Ra)<br>a = 4 * Rx + Ra | | 3 |

Far mode:

| OPD | OPC | OPB | OPA | Assembler | Flags Updated | Clks |
|---|---|---|---|---|---|---|
| Rd | Ra | Rx | 0 | ld.8z.fr Rd, @(Rx, Ra)<br>a = Rx + {R(a + 1), Ra} | Z, N | 2 |
| Rs | Ra | Rx | 1 | st.8.fr Rs, @(Rx, Ra)<br>a = Rx + {R(a + 1), Ra} | | 2 |
| Rd | Ra | Rx | 2 | ld.fr Rd, @(Rx, Ra)<br>a = 2 * Rx + {R(a + 1), Ra} | Z, N | 2 |
| Rs | Ra | Rx | 3 | st.fr Rs, @(Rx, Ra)<br>a = 2 * Rx + {R(a + 1), Ra} | | 2 |
| Rd | Ra | Rx | 4 | ld.32.fr Rd, @(Rx, Ra)<br>a = 4 * Rx + {R(a + 1), Ra} | Z, N | 3 |
| Rs | Ra | Rx | 5 | st.32.fr Rs, @(Rx, Ra)<br>a = 4 * Rx + {R(a + 1), Ra} | | 3 |

All modes:

| OPD | OPC | OPB | OPA | Assembler | Flags Updated | Clks |
|---|---|---|---|---|---|---|
| Rd | Rs | Rt | 6 | and.r Rd, Rs, Rt | Z, N | 1 |
| Rd | Rs | Rt | 7 | or.r Rd, Rs, Rt | Z, N | 1 |
| Rd | Rs | Rt | 8 | xor.r Rd, Rs, Rt | Z, N | 1 |
| Rd | Rs | Rt | 9 | shiftl.r Rd, Rs, Rt | Z, N, C | 1 |
| Rd | Rs | Rt | 10 | shiftr.s.r Rd, Rs, Rt | Z, N, C | 1 |
| Rd | Rs | Rt | 11 | shiftr.u.r Rd, Rs, Rt | Z, N, C | 1 |
| Rd | Rs | Rt | 12 | add.r Rd, Rs, Rt | Z, N, C, V | 1 |
| Rd | Rs | Rt | 13 | add.c.r Rd, Rs, Rt | Z, N, C, V | 1 |
| Rd | Rs | Rt | 14 | sub.r Rd, Rs, Rt | Z, N, C, V | 1 |
| Rd | Rs | Rt | 15 | sub.c.r Rd, Rs, Rt | Z, N, C, V | 1 |

The invention claimed is:

1. A data processing apparatus comprising a processor configured to operate under control of program code comprising instructions selected from an instruction set, wherein the instruction set comprises instructions having both short and long instruction encodings, wherein a short instruction encoding takes up less memory than a long instruction encoding and each short instruction encoding having a corresponding long instruction encoding, the apparatus further comprising:

a predefined addressable memory providing a predefined memory space, which forms a sub-portion of a larger addressable memory providing a larger memory space; and a memory management unit for accessing program code and data anywhere within the larger memory space, wherein the apparatus is configured to operate in one of two operating configurations, each of the two operating configurations of the apparatus specifying an instruction encoding to be used for accessing memory within the predefined memory space and within the larger memory space:

a first operating configuration (a near mode) in which the short instruction encodings are selected, in preference over their respective corresponding long instruction encodings to encode memory access instructions for performing near accesses to data within the predefined memory space; and a second operating configuration (a far mode) in which the short instruction encodings are selected, in preference over their respective corresponding long instruction encodings to encode memory access instructions for performing far accesses within the larger memory space;

wherein said short instruction encodings are interpreted differently for each of the two operating configurations of said apparatus.

2. The data processing apparatus according to claim 1, wherein the predefined memory space is a sub-portion of the larger memory space, and wherein the sub-portion of the memory space is defined from the first addressable memory location of the larger memory space.

3. The data processing apparatus according to claim 1, wherein the processor comprises at least one of the following: a Von Neumann architecture, a loadstore architecture, and a RISC (reduced instruction set) architecture.

4. The data processing apparatus according to claim 1, wherein the processor has an n-bit data width and an address width which is greater than n-bits in width.

5. The data processing apparatus according to claim 1, wherein the processor is an n-bit processor having an n-bit architecture and wherein the memory management unit comprises at least one address register having an address width which is greater than n-bits.

6. The data processing apparatus according to claim 5, which further comprises at least one of the following: a greater than n-bit program counter register, a greater than n-bit memory stack, a number of n-bit general purpose registers, and an n-bit data bus.

7. The data processing apparatus according to claim 5 wherein the program code is optimised to execute on an n-bit processor, and wherein data pointers are stored within n-bit registers.

8. The data processing apparatus according to claim 5, wherein function pointers are stored within a memory space occupying greater than n-bits, and wherein function pointers are stored within n-bit register pairs.

9. The data processing apparatus according to claim 5, wherein the processor is an 8-bit, 16-bit or 32-bit processor.

10. The data processing apparatus according to claim 9, wherein the processor is a 16 bit processor.

11. The data processing apparatus according to claim 5, wherein the address register is 16-bits, 24-bits, 32-bits or 64-bits wide.

12. The data processing apparatus according to claim 5, wherein the address register is 24-bits wide.

13. The data processing apparatus according to claim 1, wherein the processor is an n-bit processor, and wherein the memory management unit is configured to read from and/or write data to or from an n-bit register pair.

14. The data processing apparatus according to claim 13, wherein the processor is an n-bit processor, and wherein data pointers are stored within a memory space occupying greater than n-bits, and preferably wherein data pointers are stored within n-bit register pairs.

15. The data processing apparatus according to claim 13, further comprising
switching circuitry for switching the processor from the first operating configuration to the second operating configuration, and preferably wherein the switching circuitry is configured to dynamically switch between the first and second operating configurations, and more preferably wherein the switching circuitry is configured to switch between the first and second operating configurations during the execution of program code on the processor, and more preferably wherein the switching circuitry is configured to switch between the first and second operating configurations in real-time.

16. The data processing apparatus according to claim 15, wherein the switching circuitry is configured to switch between the first and second configuration in dependence upon the state of a redundant bit provided within an address register, and preferably wherein the setting of the redundant bit switches the apparatus to the second configuration, and wherein the clearing of the bit switches the apparatus to the first configuration, and more preferably wherein the bit is cleared upon reset.

17. The data processing apparatus according to claim 16, wherein a default operating configuration is the first configuration, and/or wherein the redundant bit is provided in a program counter register.

18. The data processing apparatus according to claim 17, wherein said redundant bit is stored at the bottom of a program counter register.

19. The data processing apparatus according to claim 15, wherein the memory management unit is configured to access a stack memory structure, and the memory management unit is configured to access the stack memory structure within the predefined memory space when in the first operating configuration.

20. The data processing apparatus according to claim 15, wherein the instruction set comprises a mixture of both short and long instruction encodings, and wherein both short and long encodings are provided for the majority of the instructions, and/or wherein the processor is an n-bit processor and the short instruction encodings are n-bits in length, and/or wherein the processor is an n-bit processor and the long instruction encodings are 2n-bits in length, and/or wherein the processor is configured to execute short instruction encodings when operating in either of the operating configurations.

21. The data processing apparatus according to claim 15, wherein the processor is configured to perform operations comprising:
determining whether a particular segment of program code is to be executed on the apparatus in the first operating configuration or the second operating configuration; and
optimising the production of the executable instructions in dependence on the operating configuration in which the instructions are to be executed, wherein the executable instructions comprise both short and long instruction encodings and the optimisation step involves producing executable instructions based on short instruction encodings in preference over long instruction encodings, and producing long instruction encodings corresponding to said short instruction encodings,
wherein said short instruction encodings are interpreted differently by said apparatus in dependence on the operating configuration of said apparatus.

22. The data processing apparatus according to claim 15, wherein the switching circuitry is configured to switch between the first and second operating configurations during the execution of program code on the processor, and wherein said program code comprises a branch instruction.

23. The data processing apparatus according to claim 1, wherein the memory management unit is configured to address program code using byte-aligned addressing.

24. The data processing apparatus according to claim 1, wherein the processor is an n-bit processor, and wherein the apparatus further comprises means for storing larger than n-bit function pointers within the predefined memory space, and preferably wherein the function pointers are stored in a table of 2n-bit function pointers to stored functions, and more preferably wherein the memory management unit is configured to access the function pointers using an n-bit pointer.

25. The data processing apparatus according to claim 1, which is suitable for use in an embedded system.

26. A semiconductor device which comprises an apparatus according to claim 1, and preferably wherein the semiconductor device is in the form of an ASIC (application specific integrated circuit), or an FPGA (field programmable gate array).

27. The semiconductor device according to claim 26, which further comprises processors and/or circuitry defining a memory, a memory management unit, input/output ports and an interrupt controller.

28. The data processing apparatus according to claim 1 wherein in said first operating configuration (said near mode) long instruction encodings are used to to encode memory access instructions for performing far accesses within the larger memory space; and in said second operating configuration (said far mode) long instruction encodings are used to to encode memory access instructions for performing near accesses within the predefined memory space.

* * * * *

UNITED STATES PATENT AND TRADEMARK OFFICE
CERTIFICATE OF CORRECTION

| | |
|---|---|
| PATENT NO. | : 9,652,241 B2 |
| APPLICATION NO. | : 12/594715 |
| DATED | : May 16, 2017 |
| INVENTOR(S) | : Morfey et al. |

It is certified that error appears in the above-identified patent and that said Letters Patent is hereby corrected as shown below:

On the Title Page

In Column 2, under "Other Publications", Line 1, delete ""u." and insert --"U.-- therefor In the Claims In Column 88, Line 54, in Claim 28, before "encode", delete "to"

In Column 88, Line 58, in Claim 28, before "encode", delete "to"

Signed and Sealed this
Twenty-eighth Day of May, 2019

Andrei Iancu
*Director of the United States Patent and Trademark Office*